(12) United States Patent
Watanabe

(10) Patent No.: US 12,243,141 B2
(45) Date of Patent: Mar. 4, 2025

(54) GENERATING AVATAR INFORMATION RELATING TO AN AVATAR EXPRESSION OR POSE

(71) Applicant: GREE, Inc., Tokyo (JP)

(72) Inventor: Masashi Watanabe, Tokyo (JP)

(73) Assignee: GREE, INC., Tokyo (JP)

( * ) Notice: Subject to any disclaimer, the term of this patent is extended or adjusted under 35 U.S.C. 154(b) by 302 days.

(21) Appl. No.: 17/956,873

(22) Filed: Sep. 30, 2022

(65) Prior Publication Data

US 2023/0023653 A1 Jan. 26, 2023

Related U.S. Application Data

(63) Continuation of application No. PCT/JP2021/015347, filed on Apr. 13, 2021.

(30) Foreign Application Priority Data

| Apr. 14, 2020 | (JP) | 2020-072287 |
| Apr. 27, 2020 | (JP) | 2020-078079 |
| May 28, 2020 | (JP) | 2020-093438 |

(51) Int. Cl.
  *G06T 13/40* (2011.01)
  *G06T 7/70* (2017.01)
  (Continued)

(52) U.S. Cl.
  CPC .............. *G06T 13/40* (2013.01); *G06T 7/70* (2017.01); *G06T 19/20* (2013.01); *G06V 10/761* (2022.01);
  (Continued)

(58) Field of Classification Search
  None
  See application file for complete search history.

(56) References Cited

U.S. PATENT DOCUMENTS

| 9,245,177 B2 | 1/2016 | Perez |
| 10,546,407 B2 | 1/2020 | Inomata et al. |

(Continued)

FOREIGN PATENT DOCUMENTS

| CN | 108140383 A | 6/2018 |
| CN | 108986192 A | 12/2018 |

(Continued)

OTHER PUBLICATIONS

Wohn et al., "Live Streaming, Playing, and Money Spending Behaviors in eSports", Jul. 2019, Sage Publications, vol. 15, No. 1, pp. 73-88 (Year: 2019).*

(Continued)

*Primary Examiner* — Kent W Chang
*Assistant Examiner* — Jonathan M Cofino
(74) *Attorney, Agent, or Firm* — XSENSUS LLP

(57) ABSTRACT

A non-transitory computer readable medium storing computer executable instructions which, when executed by one or more processors, cause the one or more processors to perform a process including generating avatar information relating to an avatar expression or pose based on streamer data indicating a facial expression or pose of a streamer; acquiring gift information concerned with a gift of an object that is provided from a viewer to the streamer; determining whether the gift information satisfies a predetermined condition; in a case that the gift information is determined to satisfy the predetermined condition, rendering an avatar facial expression or pose using a predetermined facial expression or pose corresponding to the predetermined condition; and in a case that the gift information is determined to not satisfy the predetermined condition, rendering the avatar facial expression or pose using the avatar information generated based on the streamer data.

17 Claims, 16 Drawing Sheets

(51) Int. Cl.
  *G06T 19/20* (2011.01)
  *G06V 10/74* (2022.01)
  *G06V 40/16* (2022.01)
  *H04N 21/2187* (2011.01)
  *H04N 21/431* (2011.01)

(52) U.S. Cl.
  CPC ....... *G06V 40/176* (2022.01); *H04N 21/2187* (2013.01); *H04N 21/4312* (2013.01); *G06T 2207/30201* (2013.01); *G06T 2219/2012* (2013.01); *G06T 2219/2016* (2013.01)

(56) References Cited

U.S. PATENT DOCUMENTS

| | | | |
|---|---|---|---|
| 10,748,342 | B2 | 8/2020 | Joyce et al. |
| 10,796,489 | B1 | 10/2020 | Cordes et al. |
| 11,367,260 | B2 | 6/2022 | Kawakami et al. |
| 11,500,456 | B2 | 11/2022 | Iwaki |
| 2007/0260984 | A1 | 11/2007 | Marks et al. |
| 2010/0153868 | A1* | 6/2010 | Allen ...................... G06T 13/40 715/764 |
| 2010/0303289 | A1 | 12/2010 | Polzin et al. |
| 2015/0024840 | A1* | 1/2015 | Poon ...................... A63F 13/332 463/31 |
| 2015/0325029 | A1 | 11/2015 | Li et al. |
| 2015/0375111 | A1* | 12/2015 | Moriyama .............. A63F 13/30 463/31 |
| 2017/0003784 | A1* | 1/2017 | Garg ...................... A63F 13/87 |
| 2017/0006322 | A1* | 1/2017 | Dury ...................... H04N 21/254 |
| 2018/0350144 | A1* | 12/2018 | Rathod ............... G06Q 20/3224 |
| 2019/0138267 | A1 | 5/2019 | Mailey |
| 2022/0083126 | A1* | 3/2022 | Iwaki ..................... G06F 3/0346 |
| 2023/0049410 | A1 | 2/2023 | Saito |

FOREIGN PATENT DOCUMENTS

| | | |
|---|---|---|
| JP | 7-230559 A | 8/1995 |
| JP | 2003-67780 A | 3/2003 |
| JP | 2018-14575 A | 1/2018 |
| JP | 2018-128966 A | 8/2018 |
| JP | 6559871 B1 | 7/2019 |
| JP | 2020-17244 A | 1/2020 |
| JP | 2020-017244 A | 1/2020 |
| JP | 6644928 B1 | 1/2020 |
| JP | 2020-038601 A | 3/2020 |
| JP | 2020-057207 A | 4/2020 |
| JP | 6840876 B1 | 2/2021 |
| JP | 2021-064253 A | 4/2021 |
| KR | 2004-0014123 A | 2/2004 |
| KR | 10-2018-0030767 A1 | 3/2018 |
| WO | 2020/068878 A1 | 4/2020 |

OTHER PUBLICATIONS

International Search Report and Written Opinion mailed on Jul. 6, 2021, received for PCT Application PCT/JP2021/015347, filed on Apr. 13, 2021, 9 pages including English Translation.
"Custom Cast", Available Online at: https://customcast.jp, Retrieved from Online On: Dec. 6, 2021, 17 pages Including English Translation.
Japanese Office Action issued Feb. 14, 2023, in corresponding Japanese Patent Application 2021-106393, 4pp.
Office Action issued Mar. 5, 2024 in Japanese Patent Application No. 2021-208605.
Office Action issued on Jun. 20, 2023, in corresponding Japanese patent Application No. 2020-072287, 6 pages.
Office Action issued Jul. 11, 2023 in Japanese Patent Application No. 2020-093438, 5 pages.
Office Action issued on Jan. 17, 2023, in corresponding Japanese patent Application No. 2020-072287, 7 pages.
Office Action issued on Jan. 17, 2023, in corresponding Japanese patent Application No. 2020-093438, 6 pages.
Office Action issued on Jan. 17, 2023, in corresponding Japanese patent Application No. 2020-078079, 6 pages.
Masatoshi Tokuoka, "[CEDEC 2019] "VTuber avatar that moves on its own when receiving a gift" session report. Two VTubers shake hands, grab shoulders, and hug each other, Experience acting support system using physics engine", 4gamer, Sep. 4, 2019, pp. 1-10, See English translation of the Japanese Office Action No. 2020-078079 issued on Jan. 17, 2023 for the explanation of the Statement of Relevancy. <URL:https://www.4gamer.net/games/999/G999905/20190904033/> [Search date: Dec. 28, 2022].
Japanese Office Action issued Dec. 5, 2023, in corresponding Japanese Patent Application No. 2020-093438, 5 pages.
US Office Action issued Dec. 21, 2023, in corresponding U.S. Appl. No. 17/851,140, 87 pages.
Japanese Office Action issued Feb. 13, 2024, in corresponding Japanese Patent Application No. 2021-208607, 8 pages.
Japanese Office Action issued Jul. 23, 2024 in corresponding Japanese Patent Application No. 2021-208605, 6 pages.

* cited by examiner

FIG. 4

| | |
|---|---|
| INFORMATION CONCERNED WITH GIFT | PRIORITY CONCERNED WITH GIFT |
| | POSITION CONCERNED WITH GIFT |
| | ATTRIBUTE OF GIFT |
| | INFORMATION IDENTIFYING AVATAR TO WHICH GIFT IS PROVIDED |
| | ... |
| INFORMATION CONCERNED WITH GIFT | PRIORITY CONCERNED WITH GIFT |
| | POSITION CONCERNED WITH GIFT |
| | ATTRIBUTE OF GIFT |
| | INFORMATION IDENTIFYING AVATAR TO WHICH GIFT IS PROVIDED |
| | ... |
| INFORMATION CONCERNED WITH AVATAR | POSITION CONCERNED WITH AVATAR |
| | TYPE OF AVATAR |
| | FACIAL EXPRESSION PARAMETER CONCERNED WITH AVATAR |
| | MOTION CONCERNED WITH AVATAR |
| | SITUATION CONCERNED WITH AVATAR |
| | ... |
| ... | ... |

FIG. 5

| | EXAMPLE OF INFORMATION TO BE ACQUIRED |
|---|---|
| INFORMATION CONCERNED WITH STREAMER | PREDETERMINED MOTION OF STREAMER |
| | FACIAL EXPRESSION OF STREAMER |
| | COMPLEXION OF STREAMER |
| | VOICE OF STREAMER |
| | PREDETERMINED SITUATION THAT OCCURS ON STREAMER |
| | ... |
| | ... |

FIG. 6

| EXAMPLE OF DETECTING MEANS | EXAMPLE OF INFORMATION TO BE DETECTED |
|---|---|
| MOTION DATA | MOTION OF BODY AND FACE |
| GLOVE WITH SENSOR | MOTION OF HANDS |
| SENSOR TO BE WOUND AROUND NECK | MOTION OF NECK |
| IMAGE-BASED IMAGE PROCESSING | LINE OF SIGHT, CONTACT, DISTANCE |
| MICROPHONE | SOUND |
| INPUT INFORMATION TO SOUND GENERATOR | SOUND |
| ALCOHOL DETECTOR | ALCOHOL |
| THERMAL SENSOR | BODY TEMPERATURE |
| ... | ... |

FIG. 7

| | |
|---|---|
| PREDETERMINED MOTION OF AVATAR | MOTION TO LOOK AT PREDETERMINED OBJECT |
| | MOTION TO CONTACT WITH PREDETERMINED OBJECT |
| | PREDETERMINED EATING AND DRINKING MOTION |
| | PREDETERMINED HEARING OR LISTENING MOTION |
| | . . . |
| PREDETERMINED SITUATION THAT OCCURS ON AVATAR | SITUATION IN WHICH PREDETERMINED ARTICLE CONTACTS |
| | SITUATION THAT MEETS PREDETERMINED SITUATION |
| | SITUATION IN WHICH PREDETERMINED SOUND OCCURS |
| | INFORMATION CONCERNED WITH AVATAR |
| | . . . |
| | . . . |

FIG. 8

| INFORMATION CONCERNED WITH GIFT | CONDITION | | FACIAL EXPRESSION AND/OR POSE | |
|---|---|---|---|---|
| | INFORMATION CONCERNED WITH AVATAR | TIMING | FACIAL EXPRESSION (INCLUDING AREA) | POSE (INCLUDING AREA) |
| FACE CUTOUT PANEL | | PUT | DOG MOUTH | IN HALF-CROUCHING POSITION TO MEET LEVEL OF FACE CUTOUT OF PANEL |
| CAT EAR | | PUT | CAT MOUTH | |
| HOT SPRING TOWEL | | PUT | EYES IN HORIZONTAL LINE | |
| FINGER RING | | PUT | EYES IN HEART SHAPE | |
| POCKY | | PUT | CLOSED EYES AND RED CHEEKS | |
| BALLOON | | PUT | PUCKERING MOUTH | |
| MEAT GIFT | POSITION OF MOUTH OF AVATAR | POSITION OF MEAT GIFT AND POSITION OF MOUTH FALL WITHIN PREDETERMINED RANGE | DRIVELING AROUND MOUTH | |
| MEAT GIFT | POSITION OF HAND OF AVATAR | POSITION OF MEAT GIFT AND POSITION OF HAND FALL WITHIN PREDETERMINED RANGE | DRIVELING AROUND MOUTH | |

FIG. 9

| CONDITION | | | FACIAL EXPRESSION AND/OR POSE | |
|---|---|---|---|---|
| INFORMATION CONCERNED WITH GIFT | INFORMATION CONCERNED WITH AVATAR | TIMING | FACIAL EXPRESSION (INCLUDING AREA) | POSE (INCLUDING AREA) |
| GIFT WITH LEVEL 1 | | | CHANGE OF LINE OF SIGHT | |
| GIFT WITH LEVEL 5 | | | CHANGE OF LINE OF SIGHT AND EYEBROWS | |
| BALLOON GIFT | | INFLATE | PUCKERING MOUTH | |
| BALLOON GIFT | | BURST | SURPRISED FACIAL EXPRESSION | |
| CLOAK, SHIELD, SWORD | | PUT ON | BRAVE FACIAL EXPRESSION | |
| BANDAGE GIFT | | PUT ON | FACIAL EXPRESSION HAVING EYES WITH FLAMES | |
| SUNGLASS GIFT AFTER BANDAGE GIFT | | | LARGE EYES WITH FLAMES | |
| GHOST GIFT | WIMPY PERSONALITY | POSITION OF GHOST AND POSITION OF AVATAR FALL WITHIN PREDETERMINED DISTANCE RANGE | SCARY FACIAL EXPRESSION | |

FIG. 10

| EXAMPLE OF PREDETERMINED CONDITION | EXAMPLE OF PREDETERMINED FACIAL EXPRESSION AND/OR POSE |
|---|---|
| LOOK AT ANOTHER STREAMER | SURPRISED FACIAL EXPRESSION |
| LOOK AT SURPRISING ARTICLE | SURPRISED FACIAL EXPRESSION |
| HEAR SCREAM | FACIAL EXPRESSION WITH SCREAM |
| HEAR SOUND EFFECT "PING-PONG" INDICATING CORRECT ANSWER | FLASH FACIAL EXPRESSION |
| HEAR SOUND OF MUSICAL INSTRUMENT | SINGING FACIAL EXPRESSION |
| HEAR SOUND INDICATING APPEARANCE OF GHOST | SCARY FACIAL EXPRESSION |
| SHAKE HANDS | SMILE FACIAL EXPRESSION |
| DRINK ALCOHOL | FACIAL EXPRESSION WITH RED COMPLEXION |
| EAT FOOD | FACIAL EXPRESSION WITH MUNCHING MOUTH |
| SNIFF GOOD SMELL OF FLOWER | GOOD-MOOD FACIAL EXPRESSION |
| TURN PALE | PALE FACIAL EXPRESSION |
| ... | ... |

FIG. 11

| | CONDITION | FACIAL EXPRESSION AND/OR POSE | |
|---|---|---|---|
| | | FACIAL EXPRESSION (INCLUDING AREA) | POSE (INCLUDING AREA) |
| MOTION OF AVATAR | TUB DROPS ONTO HEAD | EYES IN CROSS SHAPE | |
| | LIGHTENING HITS | | BURNED AFTER ELECTRIC SHOCK CONDITION IS PERFORMED |
| LOOK AT ANOTHER AVATAR | ANOTHER AVATAR LOOKS | EYES IN HEART SHAPE | |
| | HEAD IS STROKED BY ANOTHER AVATAR | EYES IN HEART SHAPE | |
| LOOK AT GHOST CHARACTER | GHOST CHARACTER LOOKS | TURN PALE | |
| | ZOMBIE CHARACTER APPROACHES | VERTICAL LINES APPEAR ON FACE | |

GENERATING AVATAR INFORMATION RELATING TO AN AVATAR EXPRESSION OR POSE

CROSS-REFERENCE TO RELATED APPLICATIONS

The present application is a bypass continuation of PCT/JP2021/015347, filed Apr. 13, 2021, which claims priority to JP 2020-072287, filed Apr. 14, 2020, JP 2020-078079, filed Apr. 27, 2020, and JP 2020-093438, filed May 28, 2020, the contents of each is incorporated by reference in its entirety.

BACKGROUND

In recent years, a technology using avatars performed by streamers has been developing. In this technology, viewers are able to watch avatars performed by streamers via streaming services. Conventionally, a service using a technology to control the facial expressions and motions of avatar objects in accordance with the motions of performers or the like. With this service, a performer assigns in advance a facial expression or motion that is any one of many prepared facial expressions and motions, to each of a plurality of flick directions on the screen of a smartphone. When the performer flicks on the screen of the smartphone along a direction associated with a desired facial expression or motion, the performer is able to cause the avatar object displayed in a moving image to express the facial expression or motion.

However, with this technology, the performer needs to flick on the screen of the smartphone while speaking, so it is difficult for the performer to make the flick operation.

SUMMARY

In an exemplary implementation of the present application, a non-transitory computer readable medium storing computer executable instructions which, when executed by one or more processors, cause the one or more processors to perform a process including generating avatar information relating to an avatar expression or pose based on streamer data indicating a facial expression or pose of a streamer; acquiring gift information concerned with a gift of an object that is provided from a viewer to the streamer; determining whether the gift information satisfies a predetermined condition; in a case that the gift information is determined to satisfy the predetermined condition, rendering an avatar facial expression or pose using a predetermined facial expression or pose corresponding to the predetermined condition; and in a case that the gift information is determined to not satisfy the predetermined condition, rendering the avatar facial expression or pose using the avatar information generated based on the streamer data.

BRIEF DESCRIPTION OF THE DRAWINGS

FIG. 4 illustrates exemplary information concerned with a gift in accordance with the present disclosure;

FIG. 5 illustrates exemplary information concerned with a streamer in accordance with the present disclosure;

FIG. 6 illustrates exemplary detecting means and information to be detected in accordance with the present disclosure;

FIG. 7 illustrates exemplary pieces of informant to be acquired in accordance with the present disclosure;

FIG. 8 illustrates exemplary conditions and associated facial expressions and/or poses;

FIG. 9 illustrates other exemplary conditions and associated facial expressions and/or poses;

FIG. 10 illustrates exemplary relationships between predetermined conditions and predetermined facial expressions;

FIG. 11 illustrates relationships between predetermined conditions and predetermined facial expression;

DETAILED DESCRIPTION

Figure 1:
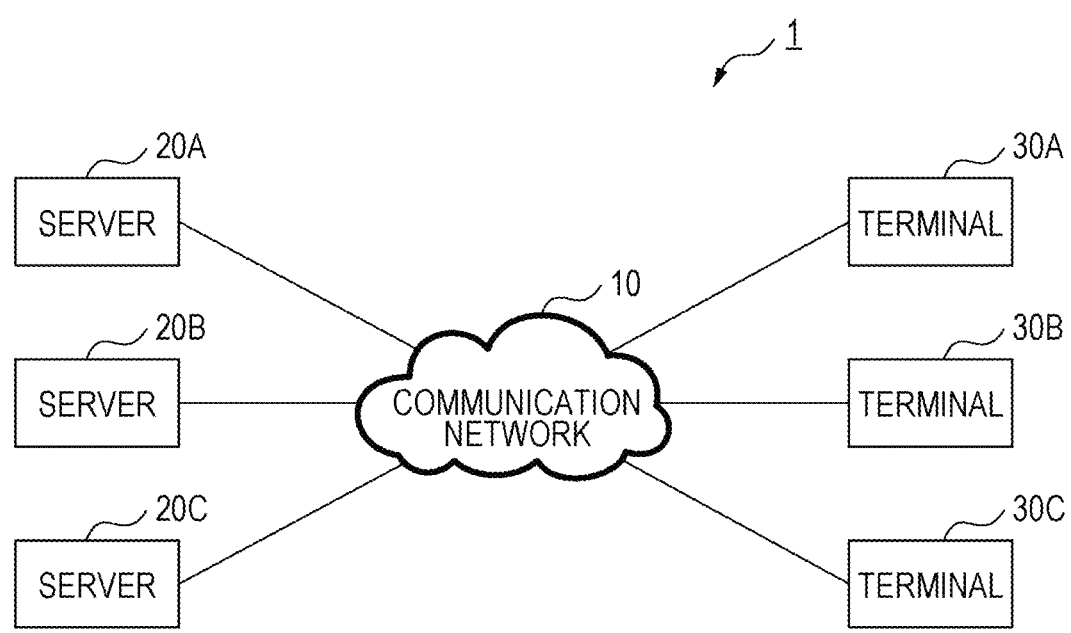
FIG. 1 illustrates a block diagram of an exemplary configuration of a system according to the present disclosure.

In an exemplary implementation of the present disclosure, a computer program according to an aspect, when executed by one or more processors, implements acquiring information concerned with a gift of an object, provided from a viewer to a streamer, determining whether the acquired information concerned with the gift satisfies a predetermined condition using information concerned with the gift, and, when it is determined that the acquired information concerned with the gift satisfies the predetermined condition, generating information for setting a facial expression or pose of an avatar concerned with the streamer, generated in advance in accordance with a facial expression or pose concerned with the streamer, to a predetermined facial expression or pose associated with the predetermined condition. The predetermined condition may include a condition that is satisfied when the avatar puts on the gift. The predetermined facial expression may be a facial expression of the same motif as the put-on gift. An area in which the predetermined facial expression activates may be the same area as a put-on area of the put-on gift. An area in which the predetermined facial expression activates may be an area different from a put-on area of the put-on gift.

The predetermined condition may include a condition that a position concerned with the avatar and a position concerned with the gift fall within a predetermined distance range. The position concerned with the avatar may be any one of a position of the avatar in a virtual space, an area in which the predetermined facial expression activates, a predetermined area of the avatar, and a collider of the avatar. The predetermined condition may use a priority concerned with the gift. The priority concerned with the gift may be a price of the gift, a display size of the gift, a level of the gift, and/or information concerned with a provider of the gift. The predetermined condition may use one of a plurality of types to which an avatar belongs. The predetermined facial expression may be a facial expression that is displayed by using a predetermined facial expression parameter or a facial expression parameter obtained by correcting a facial expression parameter based on a facial expression of the streamer in accordance with a predetermined rule.

The predetermined facial expression may change in synchronization with a direction in which the gift is displayed. The information concerned with the gift may include information on a start of display of the gift, information on a change of display of the gift, attribute information of the gift, and/or information on an end of display of the gift. The information concerned with the gift may include information concerned with a first gift and information concerned with a second gift, and the predetermined condition may be a combination of the information concerned with the first gift and the information concerned with the second gift, order of the information concerned with the first gift and the information concerned with the second gift, and/or information concerned with time between the first gift and the second gift. The information for setting the facial expression or pose of the avatar to the predetermined facial expression or pose may be generated without acquiring information to operate the avatar from the streamer terminal.

The information concerned with the gift may be acquired from the viewer terminal. The one or more processors may be provided in a viewer terminal. The one or more processors may be provided in a streamer terminal, and the facial expression or pose of the avatar may be set by using the generated information. The one or more processors may be provided in a streamer terminal, and an animation may be generated by setting the facial expression or pose of the avatar using the generated information. The one or more processors may be provided in a server, and the facial expression or pose of the avatar may be set by using the generated information. The one or more processors may be provided in a server, and a video may be generated by setting the facial expression or pose of the avatar using the generated information. The processors may be provided in one or some or all of a server, a viewer terminal, and a streamer terminal. Each of the processors may include a central processing unit (CPU), a microprocessor, or a graphics processing unit (GPU).

In another exemplary implementation of the present disclosure, a server includes one or more processors. The one or more processors execute computer-readable instructions to implement acquiring information concerned with a gift of an object, provided from a viewer to a streamer, determining whether the acquired information concerned with the gift satisfies a predetermined condition using the information concerned with the gift, and, when it is determined that the acquired information concerned with the gift satisfies the predetermined condition, generating information for setting a facial expression or pose of an avatar concerned with the streamer, generated in advance in accordance with a facial expression or pose concerned with the streamer, to a predetermined facial expression or pose associated with the predetermined condition. The predetermined condition may include a condition that is satisfied when the avatar puts on the gift.

In another exemplary implementation of the present disclosure, a method is executed by one or more processors that execute computer-readable instructions. The one or more processors execute the instructions to implement acquiring information concerned with a gift of an object, provided from a viewer to a streamer, determining whether the acquired information concerned with the gift satisfies a predetermined condition using the information concerned with the gift, and, when it is determined that the acquired information concerned with the gift satisfies the predetermined condition, generating information for setting a facial expression or pose of an avatar concerned with the streamer, generated in advance in accordance with a facial expression or pose concerned with the streamer, to a predetermined facial expression or pose associated with the predetermined condition. The predetermined condition may include a condition that is satisfied when the avatar puts on the gift.

In another exemplary implementation of the present disclosure, a viewer terminal includes one or more processors. The one or more processors execute computer-readable instructions to implement acquiring information concerned with a gift of an object, provided from a viewer to a streamer, determining whether the acquired information concerned with the gift satisfies a predetermined condition using the information concerned with the gift, and, when it is determined that the acquired information concerned with the gift satisfies the predetermined condition, generating information for setting a facial expression or pose of an avatar concerned with the streamer, generated in advance in accordance with a facial expression or pose concerned with the streamer, to a predetermined facial expression or pose associated with the predetermined condition.

In another exemplary implementation of the present disclosure, a streamer terminal includes one or more processors. The one or more processors execute computer-readable instructions to implement acquiring information concerned with a gift of an object, provided from a viewer to a streamer, determining whether the acquired information concerned with the gift satisfies a predetermined condition using the information concerned with the gift, and, when it is determined that the acquired information concerned with the gift satisfies the predetermined condition, generating information for setting a facial expression or pose of an avatar concerned with the streamer, generated in advance in accordance with a facial expression or pose concerned with the streamer, to a predetermined facial expression or pose associated with the predetermined condition.

In another exemplary implementation of the present disclosure, a computer program, when executed by one or more processors, causes the one or more processors to implement functions. The functions include detecting information concerned with one or more of a predetermined motion of a streamer, a facial expression of the streamer, a complexion of the streamer, a voice of the streamer, and a predetermined situation that occurs on the streamer, determining whether the detected information satisfies a predetermined condition, when it is determined that the predetermined condition is satisfied, generating information for setting a facial expression or pose of an avatar concerned with the streamer, generated in advance in accordance with a facial expression or pose concerned with the streamer, to a predetermined facial expression or pose associated with the predetermined condition, and displaying the avatar to which the predetermined facial expression or pose is applied.

In another exemplary implementation of the present disclosure, a computer program, when executed by one or more processors, causes the one or more processors to implement functions. The functions include detecting information concerned with one or more of a predetermined motion of a streamer, a facial expression of the streamer, a complexion of the streamer, a voice of the streamer, and a predetermined situation that occurs on the streamer, determining whether the detected information satisfies a predetermined condition, when it is determined that the predetermined condition is satisfied, generating information for setting a facial expression or pose of an avatar concerned with the streamer, generated in advance in accordance with a facial expression or pose concerned with the streamer, to a predetermined facial expression or pose associated with the predetermined condition, and sending the information for setting the facial expression or pose of the avatar to the predetermined facial expression or pose.

In another exemplary implementation of the present disclosure, a server includes one or more processors. The one or more processors execute computer-readable instructions to implement detecting information concerned with one or more of a predetermined motion of a streamer, a facial expression of the streamer, a complexion of the streamer, a voice of the streamer, and a predetermined situation that occurs on the streamer, determining whether the detected information satisfies a predetermined condition, when it is determined that the predetermined condition is satisfied, generating information for setting a facial expression or pose of an avatar concerned with the streamer, generated in advance in accordance with a facial expression or pose concerned with the streamer, to a predetermined facial expression or pose associated with the predetermined condition, and sending the information for setting the facial expression or pose of the avatar to the predetermined facial expression or pose.

In another exemplary implementation of the present disclosure, a method is executed by one or more processors that execute computer-readable instructions. The method includes detecting information concerned with one or more of a predetermined motion of a streamer, a predetermined condition of the streamer, a complexion of the streamer, a voice of the streamer, and a predetermined situation that occurs on the streamer, determining whether the detected information satisfies a predetermined condition, when it is determined that the predetermined condition is satisfied, generating information for setting a facial expression or pose of an avatar concerned with the streamer, generated in advance in accordance with a facial expression or pose concerned with the streamer, to a predetermined facial expression or pose associated with the predetermined condition, and displaying the avatar to which the predetermined facial expression or pose is applied.

In another exemplary implementation of the present disclosure, a method is executed by one or more processors that execute computer-readable instructions. The method includes detecting information concerned with one or more of a predetermined motion of a streamer, a predetermined condition of the streamer, a complexion of the streamer, a voice of the streamer, and a predetermined situation that occurs on the streamer, determining whether the detected information satisfies a predetermined condition, when it is determined that the predetermined condition is satisfied, generating information for setting a facial expression or pose of an avatar concerned with the streamer, generated in advance in accordance with a facial expression or pose concerned with the streamer, to a predetermined facial expression or pose associated with the predetermined condition, and sending the information for setting the facial expression or pose of the avatar to the predetermined facial expression or pose.

In another exemplary implementation of the present disclosure, a viewer terminal includes one or more processors. The one or more processors execute computer-readable instructions to implement detecting information concerned with one or more of a predetermined motion of a streamer, a predetermined condition of the streamer, a complexion of the streamer, a voice of the streamer, and a predetermined situation that occurs on the streamer, determining whether the detected information satisfies a predetermined condition, when it is determined that the predetermined condition is satisfied, generating information for setting a facial expression or pose of an avatar concerned with the streamer, generated in advance in accordance with a facial expression or pose concerned with the streamer, to a predetermined facial expression or pose associated with the predetermined condition, and displaying the avatar to which the predetermined facial expression or pose is applied.

In another exemplary implementation of the present disclosure, a streamer terminal includes one or more processors. The one or more processors execute computer-readable instructions to implement detecting information concerned with one or more of a predetermined motion of a streamer, a facial expression of the streamer, a complexion of the streamer, a voice of the streamer, and a predetermined situation that occurs on the streamer, determining whether the detected information satisfies a predetermined condition, when it is determined that the predetermined condition is satisfied, generating information for setting a facial expression or pose of an avatar concerned with the streamer, generated in advance in accordance with a facial expression or pose concerned with the streamer, to a predetermined facial expression or pose associated with the predetermined condition, and sending the information for setting the facial expression or pose of the avatar to the predetermined facial expression or pose.

In another exemplary implementation of the present disclosure, a computer program, when executed by one or more processors, implements acquiring information concerned with one or more of a predetermined motion of an avatar performed by a streamer, a facial expression of the avatar, a complexion of the avatar, a voice of the avatar, and a predetermined situation that occurs in relation to the avatar in a virtual space, determining whether the acquired information satisfies a predetermined condition, when it is determined that the predetermined condition concerned with the acquired information is satisfied, generating information for setting a facial expression or pose of the avatar concerned with the streamer, generated in advance in accordance with a facial expression or pose concerned with the streamer, to a predetermined facial expression or pose associated with the predetermined condition, and displaying the avatar to which the predetermined facial expression or pose is applied.

In another exemplary implementation of the present disclosure, a computer program, when executed by one or more processors, implements acquiring information concerned with one or more of a predetermined motion of an avatar performed by a streamer, a facial expression of the avatar, a complexion of the avatar, a voice of the avatar, and a predetermined situation that occurs in relation to the avatar in a virtual space, determining whether the acquired information satisfies a predetermined condition, when it is determined that the predetermined condition is satisfied, generating information for setting a facial expression or pose of the avatar concerned with the streamer, generated in advance in accordance with a facial expression or pose concerned with the streamer, to a predetermined facial expression or pose associated with the predetermined condition, and sending the information for setting the facial expression or pose of the avatar to the predetermined facial expression or pose.

In another exemplary implementation of the present disclosure, a server includes one or more processors. The one or more processors execute computer-readable instructions to implement acquiring information concerned with one or more of a predetermined motion of an avatar performed by a streamer, a facial expression of the avatar, a complexion of the avatar, a voice of the avatar, and a predetermined situation that occurs in relation to the avatar in a virtual space, determining whether the acquired information satisfies a predetermined condition, when it is determined that the predetermined condition is satisfied, generating information for setting a facial expression or pose of the avatar concerned with the streamer, generated in advance in accordance with a facial expression or pose concerned with the streamer, to a predetermined facial expression or pose associated with the predetermined condition, and sending the information for setting the facial expression or pose of the avatar to the predetermined facial expression or pose.

In another exemplary implementation of the present disclosure, a method is executed by one or more processors that execute computer-readable instructions. The method includes acquiring information concerned with one or more of a predetermined motion of an avatar performed by a streamer, a facial expression of the avatar, a complexion of the avatar, a voice of the avatar, and a predetermined situation that occurs in relation to the avatar in a virtual space, determining whether the acquired information satisfies a predetermined condition, when it is determined that the predetermined condition concerned with the acquired information is satisfied, generating information for setting a facial expression or pose of the avatar concerned with the streamer, generated in advance in accordance with a facial expression or pose concerned with the streamer, to a predetermined facial expression or pose associated with the predetermined condition, and displaying the avatar to which the predetermined facial expression or pose is applied.

In another exemplary implementation of the present disclosure, a method is executed by one or more processors that execute computer-readable instructions. The method includes acquiring information concerned with one or more of a predetermined motion of an avatar performed by a streamer, a facial expression of the avatar, a complexion of the avatar, a voice of the avatar, and a predetermined situation that occurs in relation to the avatar in a virtual space, determining whether the acquired information satisfies a predetermined condition, when it is determined that the predetermined condition is satisfied, generating information for setting a facial expression or pose of the avatar concerned with the streamer, generated in advance in accordance with a facial expression or pose concerned with the streamer, to a predetermined facial expression or pose associated with the predetermined condition, and sending the information for setting the facial expression or pose of the avatar to the predetermined facial expression or pose.

In another exemplary implementation of the present disclosure, a viewer terminal includes one or more processors. The one or more processors execute computer-readable instructions to implement acquiring information concerned with one or more of a predetermined motion of an avatar performed by a streamer, a facial expression of the avatar, a complexion of the avatar, a voice of the avatar, and a predetermined situation that occurs in relation to the avatar in a virtual space, determining whether the acquired information satisfies a predetermined condition, when it is determined that the predetermined condition concerned with the acquired information is satisfied, generating information for setting a facial expression or pose of the avatar concerned with the streamer, generated in advance in accordance with a facial expression or pose concerned with the streamer, to a predetermined facial expression or pose associated with the predetermined condition, and displaying the avatar to which the predetermined facial expression or pose is applied.

In another exemplary implementation of the present disclosure, a streamer terminal includes one or more processors. The one or more processors execute computer-readable instructions to implement acquiring information concerned with one or more of a predetermined motion of an avatar performed by a streamer, a facial expression of the avatar, a complexion of the avatar, a voice of the avatar, and a predetermined situation that occurs in relation to the avatar in a virtual space, determining whether the acquired information satisfies a predetermined condition, when it is determined that the predetermined condition is satisfied, generating information for setting a facial expression or pose of the avatar concerned with the streamer, generated in advance in accordance with a facial expression or pose concerned with the streamer, to a predetermined facial expression or pose associated with the predetermined condition, and sending the information for setting the facial expression or pose of the avatar to the predetermined facial expression or pose.

The specification will be described in the sense of typical various embodiments that are not intended to be limited by any method.

As will be used in the application, singular words, that is, "one", "the", "the above-described", "this", and "that", may include plural words unless otherwise clearly specified. The word "include" can mean "equip" or "has". The words "coupled", "coupling", "tied", "tying", "connected", and "connecting" include mechanical, electrical, magnetic, and optical methods of coupling, connecting, or tying objects to each other together with other methods, and do not exclude the presence of an intermediate element between objects coupled, coupling, tied, tying, connected, or connecting in this way.

Various systems, methods, and apparatuses, described in the specification, should not be interpreted as limited ones even by any method. Actually, the present disclosure is directed to all new features and modes of various disclosed embodiments, combinations of these various embodiments, and combinations of parts of these various embodiments. Various systems, methods, and apparatuses described in the specification are not limited to specific modes, specific features, or combinations of such specific modes and specific features, and articles and methods described in the specification are not intended to request to provide one or more specific advantageous effects or to solve inconveniences. Furthermore, various features or modes of various embodiments described in the specification or one or some of such features or modes can be used in combination with each other.

The operations of some methods of various methods described in the specification will be described along a specific sequence for the sake of convenience; however, a description based on such a technique should be understood to include rearrangement of the sequence of the operations, unless otherwise a specific sequence is requested by the following specific sentence. For example, a plurality of operations described in order is rearranged or executed at the same time in some cases. Furthermore, for the sake of simplification, the attached drawings do not show various methods in which various items and methods described in the specification can be used with other items and methods.

In addition, the specification may use words, that is, "create", "generate", "display", "receive", "evaluate", and "stream". These words are high-level description of actual various operations to be executed. Actual various operations corresponding to these words can change depending on specific implementations, and can be easily recognized by persons skilled in the art that have a benefit of the disclosure of the specification.

The theory of operation, scientific principle, or other theoretical description provided in the specification in relation to the apparatuses or methods of the present disclosure are provided for the purpose of better understanding and are not intended to limit the technical scope. The apparatuses and methods in the appended claims are not limited to apparatuses and methods that operate in accordance with methods described in such a theory of operation.

Each of the various methods described in the specification can be implemented by using a plurality of computer-executable instructions stored in one or more computer-readable media (non-transitory computer-readable storage media, such as one or more optical medium discs, a plurality of volatile memory components, and a plurality of nonvolatile memory components) and can be executed in a computer. Here, the plurality of volatile memory components include, for example, DRAMs or SRAMs. Examples of the nonvolatile memory components include a hard disk drive and a solid state drive (SSD). Examples of the computer include any computer available in the market, including a smartphone and another mobile device having hardware for calculation.

Each of a plurality of such computer-executable instructions for implementing the technology described in the specification can be stored in one or more computer-readable media (for example, non-transitory computer-readable storage media) together with selected data generated and used during implementations of various embodiments described in the specification. A plurality of instructions executed by such a computer can be, for example, part of an individual software application or part of a software application accessed or downloaded via a web browser or another software application (such as a remote calculation application). Such software can be executed in, for example, a single local computer (serving as an agent to be executed in any suitable computer available in the market) or in a network environment (for example, the Internet, a wide area network, a local area network, a client server network (such as a cloud calculation network), or such other networks) by using one or more network computers.

For the sake of clarification, only specifically selected various modes of various software-based implementations are described. Other detailed matters known in this field are omitted. For example, the technology described in the specification is not limited to a specific computer language or a program. For example, the technology described in the specification can be executed by software written in C, C++, Java, or any other suitable programming languages. Similarly, the technology described in the specification is not limited to a specific computer or hardware of a specific type. Specific detail items of a suitable computer and hardware are known and do not need to be described in detail in the specification.

Each of such software-based various embodiments (including, for example, a plurality of computer-executable instructions for causing a computer to execute any one of various methods described in the specification) can be uploaded, downloaded, or accessed in a remote mode by suitable communication means. Examples of such suitable communication means include the Internet, a world wide web, an intranet, a software application, a cable (including an optical fiber cable), magnetic communication, electromagnetic communication (including RF communication, micro-wave communication, and infrared communication), electronic communication, and other such communication means.

A web page includes, for example, an HTML document and, in some examples, includes an HTML document with encoded executable code, such as JavaScript and PHP code.

Hereinafter various embodiments of the present invention will be described with reference to the attached drawings. It should be noted that some components in a drawing may be omitted in another drawing for the sake of convenience of illustration. Furthermore, it should be noted that the attached drawings disclose one embodiment of the invention of the application and are not always drawn to accurate scale. In the application document, an object indicated by the word application may be software or a program, and can be a combination of commands to be issued to a computer so that a result is able to be obtained.

1. EXAMPLE OF SYSTEM

FIG. 1 is a block diagram showing an exemplary configuration of a system according to the present disclosure. As shown in FIG. 1, the system 1 may include one or more servers 20 connected to a communication network 10, and one or more terminals 30 connected to the communication network 10. In FIG. 1, three servers 20A to 20C are illustrated as examples of the server 20, and three terminals 30A to 30C are illustrated as examples of the terminal 30. One or more servers 20 other than these servers 20 can be connected to the communication network 10 as servers 20, and one or more terminals 30 other than these terminals 30 can be connected to the communication network 10 as terminals 30. In the application document, the term "system" can be used a word that indicates both a server and a terminal or a server only or a terminal only. In other words, the system may be any one of the modes, that is, only a server, only a terminal, and both a server and a terminal.

The system may be an information processing apparatus on a cloud. The system may make up a virtual information processing apparatus and may make up a logically one information processing apparatus. An owner and a manager of the system may be different from each other.

The communication network 10 may be a mobile telephone network, a wireless LAN, a fixed telephone network, the Internet, an intranet, Ethernet (registered trademark), and/or combinations of them; however, the communication network 10 is not limited thereto. In the communication network 10, various pieces of data disclosed in the application document may be communicated.

The communication network 10 may include a mobile telephone network, a wireless network (for example, RF connection via Bluetooth, WiFi (such as IEEE 802.11a/b/n), WiMax, cellular, satellite, laser, or infrared), a fixed telephone network, the Internet, an intranet, a local area network (LAN), a wide area network (WAN), and/or an Ethernet network, and is not limited thereto.

The server 20 may run an installed specific application to execute operations or the like, that is, acquiring information concerned with a gift of an object, provided from a viewer to a streamer, determining whether the acquired information concerned with the gift satisfies a predetermined condition using the information concerned with the gift, and, when it is determined that the acquired information concerned with the gift satisfies the predetermined condition, generating information for setting a facial expression or pose of an avatar concerned with the streamer, generated in advance in accordance with a facial expression or pose concerned with the streamer, to a predetermined facial expression or pose associated with the predetermined condition.

The server 20 may run an installed specific application to execute operations or the like, that is, detecting information concerned with one or more of a predetermined motion of a streamer, a predetermined condition of the streamer, a complexion of the streamer, a voice of the streamer, and a predetermined situation that occurs on the streamer, determining whether the detected information satisfies a predetermined condition, when it is determined that the predetermined condition is satisfied, generating information for setting a facial expression or pose of the avatar concerned with the streamer, generated in advance in accordance with a facial expression or pose concerned with the streamer, to a predetermined facial expression or pose associated with the predetermined condition, and displaying the avatar to which the predetermined facial expression or pose is applied.

The server 20 may run an installed specific application to execute operations or the like, that is, acquiring information concerned with one or more of a predetermined motion of an avatar performed by a streamer, a facial expression of the avatar, a complexion of the avatar, a voice of the avatar, and a predetermined situation that occurs in relation to the avatar in a virtual space, determining whether the acquired information satisfies a predetermined condition, and, when it is determined that the predetermined condition is satisfied, generating information for setting a facial expression or pose of the avatar concerned with the streamer, generated in advance in accordance with a facial expression or pose concerned with the streamer, to a predetermined facial expression or pose associated with the predetermined condition.

Alternatively, the terminal 30 may execute an installed web browser or specific application to execute operations or the like, that is, acquiring information concerned with a gift of an object, provided from a viewer to a streamer, determining whether the acquired information concerned with the gift satisfies a predetermined condition using the information concerned with the gift, and, when it is determined that the acquired information concerned with the gift satisfies the predetermined condition, generating information for setting a facial expression or pose of the avatar concerned with the streamer, generated in advance in accordance with a facial expression or pose concerned with the streamer, to a predetermined facial expression or pose associated with the predetermined condition.

The terminal 30 may execute an installed web browser or specific application to execute operations or the like, that is, detecting information concerned with one or more of a predetermined motion of a streamer, a predetermined condition of the streamer, a complexion of the streamer, a voice of the streamer, and a predetermined situation that occurs on the streamer, determining whether the detected information satisfies a predetermined condition, when it is determined that the predetermined condition is satisfied, generating information for setting a facial expression or pose of an avatar concerned with the streamer, generated in advance in accordance with a facial expression or pose concerned with the streamer, to a predetermined facial expression or pose associated with the predetermined condition, and displaying the avatar to which the predetermined facial expression or pose is applied.

Alternatively, the terminal 30 may run an installed web browser or specific application to execute operations or the like, that is, acquiring information concerned with one or more of a predetermined motion of an avatar performed by a streamer, a facial expression of the avatar, a complexion of the avatar, a voice of the avatar, and a predetermined situation that occurs in relation to the avatar in a virtual space, determining whether the acquired information satisfies a predetermined condition, and, when it is determined that the predetermined condition is satisfied, generating information for setting a facial expression or pose of the avatar concerned with the streamer, generated in advance in accordance with a facial expression or pose concerned with the streamer, to a predetermined facial expression or pose associated with the predetermined condition.

The terminal 30 may be a selected terminal capable of performing such operations. The terminal 30 may be a smartphone, a tablet terminal, a mobile phone (feature phone), and/or a personal computer; however, the terminal 30 is not limited thereto.

2. HARDWARE CONFIGURATION OF EACH DEVICE

Next, an example of the hardware configuration of the server 20 will be described.

2-1. Hardware Configuration of Server 20

Figure 2:
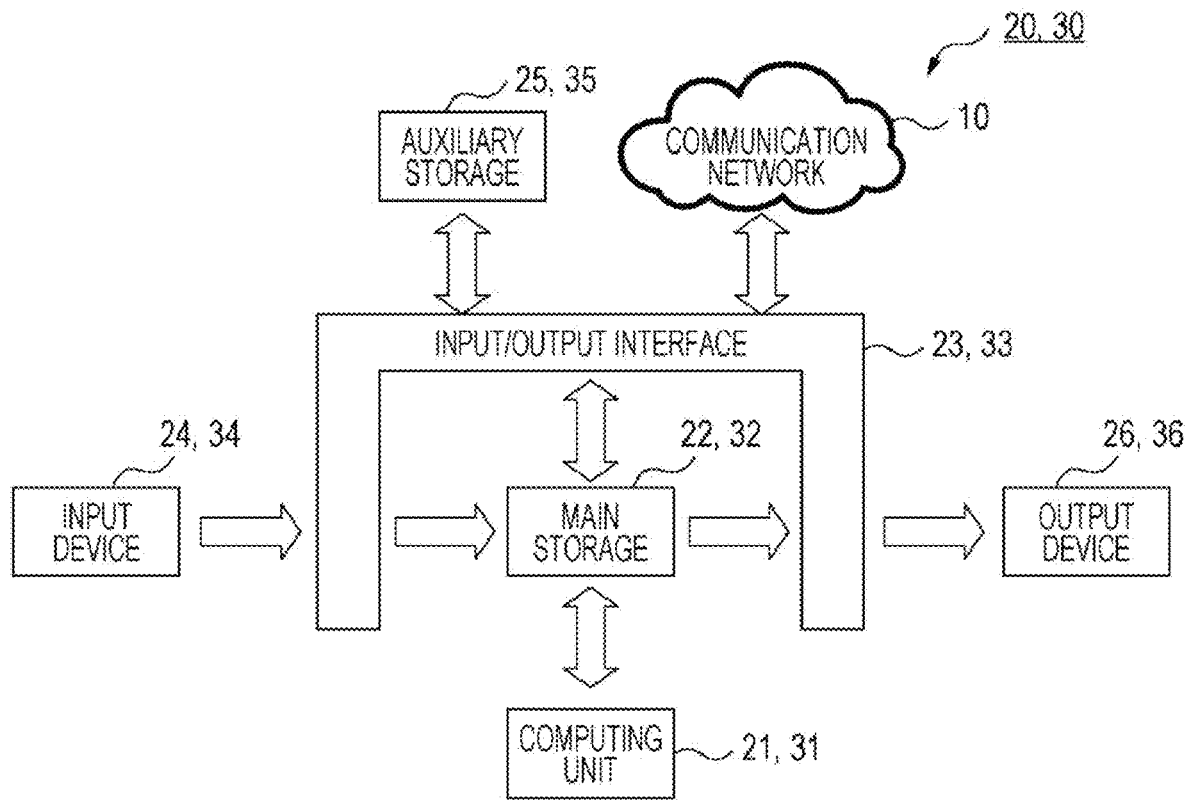
FIG. 2 illustrates a schematic block diagram of an exemplary hardware configuration of the server and the terminal.

An example of the hardware configuration of the server 20 will be described with reference to FIG. 2. FIG. 2 is a schematic block diagram of an exemplary hardware configuration of server 20 and terminal 30 shown in FIG. 1.

As shown in FIG. 2, the server 20 can mainly include a computing unit 21, a main storage 22, and an input/output interface 23. The server 20 may further include an input device 24 and an auxiliary output device 26. These devices may be connected by a data bus and/or a control bus.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The computing unit 21 performs a computation by using instructions and data stored in the main storage 22 and causes the main storage 22 to store the computation results. The computing unit 21 is able to control the input device 24, the auxiliary storage 25, the output device 26, and the like via the input/output interface 23. The server 20 may include one or more computing units 21. The computing unit 21 may include one or more central processing units (CPUs), one or more microprocessors, and/or one or more graphics processing units (GPU). In an exemplary implementation, computing unit 21 may include processing circuitry.

The main storage 22 has a storage function. The main storage 22 is able to store instructions and data received via the input/output interface 23 and computation results of the computing unit 21 from the input device 24, the auxiliary storage 25, the communication network 10, and the like (server 20 and the like). The main storage 22 may include, but not limited to, a random access memory (RAM), a read only memory (ROM), a flash memory, and/or the like.

The main storage 22 may include, but not limited to, a computer-readable medium, such as a volatile memory (for example, a register, a cache, or a random access memory (RAM)), a nonvolatile memory (for example, a read only memory (ROM), an EEPROM, or a flash memory), and a storage (for example, a hard disk drive (HDD), a solid state drive (SSD), a magnetic tape, or an optical medium). As will be easily understood, the term "computer-readable storage medium" may include not a transmission medium, such as a modulated data signal, that is, a temporary signal, but a medium for data storage, such as a memory and a storage.

The auxiliary storage 25 is a storage device. The auxiliary storage 25 may store instructions and data (computer program) that make up the specific application, a web browser, or the like and may be controlled by the computing unit 21 to load these instructions and data (computer program) onto the main storage 22 via the input/output interface 23. The auxiliary storage 25 may be a magnetic disk drive and/or an optical disk drive, a file server, or the like, and is not limited thereto.

The input device 24 is a device that takes in data from an outside and may be a touch panel, a button, a keyboard, a mouse, a sensor, and/or the like.

The output device 26 may include, but not limited to, a display, a touch panel, a printer, and/or the like. The input device 24 and the output device 26 may be integrated.

With the above hardware configuration, the computing unit 21 may be able to control the output device 26 via the input/output interface 23 by sequentially loading instructions and data (computer program) that make up a specific application stored in the auxiliary storage 25 onto the main storage 22 and computing the loaded instructions and data or send and receive various pieces of information to and from another device (for example, the server 20, another terminal 30, or the like) via the input/output interface 23 and the communication network 10.

The server 20 may include the above-described configuration and run an installed specific application to execute one or some or all of operations and the like (including various operations described in detail later) defined as follows. The operations and the like include acquiring information concerned with a gift of an object, provided from a viewer to a streamer, determining whether the acquired information concerned with the gift satisfies a predetermined condition using the information concerned with the gift, and, when it is determined that the acquired information concerned with the gift satisfies the predetermined condition, generating information for setting a facial expression or pose of an avatar concerned with the streamer, generated in advance in accordance with a facial expression or pose concerned with the streamer, to a predetermined facial expression or pose associated with the predetermined condition. The server 20 may include the above-described configuration and run an installed specific application to execute one or some or all of operations and the like (including various operations described in detail later) defined as follows. The operations and the like include detecting information concerned with one or more of a predetermined motion of a streamer, a predetermined condition of the streamer, a complexion of the streamer, a voice of the streamer, and a predetermined situation that occurs on the streamer, determining whether the detected information satisfies a predetermined condition, when it is determined that the predetermined condition is satisfied, generating the information for setting a facial expression or pose of an avatar concerned with the streamer, generated in advance in accordance with a facial expression or pose concerned with the streamer, to a predetermined facial expression or pose associated with the predetermined condition, and displaying the avatar to which the predetermined facial expression or pose is applied. The server 20 may include the above-described configuration and run an installed specific application to execute one or some or all of operations and the like (including various operations described in detail later) defined as follows. The operations and the like include acquiring information concerned with one or more of a predetermined motion of an avatar performed by a streamer, a facial expression of the avatar, a complexion of the avatar, a voice of the avatar, and a predetermined situation that occurs in relation to the avatar in a virtual space, determining whether the acquired information satisfies a predetermined condition, and, when it is determined that the predetermined condition is satisfied, generating information for setting a facial expression or pose of the avatar concerned with the streamer, generated in advance in accordance with a facial expression or pose concerned with the streamer, to a predetermined facial expression or pose associated with the predetermined condition. The operations and the like may be performed when a user issues an instruction to the system of an example of the invention disclosed in the application document by using the input device 24 or an input device 34 concerned with the terminal 30 (described later). When the program is running on the computing unit 21, display may be performed by the output device 26 of the server 20 serving as the system that the user uses or display may be performed by an output device 36 of the terminal 30 serving as the system that the user uses.

2-2. Hardware Configuration of Terminal 30

An example of the hardware configuration of the terminal 30 will be described also with reference to FIG. 2. For example, the same hardware configuration as the above-described hardware configuration of each server 20 can be used as the hardware configuration of each terminal 30. Therefore, some reference signs associated with components of each terminal 30 are shown in FIG. 2.

As shown in FIG. 2, each terminal 30 can mainly include a computing unit 31, a main storage 32, an input/output interface 33, the input device 34, an auxiliary storage 35, and the output device 36. These devices are connected by a data bus and/or a control bus.

Each of the computing unit 31, the main storage 32, the input/output interface 33, the input device 34, the auxiliary storage 35, and the output device 36 may be substantially the same as the computing unit 21, the main storage 22, the input/output interface 23, the input device 24, the auxiliary storage 25, and the output device 26 included in each of the above-described servers 20. The capacities and capabilities of the computing units and the storage devices may vary. Particularly, the input device 34 and the output device 36 will be described in detail below. In an exemplary implementation, computing unit 31 may include processing circuitry.

With the above hardware configuration, the computing unit 31 may be able to control the output device 36 via the input/output interface 33 by sequentially loading instructions and data (computer program) that make up a specific application stored in the auxiliary storage 35 onto the main storage 32 and computing the loaded instructions and data or send and receive various pieces of information to and from another device (for example, the server 20, or the like) via the input/output interface 33 and the communication network 10.

The terminal 30 may include the above configuration and be able to execute one or some or all of operations and the like (including various operations (described in detail later)). The operations and the like include moving a position of at least one gift by a transparent physical object on a virtual space between a subject and a camera that captures the image of the subject, and increasing an area of display of the subject, of which the image is captured by the camera, as a result of movement of the position of the gift. The terminal 30 may include the above-described configuration and be able to execute one or some or all of operations and the like (including various operations described in detail later). The operations and the like include detecting information concerned with one or more of a predetermined motion of a streamer, a predetermined condition of the streamer, a complexion of the streamer, a voice of the streamer, and a predetermined situation that occurs on the streamer, determining whether the detected information satisfies a predetermined condition, when it is determined that the predetermined condition is satisfied, generating information for setting a facial expression or pose of an avatar concerned with the streamer, generated in advance in accordance with a facial expression or pose concerned with the streamer, to a predetermined facial expression or pose associated with the predetermined condition, and displaying the avatar to which the predetermined facial expression or pose is applied. The terminal 30 may include the above-described configuration and be able to execute one or some or all of operations and the like (including various operations described in detail later). The operations and the like include acquiring information concerned with one or more of a predetermined motion of an avatar performed by a streamer, a facial expression of the avatar, a complexion of the avatar, a voice of the avatar, and a predetermined situation that occurs in relation to the avatar in a virtual space, determining whether the acquired information satisfies a predetermined condition, and, when it is determined that the predetermined condition is satisfied, generating information for setting a facial expression or pose of the avatar concerned with the streamer, generated in advance in accordance with a facial expression or pose concerned with the streamer, to a predetermined facial expression or pose associated with the predetermined condition. By running an installed web browser, the terminal 30 is able to execute similar operations by receiving and displaying a web page from the server 20. The operations and the like may be performed when a user issues an instruction to the system of an example of the invention disclosed in the application document by using the input device 34. When the program is running on the computing unit 31, display may be performed by the output device 36 of the terminal 30 serving as the system that the user uses.

In the application document, the terminal may be a terminal of two types, that is, "streamer terminal" and "viewer terminal". These may be names assigned to the roles of terminals. One terminal may be sometimes a viewer terminal and may be sometimes a streamer terminal. Alternatively, one terminal may be a viewer terminal and a streamer terminal at the same time. A streamer terminal may be a terminal used by a streamer that is a person who appears as a subject, such as an avatar, in a content to be streamed. The streamer may also be referred to as a content distributor, a person distributing video content to viewers on viewing terminals. On the other hand, a viewer terminal may be mainly a terminal used by a viewer that is a person who watches a content being streamed. A viewer may also have a certain influence on a content to be streamed in such a manner that the viewer performs gifting action to provide a gift to a subject, such as an avatar, to cause the gift to appear in a content to be streamed. Similarly, a viewer may have a certain influence on a content to be streamed in form of voice, comment, or the like. A content to be streamed may be a moving image, a video, or an animation, and can be any content in which a subject, such as an avatar performed by a streamer, appears in part of these contents. The above description is only an example in which one embodiment of the invention of the present application is applied, and the embodiments according to the invention of the application may be applied also in a virtual space in which a subject not assumed as described above appears. In the application document, an animation may be a virtual reality or may be an augmented reality.

A viewer terminal may be configured to be able to perform input of a voice, input of a comment, gifting, and the like as described above. For example, a user terminal may have a keyboard, a touch panel, or the like that allow input of a comment and acquisition of a comment that is text information as the input device 34. A user terminal may have the function of generating a certain comment and gift with the computing unit 31. These acquired comment and gift may be similarly sent to the communication network 10 via the input/output interface 33. These comment and gift may be used to generate a content to be streamed.

A comment according to an embodiment of the invention of the application may be automatically generated by the system, in addition to a comment input through a user terminal. The comment may be sent to a user terminal and displayed on the user terminal.

The terminal may include a microphone capable of acquiring sound as the input device 34. A human voice may be acquired by a microphone serving as the input device 34 and handled as sound. A human voice may be acquired by a microphone serving as the input device 34 and then converted into text by speech recognition by the computing unit 31, and may be handled as a comment. A user terminal may generate sound with the computing unit 31. These acquired sound or comment may be similarly sent to the communication network 10 via the input/output interface 33.

On the other hand, a streamer terminal may include a motion sensor capable of detecting the motion of a human as the input device 34. The motion sensor may be put on the body of a streamer and may have a function capable of detecting the motion of each part of the body. The parts of the body can include various locations, such as head, face, upper arm, forearm, hand, thigh, lower leg, foot, and trunk; however, the parts of the body are not limited to one or some or all of them. The motion sensor may be the one put on at a position where the motion of the body is able to be detected. A facial expression or pose of a streamer may be tracked by the sensor to generate the facial expression or the pose as information. The motion sensor may include an acceleration sensor, a gyro sensor, a magnetic field sensor, or the like. These acquired pieces of information may be similarly sent to the communication network 10 via the input/output interface 33.

A streamer terminal may include a camera capable of capturing a moving image as the input device 34. The camera may capture the head, face, eyes, part of the body, whole body, or the like of a streamer. The camera may be able to detect the direction of a face when the image of the head or the face is captured. The camera may be able to detect a facial expression when the image of the face is captured. The camera may be able to detect a line of sight when the image of the eyes is captured. The camera may be able to detect the motion of the body together with or instead of the above-described motion sensor when the image of part of the body or the whole body is captured. The acquired information on the face direction, line of sight, facial expression, and the motion of the body, based on these pieces of image capture information may be similarly sent to the communication network 10 via the input/output interface 33.

The output device 36 of each of a viewer terminal and a streamer terminal may be a display or a sound generator. The display may be various as long as the display has a display function. Examples of the display include a liquid crystal display, a plasma display, an organic EL display, a micro LED display, and a head-mounted display; however, the display is not limited thereto. Examples of the sound generator may include a speaker, a headphone, and an earphone. The information to be output by the output device 36 may be information generated in the computing unit 31 or may be information received from the communication network 10. A streamer terminal may be a studio device exclusively including a sensor that acquires information on a performer to perform. In this case, it is advantageous to make it possible to further accurately acquire information on a performer. A streamer may include a performer that performs an avatar.

3. FUNCTIONS OF EACH DEVICE

Figure 3:
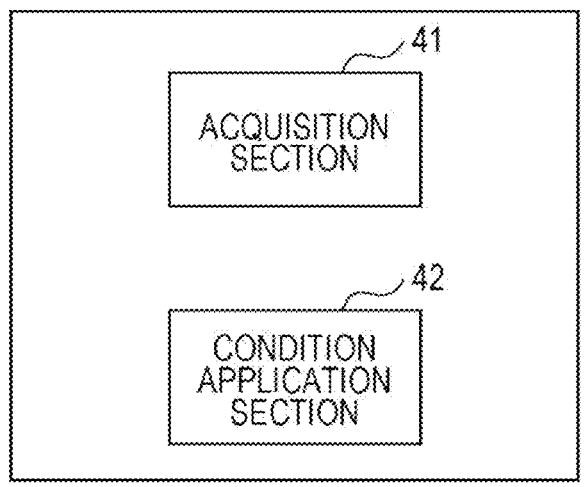
FIG. 3 illustrates a schematic block diagram of an exemplary functional configuration of the system.

Next, an example of the functions of each of the server 20 and the terminal 30 will be described with reference to FIG. 3. FIG. 3 is a schematic block diagram of an exemplary functional configuration of the system 1 shown in FIG. 1. As shown in FIG. 3, the system of one example may include an acquisition section 41 that acquires information used to generate an object, and a condition application section 42 that generates a physical object by using the acquired information. The processing circuitry discussed above with respect to the components of system 1 may perform the functions and processes of the acquisition section 41 and the condition application section 42.

2.1. Acquisition Section 41

The acquisition section 41 has the function of acquiring information used to determine whether to apply a predetermined condition (described later).

Information to be acquired by the acquisition section 41 may include information concerned with one or more gifts and/or information concerned with an avatar, for a gift of an object, provided from a viewer to a streamer.

FIG. 4 illustrates exemplary information concerned with a gift. The information concerned with a gift may include a priority concerned with the gift, a position concerned with the gift, an attribute of the gift, information identifying an avatar to which the gift is provided, and/or information concerned with a plurality of the gifts.

The information concerned with an avatar may include a position concerned with the avatar, a type of the avatar, a facial expression parameter concerned with the avatar, a motion concerned with the avatar, and/or a situation concerned with the avatar. Here, when the avatar to which the gift is provided is identified, the information concerned with the avatar may be information concerned with the identified avatar to which the gift is provided. On the other hand, when an avatar to which a gift is provided is not identified, one or more avatars that are all the avatars in a virtual space or may be one or more avatars that are one or some of the avatars appearing in the virtual space.

The specific contents of these pieces of information concerned with a gift and information concerned with an avatar will be described in the condition application section.

When a gift is provided to a specific avatar, the acquisition section 41 may acquire information identifying the avatar to which the gift is provided.

FIG. 5 illustrates exemplary information concerned with a streamer. The information may be acquired by the acquisition section 41 discussed above. The information may include one or more of a predetermined motion of a streamer, a facial expression of the streamer, a complexion of the streamer, a voice of the streamer, and a predetermined situation that occurs on the streamer (in the application document, which may be referred to as a predetermined motion or the like). The information to be acquired by the acquisition section 41 may be information detected by the information processing apparatus to which the system according to an embodiment of the invention of the application is connected or information based on the detected information.

The detected information may be information according to a detector that detects the information. These detected pieces of information may be acquired in the acquisition section 41 as it is, or associated information according to a predetermined threshold or range for detected specific measurement information may be acquired in the acquisition section 41. The detected information may be information on the motion of motion data, information on the amount of alcohol, detected by an alcohol detector, temperature information of a thermal sensor, or the like. The associated information for these pieces of specific measurement information may be information adapted to the predetermined condition according to an embodiment of the invention of the application, such as information of a specific facial expression or a specific motion on motion data, and information on the amount of alcohol intake to the amount of alcohol. The specific contents of these pieces of information to be acquired by the acquisition section 41 will be described in the condition application section.

Here, a detection technique may be various techniques. For example, the detected information may include information detected by image processing using an image captured by one or more image capture apparatuses that capture the image of the streamer. The information to be acquired by image processing may be, for example, obtained by detecting a blend shape based on motion data. The detected information may be obtained by detecting sound with a microphone that acquires a voice in a room in which a streamer is present or detecting sound by detecting operation of a sound generator operated by a streamer. The motions of the hands and arms of a streamer may be detected by using the motions of sensors put on the hands and the arms or an eating motion and a drinking motion may be detected by detecting the motion of a neck by using a sensor in a shape of winding around the neck. The drinking motion of a streamer may be detected by an alcohol detector. The system according to the application may be connected to these detectors and detect information on the motion or the like of a streamer. A streamer may include a performer that is able to operate an avatar.

FIG. 6 illustrates exemplary detecting means and information to be detected in accordance with the present disclosure.

The information to be acquired by the acquisition section 41 may include information concerned with one or multiple of a predetermined motion of an avatar performed by a streamer, a facial expression of the avatar, a complexion of the avatar, a voice of the avatar, and a predetermined situation that occurs on the avatar in a virtual space (in the application document, which may be referred to as a predetermined motion or the like).

The specific contents of these pieces of information to be acquired by the acquisition section 41 will be described in the condition application section. FIG. 7 illustrates exemplary pieces of information to be acquired by the acquisition section 41.

The information processing apparatus from which the acquisition section 41 acquires information may be the same as the information processing apparatus having the function of the acquisition section 41 or may be different from the information processing apparatus. The word "acquisition" may be a superordinate concept of the meaning of receiving information from another information processing apparatus, may be a superordinate concept of the meaning of reading information from a storage device, may be a superordinate concept of the meaning of receiving information from another program via a storage device, or may be a superordinate concept of the meaning that the information processing apparatus detects.

2.2. Condition Application Section

The condition application section 42 may have the function of determining whether the information concerned with the acquired gift satisfies the predetermined condition using the information concerned with the gift, and, when it is determined that the acquired information concerned with the gift satisfies the predetermined condition, generating information for setting a facial expression or pose of an avatar concerned with the streamer, generated in advance in accordance with a facial expression or pose concerned with the streamer, to a predetermined facial expression or pose associated with the predetermined condition.

The condition application section 42 may have the function of determining whether the detected information satisfies the predetermined condition, and, when the condition application section 42 determines that the predetermined condition is satisfied, generating information for setting a facial expression or pose of an avatar concerned with the streamer, generated in advance in accordance with a facial expression or pose concerned with the streamer, to a predetermined facial expression or pose associated with the predetermined condition.

The condition application section 42 may have the function of determining whether the acquired information satisfies the predetermined condition, and, when the condition application section 42 determines that the predetermined condition concerned with the acquired information is satisfied, generating information for setting a facial expression or pose of an avatar concerned with the streamer, generated in advance in accordance with a facial expression or pose concerned with the streamer, to a predetermined facial expression or pose associated with the predetermined condition.

Here, generating information for setting a facial expression or pose of an avatar concerned with the streamer, generated in advance in accordance with a facial expression or pose concerned with the streamer, to a predetermined facial expression or pose associated with the predetermined condition may be, when the predetermined condition is satisfied, 1) generating only information for setting a facial expression of an avatar concerned with the streamer, generated in advance in accordance with a facial expression concerned with the streamer, to a predetermined facial expression associated with the predetermined condition, 2) generating only information for setting a pose of an avatar concerned with the streamer, generated in advance in accordance with a pose concerned with the streamer, to a predetermined pose associated with the predetermined condition, or 3) generating information for setting a facial expression and a pose of an avatar associated with the streamer, respectively generated in accordance with a facial expression and a pose concerned with the streamer, to a predetermined facial expression and a predetermined pose associated with the predetermined condition. In the application document, a predetermined facial expression and/or a predetermined pose, identified in association with the predetermined condition, can be referred to as predetermined facial expression or the like, and a facial expression and/or a pose can be referred to as facial expression or the like.

The predetermined facial expression or the like may be 1) a facial expression displayed by using a predetermined facial expression parameter or a facial expression parameter obtained by correcting a facial expression parameter based on a facial expression of a streamer in accordance with a predetermined rule, 2) a facial expression displayed in accordance with setting of a predetermined shape or motion, 3) a pose displayed by using a predetermined pose parameter or a pose parameter obtained by correcting a pose parameter based on a pose of a streamer in accordance with a predetermined rule, or 4) a pose displayed in accordance with setting of a predetermined shape or motion. Here, the predetermined facial expression parameter may indicate a plurality of parameters that have influence on the motion of each area of the face and may indicate one facial expression by setting each of the plurality of parameters to a predetermined value. The one or more parameters can be parameters that have influence on the motion of each area of the face. Each parameter may be a parameter on a specific area of the face, or each parameter may be a parameter on the overall face (or part of the face) but the shape of the overall face (or part of the face) may vary for each parameter. The latter one is a technology to express one facial expression by preparing a plurality of different shapes with the same area and synthesizing some or plurality of the shapes. Examples of the latter one include a blend shape. With this technology, a plurality of different shapes of the overall face is prepared in advance, and one facial expression is generated by synthesizing some of the plurality of shapes. In the technology, a special facial expression may be made by preparing a predetermined shape in advance in addition to the elements of a normal face. When, for example, a shape representing the vertical lines of the face is prepared in advance, performing the vertical lines of the face is possible. When elements in performing that the eyes are in a cross shape are prepared in advance, performing the eyes in a cross shape is possible. In this case, since a parameter is set in advance, a facial expression or the like is reproduced regardless of the facial expression or the like of a streamer, so, when an appropriate parameter indicating a facial expression or the like is selected, it is advantageous to be able to reproduce a constantly understandable facial expression or the like. In this case as well, a predetermined facial expression or the like may be set so as to vary according to an avatar. In other words, a predetermined facial expression or the like to be applied in the case where the same predetermined condition is satisfied for avatar A and avatar B may be different between avatar A and avatar B. In this case, a predetermined facial expression or the like may be set for each individual avatar or may be set according to the type of avatar.

On the other hand, when the predetermined facial expression or the like is a facial expression parameter or the like obtained by correcting a facial expression parameter or the like based on a facial expression or the like of a streamer in accordance with a predetermined rule, the predetermined facial expression or the like may be a facial expression or the like based on the facial expression or the like of the streamer. For example, assuming that a streamer makes a surprised facial expression at a gift of some kind. At this time, the facial expression of the avatar is set to a facial expression corresponding to a surprise by using one or more parameters in response to detection of the facial expression of the streamer, and it is assumed that the surprised facial expression is further emphasized by increasing or reducing the values of the plurality of parameters concerned with a surprise by the amount of a predetermined value as a predetermined facial expression associated with a predetermined condition. The above-described technology is just like an absolute value in term of the fact that one or more parameters are determined for a predetermined facial expression; whereas the technology may, so to speak, use relative parameters for information obtained from the current facial expression of a streamer. For this reason, even when the same predetermined condition is applied to the same avatar performed by the same streamer, facial expression parameters or the like based on the facial expression or the like of the streamer itself at that time can be the same or can be different, so a facial expression or the like according to the variable parameters can be a predetermined facial expression or the like. Therefore, it may be possible to provide further variations of a facial expression or the like.

A facial expression displayed in accordance with setting of a predetermined shape or motion may indicate a predetermined shape itself like a mask as a predetermined facial expression.

A predetermined facial expression has been described in any of the above descriptions, and, similarly, a corresponding technology may also be used for a predetermined pose.

Hereinafter, initially, a part related to a gift will be described.

A predetermined facial expression or the like may be a facial expression or the like related to a gift to be provided. In this case, a viewer has an advantage that the viewer is able to easily understand the reason why a predetermined facial expression or the like is expressed in relation to a gift.

Examples of the related facial expression or the like may include a facial expression or the like with the same motif as a gift. For example, a dog panel with face cutout is put on the face and the mouth becomes a dog mouth within a predetermined time, or the mouth becomes a cat mouth within a predetermined time after cat ears are put on. A facial expression or the like with the same motif may include a facial expression or the like that makes a gift further effective when a predetermined facial expression or the like is made for the given gift. In the case of a facial expression or the like with the same motif as a gift, the facial expression or the like of an avatar may become a predetermined facial expression or the like within a predetermined time from putting on the gift. In other words, the predetermined condition may include a condition that is satisfied when the avatar puts on the gift. The predetermined time may be zero or may be substantially zero, or the facial expression or the like of the avatar may change into a predetermined facial expression or the like as a result of putting on a gift. Substantially zero may include a temporal difference to such an extent that a viewer sees that the facial expression or the like of the avatar is changed to a predetermined facial expression or the like almost at the same timing when the avatar puts on a gift.

In this case, the predetermined condition may be a rule in which a predetermined gift and a predetermined facial expression or the like of the same motif for the gift are set for a given gift. The condition application section 42 may specify a predetermined facial expression or the like by applying the predetermined rule to a given gift. The rule may be a rule to be applied to each individual gift or may be a rule to be applied to a type of gift to which each individual gift belongs. Hereinafter, although the description is omitted, similarly, information for specifying an associated facial expression or the like may be generated by using a predetermined rule similarly for the following various conditions.

A related facial expression or the like may be, for example, a preestablished harmonic facial expression or the like when a gift is given. The preestablished harmonic facial expression or the like may include a facial expression or the like that appears in a situation occurred in an animation, a comic, or the like. For example, for a gift of meat, a driveling facial expression or the like may be displayed within a predetermined time during which the gift of meat approaches the mouth, a driveling facial expression or the like is displayed within a predetermined time during which the gift of meat is intended to be taken with the hand, or a driveling facial expression or the like may be displayed as the gift of meat appears in front of the eyes. The predetermined time may be similar to the above.

On the other hand, the predetermined facial expression or the like may be a facial expression or the like opposite to the motif of a gift provided. In this case, a viewer may experience a feeling of strangeness; however, it is advantageous that the feeling of strangeness becomes a new stimulus.

The predetermined facial expression or the like may apply to parameters for all the parts (areas) that make up a facial expression or the like or may apply to some of the parameters. For example, the predetermined facial expression or the like may apply to only a parameter for the mouth, and parameters for parts other than the mouth may be parameters that are synchronized with the facial expression of a streamer.

An area in which the predetermined facial expression or the like activates may be the same area as a put-on area of the put-on gift. For example, a facial expression, such as puckering the mouth, may be set for a gift of a balloon to be put on the mouth. In this case, the expression of the mouth becomes an appropriate facial expression to inflate a balloon, so a viewer has an advantage that the viewer does not experience a feeling of strangeness from the gift of the balloon.

An area in which the predetermined facial expression or the like activates may be an area different from a put-on area of the put-on gift. For example, for a gift of a spa towel, a facial expression may be such that the eyes that are different areas from the head turn into horizontal lines at the time when a gift is put on by putting on the spa towel on the head. For a gift of a finger ring to be put on a finger, a facial expression may be such that the eyes that are different areas from the finger turn into a heart shape as a result of putting on the finger ring. For a gift of Pocky, a facial expression may be such that the eyes that are different areas from the mouth are closed and the cheeks that are different areas from the mouth turn red as a result of putting on Pocky to the mouth in a state of eating Pocky.

The predetermined facial expression or the like may change in synchronization with a direction in which a gift is displayed. There is a case where a streamer does not know where a gift appears in a virtual space. At this time, even when a gift has been provided, the streamer does not find the gift and, as a result, an avatar concerned with the streamer is also not able to react to the gift. Therefore, when a facial expression concerned with an avatar changes in synchronization with a direction in which a gift is displayed, a viewer that has provided the gift understands that the avatar has made a reaction, so it is advantageous that communication becomes more active. Here, there may be various modes to set a predetermined facial expression or the like that changes in synchronization with a direction in which a gift is displayed. The number of areas in a predetermined facial expression or the like that changes in synchronization with a direction in which a gift is displayed may be one or more. For example, the predetermined facial expression or the like 1) may include the eyes with a line of sight directed in a direction in which a gift is displayed, 2) may include a mode in which the mouth or the eyebrows change according to a direction in which a gift is displayed, 3) may turn the face in a direction in which a gift is displayed, or 4) may make a pose to look into the distance by holding the hand in front of the eyebrows. As an example of another mode, when a gift of meat is provided, a facial expression that the munching mouth is brought close to the side on which the gift of meat is displayed may be set as a predetermined facial expression. When a tower gift is provided, the face may be turned to a direction in which the tower gift is displayed, and a facial expression that the eyes are crossed with a surprise may be set as a predetermined facial expression. In such a case, information on the rotation of a gift may be used as information concerned with the position of the gift.

The predetermined pose may be various poses. A pose may be only part of the body of an avatar or may be the whole body of an avatar. For example, the pose may be a pose of only around the head as a pose to lean the head, a pose of only the upper body like a winning pose, or a pose of the whole body like a pose taking out a gun.

When the information concerned with a gift includes information identifying an avatar to which a gift is provided, the avatar to be set to have a predetermined facial expression or the like when the condition is applied may be subjected to a process on the identified avatar.

Information concerned with a gift and/or information concerned with an avatar may be used as the predetermined condition.

The information concerned with a gift may include the attribute of the gift, a priority concerned with the gift, a position concerned with the gift, a start of display of the gift, a change of display of the gift, an end of display of the gift, and/or information concerned with a plurality of the gifts, as described above.

The information concerned with an avatar may include a position concerned with the avatar, the type of the avatar, a facial expression parameter concerned with the avatar, a motion concerned with the avatar, and/or a situation concerned with the avatar.

The priority concerned with a gift may be used to, in a case where a plurality of gifts is provided within a predetermined time, and when a predetermined facial expression or the like is applied by using one or some of the plurality of gifts, set the predetermined facial expression or the like in accordance with which one or some of the gifts. In this case, information concerned with a gift may be used or information concerned with a plurality of gifts may be used, as one or some of gifts. By setting a priority concerned with a gift, it is advantageous to appropriately handle a process on gifts provided within a predetermined time.

For example, when five gifts are provided within a predetermined time, 1) a predetermined condition may be applied to information concerned with only the gift highest in priority of the five gifts, 2) a predetermined condition may be applied to information concerned with only the gift highest in priority and the gift second highest in priority, or 3) a predetermined condition may be applied to information concerned with the gifts of which the priority is less than or equal to a predetermined rank. In this case, the priority concerned with a gift may have the function of a precondition to apply a predetermined condition in the meaning of selecting an object to which the predetermined condition is applied.

When the priority concerned with a gift is not used as a predetermined condition, a predetermined condition may be applied to gifts from which information concerned with a gift has been acquired in time order in which information concerned with a gift is acquired. The time order acquired here may be time order in which information concerned with a gift, finally acquired according to the degree of congestion of a network, a manner of progress of information processing, and the like, or time order in which an instruction to provide a gift is acquired in a viewer terminal, a streamer terminal, or a server. The latter one may, for example, determine the time order by associating time information with time order in which an instruction is acquired in a terminal or a server. In this case, when information concerned with the next gift is acquired, setting of a predetermined facial expression or the like based on information concerned with a last gift may be replaced with a predetermined facial expression or the like based on information concerned with the next gift and the information on the last predetermined facial expression or the like may be deleted, or information concerned with the last gift may be continued and a predetermined facial expression or the like for information concerned with the next gift does not need to be set. In the case of the former one, it is advantageous that a predetermined facial expression or the like associated with a given gift is able to be displayed on an avatar. On the other hand, in the latter case, even when there is a predetermined facial expression or the like that is not set, it is advantageous that a once set predetermined facial expression or the like is able to be continuously displayed so that a viewer understands. In such a case, the predetermined condition may specify a predetermined facial expression or the like by using information concerned with a time between a first gift and a second gift, which is a time interval between time at which the first gift is provided and time at which the second gift is provided.

The priority concerned with a gift may be generated by using the price of the gift, the size of the gift to be displayed, the level of the gift, a place where the gift appears in a virtual space, the type of the gift, information concerned with a provider of the gift, and/or timing when the gift is provided.

For the price of a gift (points to be consumed), the size of the gift to be displayed, and the level of the gift, a gift with a higher price, a greater size, and a higher level may be given a higher priority than a gift with a lower price, a less size, and a lower level. In this case, a gift with a higher price, a greater size, and a higher level may have the function of having a greater influence on and further activating a predetermined facial expression or the like. Alternatively, the setting may be opposite to this setting.

For the place where a gift appears in a virtual space, for example, a gift that appears in the center in the virtual space may be given a higher priority than a gift that appears at an end, such as right or left, in the virtual space. When a gift that appears in a place attractive in a virtual space is given a high priority, a viewer is able to bring the gift that appears in an attractive place into a field of view, so it is advantageous that the viewer easily understands the meaning of a predetermined facial expression or the like.

The priority concerned with a gift may be static information set in advance for the gift or may be dynamic information set for the first time at a stage in which the gift is provided. The former may include, for example, the price of a gift, the size of the gift to be displayed, the type of the gift, and the like. The latter may include a place where a gift appears in a virtual space, a provider of the gift, and timing when the gift is provided. The price of a gift may be dynamically set information, such as information in an auction form. When the priority concerned with a gift is dynamically set, it is advantageous that the gift to which a predetermined facial expression or the like is set is able to be selected further appropriately and dynamically.

The type of a gift may be specific contents of the gift or may be various. The timing when a gift is provided may be set such that a gift provided first is given a higher priority than a gift provided later.

As an example in which information concerned with a provider of a gift is used as the priority concerned with a gift, it is presumable that the priority concerned with a gift is set to a different priority according to the provider of the gift. For example, when a viewer has a specific status in predetermined streaming, the priority of a gift from a person having such a status may be set so as to be higher than a gift from a person having no such a status. The status may be based on the fact that a viewer is a specific member in the streaming, a specific courtesy position, or the like. The priority concerned with a gift may be set based on the frequency that a provider of the gift watches streaming, a total time during which the provider watches streaming, the frequency that streaming of an avatar to which the gift is provided is watched and the total time during which streaming of the avatar is watched, the frequency that streaming of a streamer concerned with the avatar to which the gift is provided is watched and the total time during which streaming of the streamer is watched, the number of gifts provided in streaming during currently watching, the total price of gifts, and/or the frequency of gift. The provider of a gift may set an associated priority in accordance with information concerned with support ranking with a streamer concerned with an avatar or the information when, for example, the provider of the gift and the streamer concerned with the avatar follow each other. The information on support ranking may, for example, include ranking information calculated from information concerned with the activity of a viewer. The information concerned with the activity of a viewer may include, for example, the total number of gifts provided by the viewer, a total price of gifts, a total value of the levels of gifts, an evaluation value using information concerned with a gift, the number of comments of the viewer, the number of likes of the viewer, information using these, or the like.

For streaming of an avatar of a specific streamer, when a higher possibility that a predetermined facial expression or the like is able to be applied for a gift provided by a viewer is set as the viewer is more enthusiastic, there is a possibility that an action to improve the degree of enthusiasm of the viewer works.

The above-described priority concerned with a gift 1) may be used to select one or some of a plurality of gifts as part of a predetermined condition, 2) may be used to set a predetermined facial expression or the like associated with the priority, or 3) may be used to select some of a plurality of gifts and used to specify a predetermined facial expression or the like associated with the priority. For example, a predetermined facial expression or the like applied when information concerned with a gift with level 5 is acquired may be different from a predetermined facial expression or the like applied when information concerned with the same gift with level 3 is acquired. For example, for one gift, a predetermined facial expression or the like that defines only the mouth and the mustache is set as a predetermined facial expression or the like in the case of a gift with level 3; whereas a predetermined facial expression or the like that defines eyebrows in addition to the mouth and the mustache may be set as a predetermined facial expression or the like with level 5. A predetermined facial expression or the like in the latter one may be a facial expression that includes a facial expression with a low level when the level of a gift is high such that a predetermined facial expression that defines a mode of the mustache, the eyebrows, and the eyes is set (the setting for the mouth disappears). As another mode, for example, for one gift, a predetermined facial expression or the like that defines only the mouth and the mustache is set as a predetermined facial expression or the like with level 3; whereas a predetermined facial expression or the like that defines the mustache and the eyebrows and does not define the mouth is set as a predetermined facial expression or the like with level 5. In this way, a predetermined facial expression or the like in the case where the level of a gift is high does not need to include a predetermined facial expression or the like in the case where the level of a gift is low. As in the case of the facial expressions respectively corresponding to level 3 and level 5 of the gift, stepwise predetermined conditions may be included, and the associated predetermined facial expressions or the like may also be stepwise accordingly, and the predetermined facial expressions or the like may be different from each other.

Both the information concerned with a gift and the information concerned with an avatar may be used as the predetermined condition.

For example, the predetermined condition may include a condition that a position concerned with the avatar and a position concerned with the gift fall within a predetermined distance range. Here, the position concerned with a gift may be the position at a location set in advance for the gift, may be a position concerned with an outer circle or a polygon in the case where the gift is displayed, or may be the position of a barycenter in the case where the gift is displayed. The position concerned with an outer circle may be a position specified by using the center of the outer circle or the tangent of the outer circle. The position concerned with a polygon may be a position specified by using the center of the polygon, the vertexes or sides of the polygon, or the like. The position concerned with the avatar is any one of a position of the avatar in a virtual space, an area in which the predetermined facial expression or the like is activated, a predetermined area of the avatar, and a collider of the avatar.

In the predetermined condition, by using the condition that the position concerned with the avatar and the position concerned with the gift fall within a predetermined distance range, it is advantageous that a viewer easily understands the meaning that a predetermined facial expression or the like is made.

On the contrary to the above, in the predetermined condition, the condition that the position concerned with the avatar and the position concerned with the gift fall outside the predetermined distance range. Particularly, the condition that the position concerned with the avatar and the position concerned with the gift are separated a predetermined distance within a predetermined time may be included. In this case, a situation in which a gift and an avatar move relatively in a separating direction is shown. Alternatively, for example, a facial expression, such as coming out of tear, may be set as a predetermined facial expression of the avatar.

A type to which an avatar belongs may be used as the information concerned with an avatar. For example, the predetermined condition may include a type to which an avatar belongs, which is one of a plurality of types to which the avatar belongs. When information concerned with one gift is acquired, the information may be a predetermined facial expression or the like for the type of a first avatar and not a predetermined facial expression or the like for the type of a second avatar. For example, when it is assumed that an avatar of one type is set with wimpy personality and a ghost gift is provided, a scary facial expression may easily appear. It is assumed that an avatar of one type is set with a cheerful personality, and a condition for making a facial expression including a smile face may be set so as to be looser than that for another avatar as a predetermined facial expression or the like. In this case, an avatar may have characteristics of a personality, such as wimpy, cheerful, strong, and hate to lose, and satisfaction of the predetermined condition may be determined by using the characteristics with such a personality. A personality may be set according to a type to which an avatar belongs or may be set for each individual avatar separately from a type to which the avatar belongs.

The predetermined condition may include a probability. In other words, the predetermined condition may include a pseudo-random number function or the like, and, when a function value satisfies a predetermined condition, a predetermined facial expression or the like may be generated. When the probability is included, a predetermined facial expression or the like is not constantly generated, so it is possible to continuously attract an interest of a viewer. For example, when a rare facial expression is made in the case where the probability value is set so as to be lower than a predetermined value, it is possible to attract an interest of a viewer in terms of the point that the viewer is able to watch a valuable facial expression.

The information concerned with an avatar may include the motion of the avatar. For example, when the motion of an avatar taking a motion to shoot a gun is made with information concerned with a gift of a gun, a brave face aiming with a gun may be displayed. In such a case, a different facial expression may be set according to the type of a gun. For example, the same facial expression may be used for a combination of some of a bazooka, a sniper's rifle, a gun, and a machine gun or a different facial expression may be used for each of them.

The information concerned with an avatar may include a situation concerned with the avatar. For example, when a gift of a rope ladder is provided in the case of a situation in which an avatar fell into a specific hole and is not able to go out, a predetermined facial expression representing a full smile may be set as the predetermined facial expression.

It may be determined whether a predetermined condition is satisfied by using the timing of display of each individual gift, such as information on a start of display of a gift, information on a change of display of a gift, and/or information on an end of display of a gift, as a predetermined condition. In this case, since the facial expression or pose of an avatar changes in response to display of a gift, that is, a start, change, and end of display of a gift, a viewer has an advantage that the viewer easily understands the meaning of a change in the facial expression or pose of the avatar in association with the gift.

The predetermined condition may include attribute information of a gift. The attribute of a gift may include the characteristics of the gift, such as the type of the gift and the level of the gift, or does not need to include the characteristics of the gift. A predetermined condition may be set such that the predetermined condition is satisfied in accordance with a particular feature of a gift, and an associated predetermined facial expression or the like may be set.

The type of a gift may be, for example, information on the timing when the gift is provided, information on the category of the gift, an area in which the gift is put on, or the like. The information on the timing when a gift is provided may be a new release gift, a gift within a predetermined period after release, a gift associated with to a predetermined seasonal event like Halloween limited, or the like. Information on the category of a gift may be a free gift, an accessory, cheer goods, or the like. The area in which a gift is put on may be eyes, mouth, nose, forehead, ears, hands, feet, combinations of them, or the like.

The level of a gift may be raised by combining the gift with the same or another different gift. Even when the gifts are the same but a gift with a first level and a gift with a second level are acquired, a gorgeous predetermined facial expression or the like may be set in the case of a gift with a higher level. For example, the fact that a first predetermined facial expression or the like is more gorgeous than a second predetermined facial expression or the like may be, for example, a case where a large number of parameters are set for a predetermined facial expression or the like, a case where a large number of areas are influenced by a predetermined facial expression or the like, or the like.

The information concerned with the gift may include information concerned with a first gift and information concerned with a second gift, and the predetermined condition may be a combination of the information concerned with the first gift and the information concerned with the second gift, order of the information concerned with the first gift and the information concerned with the second gift, and/or information concerned with time between the first gift and the second gift.

For example, when an avatar is given a predetermined combination of gifts, the facial expression of the avatar may be set as a predetermined facial expression or the like. More specifically, for example, when an avatar is given three-type gifts, that is, a shield of the brave, a sword of the brave, and a cloak of the brave, as gifts of an RPG, the facial expression of the avatar may be set to a brave face of the brave. A predetermined facial expression or the like set in this case may be suggested from a combination of given gifts. For example, for a shield of a frog, a sword of a frog, and a cloak of a frog, a face may be like a frog.

It may be set such that a predetermined condition is satisfied only when pieces of information respectively concerned with gifts are acquired in a predetermined sequence. For example, a facial expression is set such that the eyes are burning with flames at a stage in which a bandage is given as a gift, and, when sunglasses are given as a gift, a facial expression having the eyes with larger flames than the eyes with flames when only a bandage is simply put on may be set to such an extent that a state where the eyes are burning with flames even with the sun glasses. A facial expression having the large eyes with flames does not need to be applied when a bandage is given after sunglasses, or may be set such that the same facial expression is obtained.

The condition application section 42 may set a facial expression specified as a result of satisfaction of a predetermined condition to a facial expression of an avatar to which the gift is provided. More specifically, information indicating a facial expression specified as a result of satisfaction of a predetermined condition may be an ID that indicates a specified facial expression or one or more facial expression parameters that indicate a specified facial expression, and the facial expression of an avatar may be set by using the information indicating the specified facial expression so that the specified facial expression can be set as the facial expression of the avatar. After the ID information or the parameter information is specified or generated in the condition application section, the information may be sent to a server or a terminal to generate a video or an animation and used for a predetermined period. Here, the condition application section 42 may store information indicating a facial expression specified in association with each predetermined condition, and, when the predetermined condition is satisfied, may be configured to be able to specify information indicating an associated one of the facial expressions specified.

In the above process, when a first information processing apparatus in which the condition application section 42 is executed and a second information processing apparatus that executes a process including setting of a facial expression of the avatar are the same, the condition application section 42 may execute a process to set the facial expression of the avatar by using the facial expression specified by the condition application section 42 as a result of satisfaction of a predetermined condition.

When a first information processing apparatus in which the condition application section 42 is executed and a second information processing apparatus that executes a process including setting of the facial expression of the avatar are different, the first information processing apparatus may send the facial expression specified by the condition application section 42 as a result of satisfaction of a predetermined condition to the second information processing apparatus and the second information processing apparatus may execute a process of setting the facial expression of the avatar by using the specified facial expression.

Here, when the first information processing apparatus is a server and the second information processing apparatus is a server, information indicating the specified facial expression or the like may be sent from the server of the first information processing apparatus to the server of the second information processing apparatus. Here, when the first information processing apparatus is a server and the second information processing apparatus is a viewer terminal, information indicating the specified facial expression or the like may be sent from the server of the first information processing apparatus to the viewer terminal of the second information processing apparatus. When the first information processing apparatus is a server and the second information processing apparatus is a streamer terminal, information indicating the specified facial expression or the like may be sent from the server of the first information pro-
cessing apparatus to the streamer terminal of the second information processing apparatus.

Similarly, when the first information processing apparatus is a viewer terminal and the second information processing apparatus is a server, information indicating the specified facial expression or the like may be sent from the viewer terminal of the first information processing apparatus to the server of the second information processing apparatus. When the first information processing apparatus is a viewer terminal and the second information processing apparatus is a viewer terminal, information indicating the specified facial expression or the like may be sent from the viewer terminal of the first information processing apparatus to the viewer terminal of the second information processing apparatus. When the first information processing apparatus is a viewer terminal and the second information processing apparatus is a streamer terminal, information indicating the specified facial expression or the like may be sent from the viewer terminal of the first information processing apparatus to the streamer terminal of the second information processing apparatus.

Similarly, when the first information processing apparatus is a streamer terminal and the second information processing apparatus is a server, information indicating the specified facial expression or the like may be sent from the streamer terminal of the first information processing apparatus to the server of the second information processing apparatus. When the first information processing apparatus is a streamer terminal and the second information processing apparatus is a streamer terminal, information indicating the specified facial expression or the like may be sent from the streamer terminal of the first information processing apparatus to the streamer terminal of the second information processing apparatus. When the first information processing apparatus is a streamer terminal and the second information processing apparatus is a viewer terminal, information indicating the specified facial expression or the like may be sent from the streamer terminal of the first information processing apparatus to the viewer terminal of the second information processing apparatus.

In the above description, the mode in which the condition application section 42 is executed in the single information processing apparatus has been described. Alternatively, the condition application section 42 may be processed in a plurality of information processing apparatuses in a distributed manner.

A predetermined condition may include timing when a predetermined facial expression or the like is set. In the above-described various conditions, according to the timing when the position concerned with an avatar and the position concerned with a gift fall within a predetermined distance range, a predetermined facial expression or the like may be set, and information including the information on the predetermined facial expression or the like may be sent to an intended information processing apparatus to display the information. A deviation of the timing in this case may include a time lag of communication or processing.

On the other hand, on condition that a predetermined condition is satisfied, the timing when a predetermined facial expression or the like is set may be the one set separately. For example, it is applicable that a predetermined facial expression or the like is displayed after two seconds from when a predetermined condition is set. As an example, it is also applicable that a predetermined surprised facial expression is set at the timing intentionally delayed by two seconds after an avatar is surprised.

FIG. 8 and FIG. 9 illustrate exemplary conditions and associated facial expression and/or poses. By using information concerned with a gift and/or information concerned with an avatar as a predetermined condition, an associated predetermined facial expression or the like is specified.

As described above, with the function of the condition application section, when a predetermined condition is satisfied, an associated predetermined facial expression or the like can be achieved, so it is advantageous that various facial expressions and poses of an avatar in a virtual space can be provided. Even when a performer is able to designate the facial expression of an avatar using a tablet terminal or the like, but when an accessory gift is put on by an operator in studio streaming, the performer cannot find putting on the accessory gift. In such a case, it is advantageous that, even when the performer does not make any operation, a facial expression or pose associated with the gift is able to be applied to the avatar. In other words, information for setting the facial expression or pose of the avatar to a predetermined facial expression or pose may be generated without any operation other than providing a gift from the streamer.

As described above, with the function of the condition application section, when a predetermined condition is satisfied, an associated predetermined facial expression or the like is able to be automatically achieved, so it is advantageous that it is possible to enjoy a reaction that the facial expression of an avatar changes as a result of just providing a gift from a viewer terminal without any other operation from the viewer terminal.

Next, what actually occurs will be described.

A predetermined facial expression or the like may be a facial expression or the like related to a predetermined motion or the like to occur. In this case, a viewer has an advantage that the viewer is able to easily understand the reason why a predetermined facial expression or the like is expressed in relation to a predetermined motion or the like.

The predetermined facial expression or the like may apply to parameters for all the parts that make up a facial expression or the like or may apply to some of the parameters. For example, the predetermined facial expression or the like may apply to only a parameter for the mouth, and parameters for parts other than the mouth may be parameters that are synchronized with the facial expression of a streamer, and may be parameters based on information associated with the motion of the facial expression of the streamer from a streamer terminal. The predetermined facial expression or the like may include the appearance of an avatar. For example, the predetermined facial expression or the like may include a performance that an avatar is burned. Examples of the parameters may include numeric values indicating parameters (for example, 0% to 100%) that indicate the degree of opening of the eyes and the mouth), may include parameters that indicate the right and left position and top and bottom position of each end of the mouth, or may include parameters that indicate the top and bottom positions of the eyebrows.

The predetermined pose may be various poses. A pose may be only part of the body of an avatar or may be the whole body of an avatar. For example, the pose may be a pose of only the head as a pose to lean the head, a pose of only the hands including a performance that the hands get bigger or the hands are swollen and red, a pose of the upper body like a winning pose, or a pose of the whole body like a pose taking out a gun or jumping with the whole body.

The predetermined condition may include information concerned with any one or more of a predetermined motion of an avatar performed by a streamer, a facial expression of the avatar, a complexion of the avatar, a voice of the avatar, and a predetermined situation that occurs in relation to the avatar.

The predetermined motion of the streamer may be a predetermined motion perceived by the streamer with the five senses. The predetermined motion of the streamer may include a motion to watch a predetermined object. For example, when a streamer sees a predetermined object, such as another streamer and a predetermined article, in a place, such as a stage and a room in which the streamer is present, a surprised facial expression may be set as a predetermined facial expression or the like.

The predetermined object is not limited to an article that brings about a surprised emotion to a streamer, and may be an article that brings about another emotion or feeling. For example, the predetermined object may be an article that brings about a certain emotion or feeling when a person sees an object, such as an article that brings about a scary emotion, an article that brings about a like emotion, such as steak, an article that brings about a dislike emotion, such as natto, or the like. For a predetermined facial expression or the like in the case where such an article is seen as well, a predetermined facial expression or the like showing the face that a person generally makes when the person sees such an object may be set. For the article that brings about a scary emotion, an article that brings about a like emotion, and an article that brings about a dislike emotion, a scary facial expression, a smile face, and a dislike facial expression, or the like may be set, respectively.

When the predetermined object is another streamer, the motion to look at a predetermined object may include one streamer looks at the eyes of another streamer. In this case, when the other streamer also looks at the eyes of the one streamer, the line of sight of the one streamer matches the line of sight of the other streamer. In such a case, the avatar may be set to have a predetermined facial expression or the like. When the lines of sight of streamers match each other, only one of the avatars may be set to have a predetermined facial expression or the like or both the avatars may be set to have a predetermined facial expression or the like. For the latter one, for example, it is presumable that facial expressions or the like that both the lines of sight of the avatars match each other and both avatars have butterflies, such as blushing. When a predetermined facial expression or the like is set for both avatars in the latter case, the set facial expressions or the like may be the same predetermined facial expressions or the like or may be different predetermined facial expressions or the like. When the different predetermined facial expressions or the like are set, a predetermined facial expression or the like may be set according to a type to which an avatar belongs, a predetermined facial expression or the like may be set according to the taste, property, or the like of an avatar, or a predetermined facial expression or the like may be selected probabilistically.

In this case, the image of a streamer is captured in advance with an image capture apparatus of which an image capturing field of view is an area around the streamer, including the streamer, and a predetermined facial expression or the like may be set when the distance between the streamer and another streamer falls within a predetermined distance in the captured image or when the streamer looks at another streamer. When the streamer looks at another streamer in the latter case, the direction of the line of sight of the eyes of the streamer may be calculated by applying Raycast or the like to the line of sight of the streamer as image processing in an image and, when the line of sight intersects with another streamer, it may be determined that the streamer looks at another streamer.

Similarly, a predetermined facial expression or the like may be set when the distance between the streamer and an article falls within a predetermined distance or when the streamer looks at the article. The predetermined motion of the streamer may include a motion to contact with a predetermined object. The predetermined object may be determined in advance. For the contact motion, the image of a streamer is captured in advance with an image capture apparatus of which an image capturing field of view is an area around the streamer, including the streamer, as described above, and a predetermined facial expression or the like may be set when the distance between the streamer and a predetermined article falls within a predetermined distance in the captured image or when the distance between the streamer and the predetermined article becomes zero.

In this regard, depending on the position of an image capture apparatus that captures the image of a streamer, there can be a case where the timing when the streamer contacts with a predetermined article is different from the timing when the outline of the streamer contacts with the outline of the predetermined article in the image. Particularly, in the latter case, although the streamer itself is not in contact with the predetermined article, there can be a case where the outline of the streamer and the outline of the predetermined article overlap on the image. Therefore, in addition to determination using image processing or instead of determination using image processing, a sensor put on the streamer may be used. For example, a streamer may put on a glove with a sensor, and the contact between the glove and a predetermined article may be detected by the sensor in the glove. Alternatively, a situation in which a streamer contacts with another streamer or a situation in which a streamer contacts with another article may be detected by a sensor put on the body of the streamer. The sensor put on the body of a streamer may be a marker tracker. When one or more trackers are also provided on an article, the relationship in contact or the like between a streamer and an article may be determined in accordance with the relationship between the tracker provided on the article and the tracker provided on the body of the streamer.

The predetermined motion of the streamer may include a handshake motion. For a handshake, the motions of fingers and thumb may be detected by the glove with a sensor, put on a streamer, and, when the motions of the fingers and thumb of a handshake are detected, it may be determined that the streamer is making a handshake.

The predetermined motion of the streamer may include an eating and drinking motion to eat or drink a predetermined object. For an eating and drinking motion, the fact that a streamer is making an eating and drinking motion may be detected through detecting the motion of the neck by using a sensor in the form of being wound around the neck of the streamer. A predetermined motion or the like in the case where the streamer makes an eating and drinking motion includes a motion to move the mouth in a state where an avatar concerned with the streamer puts food in the mouth. For example, a facial expression mumping the mouth may be set. The drinking and eating facial expression may be in response to the motion of the mouth, and the motion of the mouth may be associated with the above-described motion of the neck. Together with the above-described technology or instead of the above-described technology, a predetermined motion or the like may be set in accordance with information in a captured image of a streamer. For example, it may be determined that a streamer is eating a predetermined article in accordance with information in an image, and a facial expression showing an associated eating manner, that is, eating the predetermined article, may be set. For example, when a streamer eats ramen, when the streamer eats curry and rice, when the streamer eats meat, when the streamer eats fish, when the streamer eats vegetables, or the like, an associated food item (ramen, curry and rice, meat, fish, vegetables, or the like) may be performed as an item or an animation in a virtual space, while the eating manner associated with the food may be set to a predetermined facial expression or the like. For example, when the streamer eats meat, the eating manner may be an eating manner of tearing into meat on the bone from the side, an eating manner of eating with a spoon for curry and rice, or the like. An item to be performed on a virtual space may be generated in association with the predetermined object. For a facial expression for eating food, an item of an associated one of the above-described foods may be generated and performed.

In the above-description, the items of foods or drinks associated with eating and drinking motions have been described as items to be performed on a virtual space; however, items to be newly displayed are not limited thereto. For example, the item of an article corresponding to an article perceived by the streamer in a real space may be displayed as an item to be performed on a virtual space. For example, when the sound of a musical instrument is heard, the musical instrument may be displayed as an item. When a tub, a ball, or the like contacts with a streamer, the corresponding item of tub or ball may be displayed as a performance on a screen.

An item to be displayed as the performance may be displayed in synchronization with the timing when the avatar concerned with the streamer is set to have a predetermined facial expression or the like. When a predetermined facial expression or the like set for the avatar concerned with the streamer returns to the original facial expression or the like of the avatar associated with the streamer, an item to be displayed as the performance may disappear from the screen. An associated item to be displayed as a performance may be displayed while the avatar concerned with the streamer is set to have a predetermined facial expression or the like.

The position of an item to be displayed as the performance may be determined and moved in relation to a predetermined motion or the like concerned with a streamer. In accordance with, for example, the strong and weak of sound, the speed of motion, the distance of motion, or the like in a predetermined motion or the like concerned with a streamer, the position, motion, and size of an associated item may vary. More specifically, for example, when the sound is strong, the position of the item may be close; whereas, when the sound is weak, the position of the item may be far. For example, when the eating motion is quick, the rate of reduction in the item of food may be high. When a ball comes from somewhere, the item of ball corresponding to the ball may be displayed on a virtual space, and the speed and size of the ball in the virtual space may be displayed in association with the speed and size of the incoming ball in a real space. In this case, the speed of the ball in the real space may be made in correspondence with the speed of the ball in the virtual space, and the size of the ball in the real space may be made in correspondence with the size of the ball in the virtual space. Alternatively, the speed and the size of the ball in the real space may be made in correspondence with the speed and the size of the ball in the virtual space alternately.

When a streamer drinks alcohol as a predetermined motion, a facial expression under the influence of alcohol may be set by turning the complexion of an avatar concerned with the streamer into red as a predetermined facial expression or the like. Drinking alcohol may be determined by an alcohol detector. The complexion of an avatar may be changed in accordance with the quantity of alcohol, detected by the alcohol detector. For example, when the detected quantity of alcohol falls within a first predetermined quantity range, the complexion of the avatar may be set to pink, when the detected quantity of alcohol falls within a second predetermined quantity range greater than the first predetermined quantity range, the complexion of the avatar may be set to red, and, when the detected quantity of alcohol falls within a third predetermined quantity range greater than the second predetermined quantity range, the complexion of the avatar may be set to thick red.

The predetermined motion of the streamer may include a predetermined good or bad smell gesture. The predetermined good smell gesture may include a motion concerned with the nose. For example, the predetermined good smell gesture may include a gesture representing that a general person feels a good smell like a motion that the nose sniffs or a motion that the nose twitches. The predetermined bad smell gesture may include a gesture representing that a general person feels a bad smell, such as a motion to cover the nasal cavity, a motion to stop breathing in, and a motion to move air in front of the nose with the hand. The predetermined bad smell gesture may be only the motions of the nose and face or may be only the motion of the hand or may be both of them. The motion may be a facial expression or the like.

For the predetermined good or bad smell gesture of the streamer, information on the nose may be acquired by using blend shape in accordance with motion data. Information may be acquired by an optical sensor or image processing.

A good or bad smell facial expression or the like of an avatar concerned with a streamer may be displayed in association with a good or bad smell motion of the streamer as a predetermined facial expression or the like of the avatar in response to a predetermined motion of the streamer. A good or bad smell facial expression or the like of an avatar as a predetermined facial expression or the like may also be similarly a predetermined good or bad smell motion that a general person seems to perform sniffing a good or bad smell. The good or bad smell facial expression or the like of an avatar may be a facial expression or the like in the same mode or a facial expression or the like in a different mode from a good or bad smell facial expression or the like of a streamer. In the case of a facial expression or the like in the same mode, a good or bad smell facial expression or the like of an avatar may be set so as to clearly represent a good or bad smell facial expression or the like by, for example, changing a good or bad smell facial expression or the like of a streamer to have a wider motion or clarifying the high and low speed of a motion.

The predetermined motion of the streamer may include a predetermined gesture for hearing or listening to sound. The predetermined gesture for hearing or listening to sound may be the motion of only the ear, may be the motion of only the head, may be the motion of only the hand, or may be some or all of them. The motion of the ear may include a motion to move the ear. The motion of the head may include a motion to direct the ear in a certain direction. The certain direction may be a direction in which a streamer feels hearing sound. The motion of the hand may include a motion to bring the hand into a predetermined range of the ear. In addition, the motion of the hand may include a motion to face the palm toward the ear and may be formed in a mode of collecting only sound coming from a specific direction. The motion of the hand may be a motion with only one hand or may be a motion with both hands. When the palm is set in the form of collecting only sound coming from a specific direction for one ear, the orientation of the body or the direction of the head may be changed such that the ear approaches into the specific direction. The motion of a streamer may include a gesture that a general person recognizes the motion as a motion to intend to hear or listen to sound as described below. The motion may be a facial expression or the like. A predetermined facial expression or the like of an avatar concerned with a streamer may be a facial expression or the like that a general person recognizes that the facial expression or the like is a facial expression or the like to intend to hear or listen to sound as described above in association with the facial expression or the like of the streamer. A facial expression or the like of the avatar to intend to hear or listen to sound may be a facial expression or the like in the same mode or a facial expression or the like in a different mode from a facial expression or the like of a streamer to intend to hear or listen to sound. In the case of a facial expression or the like in the same mode, a facial expression or the like of an avatar may be set so as to clearly represent a facial expression or the like to intend to hear or listen to sound from a streamer by, for example, clarifying the slow and quick speed of motion, such as further increasing the width of a motion or clarifying the slow and quick speed of motion.

The predetermined situation that occurs on the streamer may include a situation in which a predetermined sound is generated. The predetermined sound may be a voice of a person, may be a natural sound, or may be a sound generated by a musical instrument, or may be an artificial sound, or may be a dramatic sound, and the type of sound does not need to be limited. The voice of a person may be various voices generated from a person, such as the normal voice of a person, a voice different from the normal voice of a person, a strange voice of a person, and a scream of a person. The natural sound may be various sounds, such as the sound of the wind, the sound of water, the sound of a flame, the sound of a typhoon, and the sound of a flood. The sound generated by a musical instrument may be various sounds of musical instruments, such as a violin, a piano, and a flute. The artificial sound may be various sounds, such as a sound effect like ping-pong indicating that the answer to a problem is correct and a sound effect like boo indicating that the answer is wrong. The dramatic sound may be, for example, a sound generally used when a ghost appears and a sound like "hyu-doro-doro" that a general person is able to recognize the appearance of a ghost.

The predetermined sound may be detected by various techniques. For example, a sound that a streamer hears may be detected by a microphone installed in a room, studio, or the like, in which the streamer is present, or information from a sound generator capable of causing a streamer to hear a sound, such as a sound or the like generated in response to an instruction of an operator in a studio or an instruction input by the streamer itself, may be detected.

In response to generation of the predetermined sound, a predetermined facial expression or the like of an avatar concerned with a streamer may be a predetermined facial expression or the like associated with the sound. For example, when a human strange sound or a human scream is detected, the predetermined facial expression or the like may be set to a facial expression that an avatar makes a strange sound or a scream. Specifically, the predetermined facial expression or the like may be set to a facial expression that can be recognized that a general person moves the eyes and the eyebrows up and down with the mouth opened up and down is making a scream or a strange sound. When the sound effect indicating a correct answer like ping-pong is detected, the predetermined facial expression or the like of an avatar may be a flash facial expression. In this case, to indicate a state where an avatar flashes on as a performance on a virtual space, an exclamation mark may be displayed around a predetermined range from the head of the avatar. For the sound "hyu-doro-doro" that a general person is able to recognize the appearance of a ghost, the avatar may make a scary facial expression as the predetermined facial expression or the like. When the sound of a musical instrument is detected, the avatar may make a singing facial expression as the predetermined facial expression or the like. In this case, the mouth of the avatar may move in synchronization with the sound of a musical instrument. For example, the mouth of the avatar may move in synchronization with a change of the sound of a musical instrument. A predetermined facial expression or the like of the avatar concerned with a streamer may be set according to the sound volume. For example, when the sound greater in volume than a predetermined sound is detected, a pose covering the ears may be set as the predetermined facial expression or the like of an avatar concerned with a streamer. When the sound less in volume than the predetermined sound is detected, a pose in which the distance between the ear and the hand becomes shorter than a predetermined distance and becomes a distance that the hand contacts with the ear and the hand is put on the ear is set as the predetermined facial expression or the like of the avatar concerned with the streamer. The predetermined facial expression or the like of the avatar concerned with the streamer may be set according to the sound quality of a sound. For example, when a thick voice set as a predetermined sound quality is detected, a stern facial expression may be set as the predetermined facial expression or the like of the avatar concerned with the streamer. For example, when a falsetto set as a predetermined sound quality is detected, a drunk facial expression may be set as the predetermined facial expression or the like of the avatar concerned with the streamer.

The predetermined situation that occurs on the streamer may include a situation in which a predetermined article contacts with the streamer. The predetermined article may be various articles. For example, the predetermined article may be a ball, a bat, a tub, or the like. However, when an article actually contacts with a streamer, the article may be not a true one but an article imitating the true one for the sake of safety. In response to contact of the predetermined article with a streamer, the predetermined facial expression or the like of an avatar concerned with the streamer may be set to an associated facial expression. For example, a surprised facial expression, a pained facial expression, or the like may be set as a result of the contact. In this case, to further show a state where the avatar looks pained as a performance on a virtual space, a performance generally showing a pain, such as star marks, or the like may be displayed in a predetermined range around the head of the avatar.

The complexion of a streamer may include a change in complexion. A change in complexion may be determined in accordance with image processing capturing the image of a streamer as described above. A change in complexion may be measured by using the temperature of the face of a streamer with a thermal sensor. A change in complexion may be used to set a predetermined facial expression or the like in combination with other information. For example, the degree of drinking alcohol may be detected by using a change in complexion and information obtained by detecting alcohol. More specifically, a predetermined facial expression or the like concerned with an avatar, associated with a change in the complexion of a streamer from ordinary flesh color to a color, such as pink and red, and the detected degree of the quantity of alcohol, may be set. The predetermined facial expression or the like of the avatar may be a facial expression or the like that the avatar is drunk by alcohol as described above. The facial expression or the like that the avatar is drunk by alcohol may include the motion of feet in a staggered manner as the motion of the feet and body of the avatar. A scary facial expression may be set as the predetermined facial expression or the like concerned with an avatar by using a change in complexion from an ordinary flesh color to a pale color or a white color, and a predetermined item, such as a ghost character.

The voice of the streamer may include a change of the sound quality of the voice of the streamer greater than or equal to a predetermined range or a change of the volume of the voice of the streamer by a predetermined amount or more. The sound quality of voice and the sound volume of voice may be determined by using information detected from the microphone. When there is a certain change in the voice of a streamer, a predetermined facial expression or the like according to the change may be set. Such information may be detected in combination with other information. For example, a predetermined facial expression or the like of an avatar may be set by using the sound quality and/or the sound volume of voice of a streamer, and information based on an image obtained by the image capture apparatus that captures the image of the streamer. More specifically, for example, when the detected sound volume of voice of a streamer is greater than a predetermined sound volume and it is determined that the hand and the mouth of the streamer fall within a predetermined distance such that the streamer puts the hand on the mouth, the face of the avatar may blush and the avatar may close the eyes as a predetermined facial expression or the like of the avatar concerned with the streamer. In this case, illustration showing that a megaphone is displayed and/or lightening indicating the volume of voice may be displayed. Here, the size of illustration like lightening may be a size according to the volume of voice. For example, when the detected voice of a streamer is lower than a predetermined sound quality and it is determined that the space between the eyebrows concerned with the streamer is shorter than a predetermined length, a mark representing anger may be attached to the face of the avatar as a predetermined facial expression or the like of an avatar concerned with the streamer. Here, the fact that the space between the eyebrows is shorter than a predetermined length may be a state of a knot between the eyebrows. When it is detected that the streamer speaks a specific keyword, such as "transformation" and it is determined that the streamer makes a predetermined pose, a predetermined transformation animation may be displayed as a predetermined facial expression or the like of an avatar concerned with the streamer. For example, when a streamer moves one hand to draw a circle in front of the body and, at the same time, speaks a voice, such as "transformation", a transformation animation of a masked rider may be launched, and displayed as the predetermined facial expression or the like of an avatar concerned with the streamer.

The detected information may include information detected due to input by a third person. For example, when streaming is being performed in a studio, information input by a third person different from a performer may be detected. For example, a sound like ping-pong in the case where a performer makes a correct answer for a problem may be information obtained by detecting input information by a third person that has input the sound "ping-pong" in addition to or instead of the case where the sound itself is detected. For information other than a sound, for example, information indicating contact in the case where a performer contacts with another person including another performer, or some article may be input by a third person, or a third person may input associated information for an eating and drinking motion that a performer eats food and drinks, or information that good smell or bad smell is occurring may be input by a third person. In this way, information that a streamer is able to recognize with the five senses may be used as information for detecting input by the streamer itself or a third person.

For predetermined conditions, a plurality of predetermined conditions can be satisfied. This is, for example, a case where, as one streamer looks at another streamer, a third streamer contacts with the one streamer. In such a case, when a predetermined facial expression or the like associated with the condition that the streamer looks at another streamer is different from a predetermined facial expression or the like associated with the condition that the distance between the streamer and the third streamer falls within a predetermined distance range, a process in the case where a plurality of predetermined conditions is satisfied may be determined. For example, when a first predetermined condition is satisfied and a second predetermined condition is satisfied within a predetermined time, a predetermined facial expression or pose associated with the case where, of the first predetermined condition and the second predetermined condition, the predetermined condition to which a higher priority is set is satisfied may be applied. Here, a priority may be stored in association with each predetermined condition or may be set as a rule in the case where a plurality of predetermined conditions is satisfied. For example, when there are A1, A2, A3, A4, and the like as predetermined conditions, the predetermined conditions can be compared with each other and then the preferential predetermined condition can be selected. With the function using the priority, it is advantageous that a process is able to be appropriately executed even when a plurality of predetermined conditions is satisfied, particularly, even when a plurality of predetermined conditions is satisfied substantially at the same time. A probability may be used as the priority. For example, even in the case where a probability is determined by a pseudo-random number function or the like, when the pseudo-random number function value is less than or equal to a predetermined value in the case where the first predetermined condition and the second predetermined condition are satisfied, a predetermined facial expression or the like associated with the first predetermined condition may be applied; whereas, when the pseudo-random number function value exceeds the predetermined value, a predetermined facial expression or the like associated with the second predetermined condition may be applied. In this case, variations of performance increase, with the result that there is a possibility that a further interest of a viewer is able to be attracted.

In performing determination on a plurality of conditions that can be satisfied, determination is made after a lapse of a predetermined time, so, when the predetermined time is set to a certain time or longer, there is a possibility that a time lag occurs from satisfaction of the predetermined conditions to a performance of a predetermined facial expression or the like. Therefore, without providing the priority, when the above-described plurality of conditions is satisfied, a predetermined facial expression or the like associated with the predetermined condition satisfied temporally precedingly may be set. Here, temporally preceding may be that, even in the case where predetermined conditions are satisfied substantially at the same time as a result of network, information processing, and the like, a processing unit may determine satisfaction of the predetermined condition first. In this case, it is advantageous in that, before a lapse of the predetermined time, a predetermined facial expression or the like associated with the predetermined condition satisfied first is able to be set. In this case, a predetermined facial expression or the like associated with the predetermined condition satisfied later may be set or does not need to be set. When the predetermined condition satisfied later is set, the predetermined facial expression or the like associated with the predetermined condition satisfied first is overwritten, but it is advantageous that the predetermined facial expression or the like associated with the predetermined condition satisfied later is also able to be performed for a viewer. On the other hand, when the predetermined condition satisfied later is not set, it is advantageous that a viewer is able to sufficiently enjoy the preceding predetermined facial expression or the like. In this way, when both the first predetermined condition and the second predetermined condition are satisfied, a predetermined facial expression or the like may be set in accordance with the timing when the first predetermined condition is satisfied and the timing when the second predetermined condition is satisfied. For example, when the interval between the first timing when the first predetermined condition is satisfied and the second timing when the second predetermined condition is satisfied is shorter than a predetermined time, a process in which only a first predetermined facial expression or the like associated with the first predetermined condition is performed and a second predetermined facial expression or the like associated with the second predetermined condition is not performed may be executed. In this case, it is advantageous that a performance of the first predetermined facial expression or the like is not changed halfway and a viewer is able to enjoy the performance. On the other hand, when the interval between the first timing and the second timing is longer than the predetermined time, a predetermined facial expression or the like associated with the second predetermined condition may be set at the timing when the second predetermined condition is satisfied. In this case, a viewer has an advantage that the viewer is able to enjoy a performance of both, that is, the first predetermined facial expression or the like and the second predetermined facial expression or the like.

The above-described predetermined time for determining the interval between the first timing and the second timing may be set according to a pair of predetermined conditions to be satisfied. For example, it is assumed that a first predetermined facial expression or the like is performed when a first predetermined condition is satisfied, a second predetermined facial expression or the like is performed when a second predetermined condition is satisfied, and a third predetermined facial expression or the like is performed when a third predetermined condition is satisfied. It is also assumed that the first predetermined condition is satisfied at the first timing, the second predetermined condition is satisfied at the second timing, and the third predetermined condition is satisfied at the third timing. At this time, it is assumed that, when the interval between the first timing and the second timing is shorter than a twelfth predetermined time, the second predetermined facial expression or the like is not performed, and, when the interval is longer than or equal to the twelfth predetermined time, the second predetermined facial expression or the like is performed. In addition, it is assumed that, when the interval between the first timing and the third timing is shorter than a thirteenth predetermined time, the third predetermined facial expression or the like is not performed, and, when the interval is longer than or equal to the thirteenth predetermined time, the third predetermined facial expression or the like is performed. At this time, the twelfth predetermined time and the thirteenth predetermined time may be the same or may be different. When the twelfth predetermined time and the thirteenth predetermined time are the same, it means that the performance time of the first predetermined facial expression or the like does not change even when the second predetermined condition is satisfied or the third predetermined condition is satisfied after the first predetermined condition is satisfied. On the other hand, when the twelfth predetermined time and the thirteenth predetermined time are different, it means that the performance time of the first predetermined facial expression or the like changes between when the second predetermined condition is satisfied and when the third predetermined condition is satisfied, after the first predetermined condition is satisfied. In this case, variations of performance increase, with the result that there is a possibility that a further interest of a viewer is able to be attracted.

In the above description, an example in which a priority is associated with a predetermined condition or a rule for a predetermined condition to be satisfied has been described. Alternatively, a priority may be associated with an article, an event, a situation, or the like, in a predetermined condition.

A priority concerned with an article, an event, and a situation (in the application document, which may be referred to as article or the like) concerned with a predetermined condition may be generated by using the size of an article or the like to be displayed, the location of appearance of the article or the like, or the timing of appearance of the article or the like.

For example, for the size of an article or the like to be displayed, when the size of a second article or the like to be displayed is larger than the size of a first article or the like, a higher priority may be set to the second article or the like than the first article or the like. In this case, since the larger one to be displayed attracts more attention of a viewer, it is presumable that setting a higher priority to the larger one meets viewer's intention. On the other hand, the setting may be opposite to this setting. When the setting is opposite, it is advantageous that this setting leads to an unpredictable result.

Other than the size of an article or the like, the price of an article or the like may be used when the article or the like has a price, or the consumption points of an article or the like may be used when the consumption points are set for the article or the like. For example, when the price of a second article or the like is higher than the price of a first article or the like, a higher priority may be set to the second article or the like than to the first article or the like. In this case, since the one with a higher price attracts more attention of a viewer, it is presumable that setting a higher priority to the one with a higher price meets viewer's intention. On the other hand, the setting may be opposite to this setting. When the setting is opposite, it is advantageous that this setting leads to an unpredictable result. Similarly, for consumption points as well, for example, when the consumption points of a second article or the like is higher than the consumption points of a first article or the like, a higher priority may be set to the second article or the like than to the first article or the like. In this case, since the one with higher consumption points attracts more attention of a viewer, it is presumable that setting a higher priority to the one with higher consumption points meets viewer's intention. On the other hand, the setting may be opposite to this setting. When the setting is opposite, it is advantageous that this setting leads to an unpredictable result.

For the place where an article or the like appears in a virtual space, for example, an article or the like that appears in the center in the virtual space may be given a higher priority than an article or the like that appears at an end, such as right or left, in the virtual space. When an article or the like that appears in a place attractive in a virtual space is given a high priority, a viewer is able to bring the article or the like that appears in an attractive place into a field of view, so the viewer has an advantage that the viewer easily understands the meaning of a predetermined facial expression or the like.

The priority concerned with an article or the like may be static information set in advance for the article or the like or may be dynamic information set for the first time at a stage in which an article or the like is provided. The latter one may be, for example, information that is set according to a position where an article or the like appears. For example, the priority concerned with an article or the like may be a priority set according to the relationship between the position where an article or the like appears on a virtual space and the position of an avatar. In this case, a distance itself may play a role as a priority or a distance may be used as one piece of information for setting a priority. For example, in the case where the distance between an avatar and a position concerned with a first article appeared is a first distance and the distance between the avatar and the position concerned with a second article appeared is a second distance, when the first distance is longer than the second distance, a higher priority may be set to the first article than the second article. Other than the above, when a first distance between the screen center and the position concerned with a first article is shorter than a second distance between the screen center and the position concerned with a second article, the first article is appearing closer to the screen center, so the priority of the first article may be set so as to be higher than the priority of the second article. When the priority concerned with an article or the like is dynamically set, it is advantageous that an article or the like to which a predetermined facial expression or the like is set is able to be selected further appropriately and dynamically.

A predetermined facial expression or the like to be applied when a predetermined condition is satisfied may be a type to which an avatar belongs, concerned with the avatar to which a predetermined facial expression or the like is applied. For example, the predetermined condition may include a type to which an avatar belongs, which is one of a plurality of types to which the avatar belongs. When some information is acquired, the information may be a predetermined facial expression or the like for the type of a first avatar and not a predetermined facial expression or the like for the type of a second avatar. For example, an avatar of one type is set with a wimpy personality, and a surprised facial expression may easily appear when the distance from another streamer falls within a first distance range. It is assumed that an avatar of one type is set with a cheerful personality, and a condition for making a facial expression including a smile face may be set so as to be looser than that for another avatar as a predetermined facial expression or the like. In this case, an avatar may have characteristics of a personality, such as wimpy, cheerful, strong, and hate to lose, and satisfaction of the predetermined condition may be determined by using the characteristics with such a personality. A personality may be set according to a type to which an avatar belongs or may be set for each individual avatar separately from a type to which the avatar belongs. A type of the avatar may be a personality set at the time of setting an avatar, or may be determined from parts or clothes put on the avatar at the time when determination on a predetermined condition is performed.

The predetermined condition may include a probability. In other words, the predetermined condition may include a pseudo-random number function or the like, and, when it is determined that a function value satisfies the predetermined condition, a predetermined facial expression or the like may be generated. When the probability is included, a predetermined facial expression or the like is not constantly generated, so it is possible to continuously attract an interest of a viewer. For example, when a rare facial expression is made in the case where the probability value is set so as to be lower than a predetermined value, it is possible to attract an interest of a viewer in terms of the point that the viewer is able to watch a valuable facial expression.

The condition application section 42 may set a facial expression or the like of a streamer, specified as a result of satisfaction of a predetermined condition, for a facial expression or the like of an avatar performed by the streamer. More specifically, information indicating a facial expression or the like specified as a result of satisfaction of a predetermined condition may be an ID that indicates a specified facial expression or the like or one or more parameters that indicate a specified facial expression or the like, and the facial expression or the like of an avatar may be set by using information indicating the specified facial expression or the like so that the specified facial expression or the like can be set as the facial expression of the avatar. After the ID information or the parameter information is specified or generated in the condition application section 42, the information may be sent to a server or a terminal to generate a video or an animation and used for a predetermined period. Here, the condition application section 42 may store information indicating a facial expression or the like specified in association with each predetermined condition, and, when the predetermined condition is satisfied, may be configured to be able to specify information indicating an associated one of the facial expressions or the like specified. After the predetermined facial expression or the like applied as a result of satisfaction of the predetermined condition is set for an avatar for a predetermined period, the motion of the avatar may return to the original one. In other words, since an avatar is performed by a streamer, a facial expression or pose of the avatar may be based on information on a facial expression or pose of the streamer after a predetermined period. Here, the phrase "based on information on a facial expression or pose of the streamer" means that the motion of the avatar may be defined by information obtained by detecting a facial expression or pose of the streamer with an optical sensor or an inertial sensor.

When a first information processing apparatus in which the condition application section 42 is executed and a second information processing apparatus that executes a process including setting of information indicating the facial expression or the like of the avatar are the same, the condition application section 42 may execute a process to set information indicating the facial expression or the like of the avatar by using the facial expression specified by the condition application section 42 as a result of satisfaction of a predetermined condition.

When a first information processing apparatus in which the condition application section 42 is executed and a second information processing apparatus that executes a process including setting of information indicating the facial expression or the like of the avatar are different, the first information processing apparatus may send the information indicating the facial expression or the like specified by the condition application section 42 as a result of satisfaction of a predetermined condition to the second information processing apparatus and the second information processing apparatus may execute a process of setting information indicating the facial expression or the like of the avatar by using information indicating the specified facial expression.

Here, when the first information processing apparatus is a server and the second information processing apparatus is a server, information indicating the specified facial expression or the like may be sent from the server of the first information processing apparatus to the server of the second information processing apparatus. Here, when the first information processing apparatus is a server and the second information processing apparatus is a viewer terminal, information indicating the specified facial expression or the like may be sent from the server of the first information processing apparatus to the viewer terminal of the second information processing apparatus. When the first information processing apparatus is a server and the second information processing apparatus is a streamer terminal, information indicating the specified facial expression or the like may be sent from the server of the first information processing apparatus to the streamer terminal of the second information processing apparatus.

Similarly, when the first information processing apparatus is a viewer terminal and the second information processing apparatus is a server, information indicating the specified facial expression or the like may be sent from the viewer terminal of the first information processing apparatus to the server of the second information processing apparatus. When the first information processing apparatus is a viewer terminal and the second information processing apparatus is a viewer terminal, information indicating the specified facial expression or the like may be sent from the viewer terminal of the first information processing apparatus to the viewer terminal of the second information processing apparatus. When the first information processing apparatus is a viewer terminal and the second information processing apparatus is a streamer terminal, information indicating the specified facial expression or the like may be sent from the viewer terminal of the first information processing apparatus to the streamer terminal of the second information processing apparatus.

Similarly, when the first information processing apparatus is a streamer terminal and the second information processing apparatus is a server, information indicating the specified facial expression or the like may be sent from the streamer terminal of the first information processing apparatus to the server of the second information processing apparatus. When the first information processing apparatus is a streamer terminal and the second information processing apparatus is a streamer terminal, information indicating the specified facial expression or the like may be sent from the streamer terminal of the first information processing apparatus to the streamer terminal of the second information processing apparatus. When the first information processing apparatus is a streamer terminal and the second information processing apparatus is a viewer terminal, information indicating the specified facial expression or the like may be sent from the streamer terminal of the first information processing apparatus to the viewer terminal of the second information processing apparatus.

In the above description, the mode in which the condition application section 42 is executed in the single information processing apparatus has been described. Alternatively, the condition application section 42 may be processed in a plurality of information processing apparatuses in a distributed manner.

The condition application section 42 may set information indicating a predetermined facial expression or the like by using the timing when a predetermined facial expression or the like is set. As described above, the timing may be, for example, the timing when the line of sight of the avatar of one streamer matches the line of sight of the avatar of another streamer or a character, the timing when the avatar contacts with an article, or the like. In this case, information including information indicating the predetermined facial expression or the like may be sent to an information processing apparatus to display the information. A deviation of the timing in this case may include a time lag of communication or processing.

On the other hand, on condition that a predetermined condition is satisfied, the timing when information indicating a predetermined facial expression or the like is set may be the one set separately. For example, it is applicable that a predetermined facial expression or the like is displayed after two seconds from when a predetermined condition is set. As an example, it is also applicable that a predetermined surprised facial expression is set at the timing intentionally delayed by two seconds after an avatar is surprised.

FIG. 10 illustrates exemplary relationships between predetermined conditions and predetermined facial expressions. By using acquired information as a predetermined condition, an associated predetermined facial expression or the like is specified.

As described above, with the function of the condition application section, when a predetermined condition is satisfied, an associated predetermined facial expression or the like can be achieved, so it is advantageous that various facial expressions and poses of an avatar in a virtual space can be provided. It is advantageous that a facial expression or the like is able to be set for an avatar in a virtual space in association with an event that has actually occurred on a performer in a real world. The information for setting the facial expression or the like of the avatar to the predetermined facial expression or pose may be generated without acquiring information to operate the avatar from the streamer terminal. In this case, the performer has an advantage that the performer is able to change the facial expression or the like of the avatar without burden on input of a change or the like of the facial expression or the like of the avatar or any information from the performer since the facial expression or the like of the avatar is compliant with a situation of a real world.

Next, what occurs in a virtual space will be described.

A predetermined facial expression or the like may be a facial expression or the like related to a predetermined motion or the like to occur. In this case, a viewer has an advantage that the viewer is able to easily understand the reason why a predetermined facial expression or the like is expressed in relation to a predetermined motion or the like.

The predetermined facial expression or the like may apply to parameters for all the parts that make up a facial expression or the like or may apply to some of the parameters. For example, the predetermined facial expression or the like may apply to only a parameter for the mouth, and parameters for parts other than the mouth may be parameters that are synchronized with the facial expression of a streamer, and may be parameters based on information associated with the motion of the facial expression of the streamer from a streamer terminal. The predetermined facial expression or the like may include the appearance of an avatar. For example, the predetermined facial expression or the like may include a performance that an avatar is burned.

The predetermined facial expression or the like may change in synchronization with the direction of a predetermined motion or the like. There is a case where a streamer does not know where an article or the like (described later) appears in a virtual space. At this time, there is a case where the streamer does not find where an article or the like appears, and, as a result, an avatar concerned with the streamer is also not able to react to the article or the like. For example, when a ghost character appears or a tub drops from above the head, there can be a case where the streamer does not find them. Therefore, when a predetermined facial expression or the like concerned with an avatar changes in synchronization with a direction in which a predetermined motion or the like is displayed, a viewer has an advantage that the viewer gets more interested in the activity of the avatar. Here, there may be various modes to change in synchronization with the direction of a predetermined motion or the like. For example, a predetermined facial expression or the like to be set may be faced in a direction in which a ghost character comes into contact or a direction in which a zombie character approaches. In the case where a predetermined facial expression or the like is faced, part of area of the avatar may change synchronously or a plurality of areas of the avatar may change synchronously. For example, the case where a predetermined facial expression or the like is faced may be a case where the entire body faces in the direction, may be a case where only the head faces in the direction, or may be a case where only part of the face, such as only the eyes, faces the direction.

The predetermined pose may be various poses. A pose may be only part of the body of an avatar or may be the whole body of an avatar. For example, the pose may be a pose of only the head as a pose to lean the head, a pose of only the hands including a performance that the hands get bigger or the hands are swollen and red, a pose of the upper body like a winning pose, or a pose of the whole body like a pose taking out a gun or jumping with the whole body.

The predetermined condition may include information concerned with any one or more of a predetermined motion of an avatar performed by a streamer, a facial expression of the avatar, a complexion of the avatar, a voice of the avatar, and a predetermined situation that occurs in relation to the avatar.

The predetermined motion of an avatar performed by a streamer may be a predetermined motion perceived by the avatar with the five senses when the avatar is living matter. The predetermined motion of the avatar may include a motion to look at a predetermined object. For example, when the avatar looks at something with a surprise, a surprised facial expression may be set as a predetermined facial expression or the like. In this case, an article at which it is natural for the avatar to make a surprised facial expression may be set in advance, and, when the article is present in an extension of the line of sight, it may be determined that the avatar has looked at the article. In other words, when the predetermined motion includes a motion to look at the predetermined object, the predetermined condition may include that the line of sight of the avatar is moved such that the predetermined object is present in the line of sight direction of the avatar or that the predetermined object is present in the line of sight of the avatar. In the former case, in the case where the avatar actively moves the looking direction to change the line of sight, when a surprising article is located in an extension of the line of sight, a surprised facial expression may be set as the predetermined facial expression or the like. In the latter case, there may be a case where a predetermined object is present, a case where, when the avatar is looking in a predetermined direction, a predetermined object appears and is displayed in that direction, or other cases.

In the above description, an article that provides a surprised emotion to an avatar has been described; however, the article is not limited to an article that provides a surprised emotion, the article may be an article that provides another emotion or feeling. For example, an article that provides a scary emotion, such as a ghost, an article that provides a like emotion, such steak, an article that provides a dislike emotion, such as natto, or the like may be an article that causes a certain emotion or feeling when a person looks at an object. For a predetermined facial expression or the like in the case where such an article is seen as well, a predetermined facial expression or the like showing the face that a person generally makes when the person sees such an object may be set. For the article that brings about a scary emotion, an article that brings about a like emotion, and an article that brings about a dislike emotion, a scary facial expression, a smile face, and a dislike facial expression, or the like may be set, respectively.

In the above description, an object to look has been described as an article. Alternatively, an object to look may be another character or another avatar. In other words, when the predetermined object is another avatar or another character, the predetermined motion of the avatar may include a motion that the line of sight of the avatar matches the line of sight concerned with the predetermined object. In this way, when the line of sight of the avatar matches the line of sight of another character or another avatar, the facial expression or the like of the avatar may be set to the predetermined facial expression or the like. When the lines of sight of avatars match each other, only one of the avatars may be set to have a predetermined facial expression or the like or both the avatars may be set to have a predetermined facial expression or the like. For the latter one, for example, it is presumable that facial expressions or the like that both the lines of sight of the avatars match each other and both avatars have butterflies, such as blushing. When a predetermined facial expression or the like is set for both avatars in the latter case, the set facial expressions or the like may be the same predetermined facial expressions or the like or may be different predetermined facial expressions or the like. When the different predetermined facial expressions or the like are set, a predetermined facial expression or the like may be set according to a type to which an avatar belongs, a predetermined facial expression or the like may be set according to the taste, property, or the like of an avatar, or a predetermined facial expression or the like may be selected probabilistically. As an example of the case where the line of sight of the avatar matches the line of sight of another character, when the line of sight of a ghost character matches the line of sight of the avatar, the face of the avatar may be set to be pale as a predetermined facial expression or the like of the avatar. Whether the predetermined condition is satisfied may be determined by determining whether there is an intersection between the line of sight direction of the avatar and an object, such as a ghost character.

In the above description, an object to look has been described as an article. Alternatively, an object to look may be any event. The scale and object of the event may be various and are not limited. The event may be, for example, a scary situation, such as a cloud of crickets rushing against the avatar, water of an overflowed river sweeping away the avatar, or a gust of wind striking the avatar, or may be a painful situation, such as a fall or blood of another character or avatar. Even in the above event, similarly, the avatar having watched the event may be set to have an associated predetermined facial expression or the like.

The predetermined motion of the avatar may include a motion to contact with a predetermined object. When the predetermined motion includes a motion to contact with the predetermined object, the predetermined condition may include a condition that the distance between the position concerned with the avatar and the position concerned with the predetermined object falls within a predetermined distance. Here, the position concerned with the avatar may be any one of a position of the avatar in a virtual space, an area in which the predetermined facial expression or the like activates, a predetermined area of the avatar, and a position of a collider of the avatar.

Here, the motion to contact means a mode of contact from the avatar regardless of whether the avatar is active or passive; however, the motion to contact does not mean a mode of contact from a third person. Regardless of whether it is active or passive from a third person, the mode of contact from a third person is included in a predetermined situation that occurs in relation to the avatar. The word "passive" includes, for example, a case of contact as a result of objective movement of the avatar or a third person regardless of an intention of the avatar and the third person.

As an example of the motion that the avatar contacts, for example, when an object that the avatar touches is something hot, the avatar may make a surprised facial expression or may make a predetermined facial expression or the like that the touched area swells with heat. More specifically, for example, when something hot is touched with the hand, the avatar may be set to a predetermined facial expression or the like that the hand gets big and red and swollen.

The predetermined motion of the avatar may include an eating and drinking motion to eat or drink a predetermined object. Here, the predetermined eating and drinking motion may be determined in advance as the eating and drinking motion of the avatar and may be detected with an ID or the like indicating the eating and drinking motion. The ID indicating the eating and drinking motion may be an ID assigned to a predetermined specific motion as an eating and drinking motion or may be an ID assigned to a predetermined motion based on one or more pieces of motion data. In an embodiment of the invention of the application, a technical meaning of incorporating an eating and drinking motion into a predetermined motion is that a predetermined facial expression or the like is set in combination with other information (described later). For example, even with the same eating and drinking motion (for example, a motion to eat meat), it is presumable that, when one avatar A eats meat, a predetermined facial expression or the like expressing a well-mannered way of eating is set, while, when another avatar B eats meat, a predetermined facial expression or the like expressing a wild way of eating is set. Here, factors that lead to different performances between the avatar A and the avatar B presumably include, for example, a case where the avatar A and the avatar B are avatars of different types or a case where a predetermined facial expression or the like expressing different ways of eating is set depending on the set idea, taste, or the like even when the avatar A and the avatar B are of the same type. A type of the avatar may be a personality set at the time of setting an avatar, or may be determined from parts or clothes put on the avatar at the time when determination on a predetermined condition is performed.

The predetermined motion of the avatar may include a predetermined gesture for good smell or bad smell. Here, examples of the predetermined gesture include a gesture like moving the nose for sniffing and a gesture to move air in front of the nose to right and left with the hand. The gesture may be detected by, for example, detecting the motion of the nose or the motion of the hand, such as the right hand and the left hand, with an optical sensor, an inertial sensor, or the like. In other words, the predetermined condition may use detection of the predetermined gesture of the avatar. An associated predetermined facial expression or the like may include a predetermined facial expression or the like that performs in an ecstatic mode and a predetermined struggling facial expression or the like. Thus, a streamer has an advantage that the streamer takes a motion when feeling some good smell or bad smell to make a viewer further clearly understand the meaning of the motion. A specific gesture associated with the good smell or the bad smell may be shared between the streamer and the system in advance, so a predetermined facial expression or the like associated with the gesture is able to be performed more effectively.

The predetermined motion of the avatar may include a predetermined gesture for hearing or listening to sound. A predetermined gesture for hearing or listening to sound is presumably, for example, a motion to put the hand on the ear and a gesture to move the one ear in a certain direction. A predetermined facial expression or the like associated with the gesture can be a case where, in the case of a gesture putting the hand on the ear, the hand gets big, or a case where, in the case of a gesture moving the one ear in a certain direction, the ear gets big and moves.

A predetermined condition that includes a facial expression of an avatar performed by a streamer is presumably, for example, a predetermined facial expression or the like when the facial expression of the avatar is a specific one or more parameters. If the facial expression of the avatar is not constantly set to a predetermined facial expression or the like, but when another predetermined condition is satisfied, the facial expression of the avatar can be set to a predetermined facial expression or the like. For example, even when a predetermined facial expression or the like is not set during normal times as a face with a surprised facial expression of a streamer, but when a specific event occurs and the streamer makes a face with a surprised facial expression, a predetermined facial expression or the like may be set.

The complexion of an avatar performed by a streamer may include a change in complexion. For example, when the complexion of an avatar becomes a mode different from normal times, the facial expression or the like of the avatar may be set to a different predetermined facial expression or the like in accordance with the complexion.

The voice of the avatar performed by a streamer may include a change of the sound quality of the voice of the avatar greater than or equal to a predetermined range or a change of the volume of the voice of the avatar by a predetermined amount or more. For example, it is presumable that the voice of an avatar has a property of voice different from usual with stress, anger, or the like. In the case of the above voice, a predetermined facial expression or the like associated with the voice may be set.

A predetermined situation that occurs in relation to the avatar may include generation of a predetermined sound in a virtual space. The predetermined sound may be, for example, a big sound. For the big sound, a predetermined facial expression or the like may be set to a surprised facial expression or, for example, a pose expressing a surprise with the entire body, like jumping up.

The predetermined situation that occurs in relation to the avatar may include a situation in which the distance between the position concerned with a predetermined article and the position concerned with the avatar falls within a predetermined range. Here, the position concerned with a predetermined article may be, for example, a point corresponding to the barycenter of the predetermined article, a point corresponding to the center of the predetermined article, the center of a circumscribed circle of the predetermined article, the center of an inscribed circle of the predetermined article, the center of a circumscribed circle on display of the predetermined article, the center of an inscribed circle on display of the predetermined article, or the like. The position concerned with a predetermined article may be an intersection of a circle or polygon concerned with a predetermined article with a tangent in a straight distance between the circle or polygon and the position concerned with the avatar. For the position concerned with a predetermined article, a collider may be set in a predetermined article, a collider may also be set in an avatar, and contact determination using the colliders may be performed. The position concerned with an avatar may be as described above. When the position concerned with an avatar is the position of the collider, it may be determined that the predetermined article contacts with the avatar.

The predetermined article may be various articles. For example, when a tub drops from above the head and contacts with the head, the eyes may be set in a cross shape as a predetermined facial expression or the like. When lightening hits (contacts with) an avatar, the entire body may be burned as a predetermined facial expression or the like.

Instead of the predetermined article, another article may be used and may be, for example, a character or another avatar. As for an example of the case of a character, the predetermined situation that occurs in relation to the avatar may include that the distance between the position concerned with a zombie character and the position concerned with an avatar falls within a predetermined range. In this case, in the case where the distance falls within the predetermined distance, vertical lines may be drawn on the face of the avatar. A predetermined facial expression or the like may change according to the degree of the distance. For example, when the distance changes to a first distance and to a second distance shorter than the first distance, a predetermined facial expression or the like for the first distance and a predetermined facial expression or the like for the second distance may vary. For example, 10 vertical lines may be drawn in a facial expression of the face as a predetermined facial expression or the like for the first distance, and 20 vertical lines with a double width may be set in a facial expression of the face as a predetermined facial expression or the like for the second distance. On the contrary to the above, the predetermined condition may include a condition that the position concerned with an avatar and the position concerned with a character or an avatar fall outside a predetermined distance range. In this case, a situation in which an avatar or a character moves relatively in a direction to separate from an avatar is shown.

Alternatively, for example, a facial expression, such as tear coming out, may be set as a predetermined facial expression of the avatar.

For example, a predetermined situation that occurs in relation to an avatar may include a case where a first avatar and a second avatar have a predetermined relationship. For example, when the first avatar strokes the head of the second avatar, the eyes of the second avatar may be set in a heart shape as a predetermined facial expression or the like. In this case, a collider may be set in each of the first avatar and the second avatar, and it may be determined whether the colliders contact with each other.

The predetermined situation that occurs in relation to the avatar may include a predetermined combination of a predetermined object with a predetermined pose of the avatar. Here, the predetermined object may be an article, may be a predetermined situation, or may be a predetermined event. The article may include a gift. For example, when the avatar puts on a gift of a gun as an article and takes a shooting pose, a brave facial expression may be set as a predetermined facial expression or the like. Here, determination on a shooting pose may be performed by setting a collider from the central position of an avatar and performing contact determination on each of the positions of the body, such as the right hand, the left hand, the right leg, the left leg, the head, and the like. Here, the positions of the right hand, the left hand, the right leg, the left leg, the head, and the like of a streamer may be detected by an optical sensor, an inertial sensor, or the like. A predetermined facial expression or the like set in this case may be suggested from a combination of given gifts. For example, for a shield of a frog, a sword of a frog, and a cloak of a frog, a face may be like a frog.

Of a plurality of conditions according to an embodiment of the invention of the application, a plurality of conditions can be satisfied. This may be, for example, when the line of sight of an avatar matches the line of sight of a ghost character and, at the same time, the distance between the position concerned with the avatar and the position concerned with the ghost character fall within a predetermined distance range. In such a case, when a predetermined facial expression or the like associated with the condition that the lines of sight match each other is different from a predetermined facial expression or the like associated with the condition that the distance falls within the range, a process in the case where a plurality of predetermined conditions is satisfied may be determined. For example, when a first predetermined condition is satisfied and a second predetermined condition is satisfied within a predetermined time, a predetermined facial expression or pose associated with the case where, of the first predetermined condition and the second predetermined condition, the predetermined condition to which a higher priority is set is satisfied may be applied. Here, a priority may be stored in association with each predetermined condition or may be set as a rule in the case where a plurality of predetermined conditions is satisfied. For example, when there are A1, A2, A3, A4, and the like as predetermined conditions, the predetermined conditions can be compared with each other and then the preferential predetermined condition can be selected. With the function using the priority, it is advantageous that a process is able to be appropriately executed even when a plurality of predetermined conditions is satisfied, particularly, even when a plurality of predetermined conditions is satisfied substantially at the same time. A probability may be used as the priority. For example, even in the case where a probability is determined by a pseudo-random number function or the like, when the pseudo-random number function value is a predetermined value in the case where the first predetermined condition and the second predetermined condition are satisfied, a predetermined facial expression or the like associated with the first predetermined condition may be applied; whereas, when the pseudo-random number function value is another predetermined value, a predetermined facial expression or the like associated with the second predetermined condition may be applied. In this case, variations of performance increase, with the result that there is a possibility that a further interest of a viewer is able to be attracted.

In performing determination on a plurality of conditions that can be satisfied, determination is made after a lapse of a predetermined time, so, when the predetermined time is set to a certain time or longer, there is a possibility that a time lag occurs from satisfaction of the predetermined conditions to a performance of a predetermined facial expression or the like. Therefore, without providing the priority, when the above-described plurality of conditions is satisfied, a predetermined facial expression or the like associated with the predetermined condition satisfied temporally precedingly may be set. Here, temporally preceding may be that, even in the case where predetermined conditions are satisfied substantially at the same time as a result of network, information processing, and the like, a processing unit may determine satisfaction of the predetermined condition first. In this case, it is advantageous in that, before a lapse of the predetermined time, a predetermined facial expression or the like associated with the predetermined condition satisfied first is able to be set. In this case, a predetermined facial expression or the like associated with the predetermined condition satisfied later may be set or does not need to be set. When the predetermined condition satisfied later is set, the predetermined facial expression or the like associated with the predetermined condition satisfied first is overwritten, but it is advantageous that the predetermined facial expression or the like associated with the predetermined condition satisfied later is also able to be performed for a viewer. On the other hand, when the predetermined condition satisfied later is not set, it is advantageous that a viewer is able to sufficiently enjoy the preceding predetermined facial expression or the like. In this way, when both the first predetermined condition and the second predetermined condition are satisfied, a predetermined facial expression or the like may be set in accordance with the timing when the first predetermined condition is satisfied and the timing when the second predetermined condition is satisfied. For example, when the interval between the first timing when the first predetermined condition is satisfied and the second timing when the second predetermined condition is satisfied is shorter than a predetermined time, a process in which only a first predetermined facial expression or the like associated with the first predetermined condition is performed and a second predetermined facial expression or the like associated with the second predetermined condition is not performed may be executed. In this case, it is advantageous that a performance of the first predetermined facial expression or the like is not changed halfway and a viewer is able to enjoy the performance. On the other hand, when the interval between the first timing and the second timing is longer than the predetermined time, a predetermined facial expression or the like associated with the second predetermined condition may be set at the timing when the second predetermined condition is satisfied. In this case, a viewer has an advantage that the viewer is able to enjoy a performance of both, that is, the first predetermined facial expression or the like and the second predetermined facial expression or the like.

The above-described predetermined time for determining the interval between the first timing and the second timing may be set according to a pair of predetermined conditions to be satisfied. For example, it is assumed that a first predetermined facial expression or the like is performed when a first predetermined condition is satisfied, a second predetermined facial expression or the like is performed when a second predetermined condition is satisfied, and a third predetermined facial expression or the like is performed when a third predetermined condition is satisfied. It is also assumed that the first predetermined condition is satisfied at the first timing, the second predetermined condition is satisfied at the second timing, and the third predetermined condition is satisfied at the third timing. At this time, it is assumed that, when the interval between the first timing and the second timing is shorter than a twelfth predetermined time, the second predetermined facial expression or the like is not performed, and, when the interval is longer than or equal to the twelfth predetermined time, the second predetermined facial expression or the like is performed. In addition, it is assumed that, when the interval between the first timing and the third timing is shorter than a thirteenth predetermined time, the third predetermined facial expression or the like is not performed, and, when the interval is longer than or equal to the thirteenth predetermined time, the third predetermined facial expression or the like is performed. At this time, the twelfth predetermined time and the thirteenth predetermined time may be the same or may be different. When the twelfth predetermined time and the thirteenth predetermined time are the same, it means that the performance time of the first predetermined facial expression or the like does not change even when the second predetermined condition is satisfied or the third predetermined condition is satisfied after the first predetermined condition is satisfied. On the other hand, when the twelfth predetermined time and the thirteenth predetermined time are different, it means that the performance time of the first predetermined facial expression or the like changes between when the second predetermined condition is satisfied and when the third predetermined condition is satisfied, after the first predetermined condition is satisfied. In this case, variations of performance increase, with the result that there is a possibility that a further interest of a viewer is able to be attracted.

In the above description, an example in which a priority is associated with a predetermined condition or a rule for a predetermined condition to be satisfied has been described. Alternatively, a priority may be associated with an article, an event, a situation, or the like, in a predetermined condition. For example, in the case where a gift is used in a predetermined condition, a gift and a priority may be associated with each other.

A priority concerned with an article, an event, and a situation (in the application document, which may be referred to as article or the like) concerned with a predetermined condition may be generated by using the size of an article or the like to be displayed, the location of appearance of the article or the like, or the timing of appearance of the article or the like.

For example, for the size of an article or the like to be displayed, when the size of a second article or the like to be displayed is larger than the size of a first article or the like, a higher priority may be set to the second article or the like than the first article or the like. In this case, since the larger one to be displayed attracts more attention of a viewer, it is presumable that setting a higher priority to the larger one meets viewer's intention. On the other hand, the setting may be opposite. When the setting is opposite, it is advantageous that this setting leads to an unpredictable result.

Other than the size of an article or the like, the price of an article or the like may be used when the article or the like has a price, or the consumption points of an article or the like may be used when the consumption points are set for the article or the like. For example, when the price of a second article or the like is higher than the price of a first article or the like, a higher priority may be set to the second article or the like than to the first article or the like. In this case, since the one with a higher price attracts more attention of a viewer, it is presumable that setting a higher priority to the one with a higher price meets viewer's intention. On the other hand, the setting may be opposite. When the setting is opposite, it is advantageous that this setting leads to an unpredictable result. Similarly, for consumption points as well, for example, when the consumption points of a second article or the like is higher than the consumption points of a first article or the like, a higher priority may be set to the second article or the like than to the first article or the like. In this case, since the one with higher consumption points attracts more attention of a viewer, it is presumable that setting a higher priority to the one with higher consumption points meets viewer's intention. On the other hand, the setting may be opposite. When the setting is opposite, it is advantageous that this setting leads to an unpredictable result.

For the place where an article or the like appears in a virtual space, for example, an article or the like that appears in the center in the virtual space may be given a higher priority than an article or the like that appears at an end, such as right or left, in the virtual space. When an article or the like that appears in a place attractive in a virtual space is given a high priority, a viewer is able to bring the article or the like that appears in an attractive place into a field of view, so the viewer has an advantage that the viewer easily understands the meaning of a predetermined facial expression or the like.

The priority concerned with an article or the like may be static information set in advance for the article or the like or may be dynamic information set for the first time at a stage in which an article or the like is provided. The latter one may be, for example, information that is set according to a position where an article or the like appears. For example, the priority concerned with an article or the like may be a priority set according to the relationship between the position where an article or the like appears on a virtual space and the position of an avatar. In this case, a distance itself may play a role as a priority or a distance may be used as one piece of information for setting a priority. For example, in the case where the distance between an avatar and a position concerned with a first article appeared is a first distance and the distance between the avatar and the position concerned with a second article appeared is a second distance, when the first distance is longer than the second distance, a higher priority may be set to the first article than the second article. Other than the above, when a first distance between the screen center and the position concerned with a first article is shorter than a second distance between the screen center and the position concerned with a second article, the first article is appearing closer to the screen center, so the priority of the first article may be set so as to be higher than the priority of the second article. When the priority concerned with an article or the like is dynamically set, it is advantageous that a gift to which a predetermined facial expression or the like is set is able to be selected further appropriately and dynamically.

A type to which an avatar belongs may be used as the information concerned with an avatar. For example, the predetermined condition may include a type to which an avatar belongs, which is one of a plurality of types to which the avatar belongs. When some information is acquired, the information may be a predetermined facial expression or the like for the type of a first avatar and not a predetermined facial expression or the like for the type of a second avatar. For example, an avatar of one type is set with a wimpy personality, and a scary facial expression may easily appear when the distance between a ghost character and the avatar falls within a first distance range. It is assumed that an avatar of one type is set with a cheerful personality, and a condition for making a facial expression including a smile face may be set so as to be looser than that for another avatar as a predetermined facial expression or the like. In this case, an avatar may have characteristics of a personality, such as wimpy, cheerful, strong, and hate to lose, and satisfaction of the predetermined condition may be determined by using the characteristics with such a personality. A personality may be set according to a type to which an avatar belongs or may be set for each individual avatar separately from a type to which the avatar belongs.

The predetermined condition may include a probability. In other words, the predetermined condition may include a pseudo-random number function or the like, and, when a function value satisfies a predetermined condition, a predetermined facial expression or the like may be generated. When the probability is included, a predetermined facial expression or the like is not constantly generated, so it is possible to continuously attract an interest of a viewer. For example, when a rare facial expression is made in the case where the probability value is set so as to be lower than a predetermined value, it is possible to attract an interest of a viewer in terms of the point that the viewer is able to watch a valuable facial expression.

It may be determined whether a predetermined condition is satisfied by using the timing of display of each individual article or the like, such as information on a start of display of an article or the like, information on a change of display of an article or the like, and/or information on an end of display of an article or the like, as a predetermined condition. In this case, since the facial expression or pose of an avatar changes in response to display of an article or the like, that is, a start, change, and end of display of an article or the like, a viewer has an advantage that the viewer easily understands the meaning of a change in the facial expression or pose of the avatar in association with the article or the like.

The predetermined condition may include attribute information of an article or the like. The attribute of an article or the like may include the characteristics of an article or the like, such as the type of an article or the like and the level of an article or the like, or does not need to include the characteristics of an article or the like. A predetermined condition may be set such that a predetermined condition is satisfied in accordance with a particular feature of an article or the like, and an associated predetermined facial expression or the like may be set.

A predetermined condition may define the order or timing of acquired information.

For example, for a predetermined condition and a predetermined facial expression or the like in the case of satisfaction of the predetermined condition, a predetermined facial expression A may be set when a bat character appears on the screen within a predetermined time after a ghost character appears on the screen, and a predetermined facial expression B may be set when a ghost character appears on the screen within a predetermined time after a bat character appears on the screen.

The condition application section 42 may set a facial expression or the like specified as a result of satisfaction of a predetermined condition to a facial expression or the like of an avatar to which the gift is provided. More specifically, information indicating a facial expression or the like specified as a result of satisfaction of a predetermined condition may be an ID that indicates a specified facial expression or the like or one or more parameters that indicate a specified facial expression or the like, and the facial expression or the like of an avatar may be set by using information indicating the specified facial expression or the like so that the specified facial expression or the like can be set as the facial expression of the avatar. After the ID information or the parameter information is specified or generated in the condition application section 42, the information may be sent to a server or a terminal to generate a video or an animation and used for a predetermined period. Here, the condition application section 42 may store information indicating a facial expression or the like specified in association with each predetermined condition, and, when the predetermined condition is satisfied, may be configured to be able to specify information indicating an associated one of the facial expressions or the like specified. After the predetermined facial expression or the like applied as a result of satisfaction of the predetermined condition is set for an avatar for a predetermined period, the motion of the avatar may return to the original one. In other words, since an avatar is performed by a streamer, a facial expression or pose of the avatar may be based on information on a facial expression or pose of the streamer after a predetermined period. Here, the phrase "based on information on a facial expression or pose of the streamer" means that the motion of the avatar may be defined by information obtained by detecting a facial expression or pose of the streamer with an optical sensor or an inertial sensor.

In the above process, when a first information processing apparatus in which the condition application section 42 is executed and a second information processing apparatus that executes a process including setting of a facial expression or the like of the avatar are the same, the condition application section 42 may execute a process to set the facial expression or the like of the avatar by using the facial expression specified by the condition application section 42 as a result of satisfaction of a predetermined condition.

When a first information processing apparatus in which the condition application section 42 is executed and a second information processing apparatus that executes a process including setting of the facial expression of the avatar are different, the first information processing apparatus may send the facial expression or the like specified by the condition application section 42 as a result of satisfaction of a predetermined condition to the second information processing apparatus and the second information processing apparatus may execute a process of setting the facial expression of the avatar by using the specified facial expression or the like.

Here, when the first information processing apparatus is a server and the second information processing apparatus is a server, information indicating the specified facial expression or the like may be sent from the server of the first information processing apparatus to the server of the second information processing apparatus. Here, when the first information processing apparatus is a server and the second information processing apparatus is a viewer terminal, information indicating the specified facial expression or the like may be sent from the server of the first information processing apparatus to the viewer terminal of the second information processing apparatus. When the first information processing apparatus is a server and the second information processing apparatus is a streamer terminal, information indicating the specified facial expression or the like may be sent from the server of the first information processing apparatus to the streamer terminal of the second information processing apparatus.

Similarly, when the first information processing apparatus is a viewer terminal and the second information processing apparatus is a server, information indicating the specified facial expression or the like may be sent from the viewer terminal of the first information processing apparatus to the server of the second information processing apparatus. When the first information processing apparatus is a viewer terminal and the second information processing apparatus is a viewer terminal, information indicating the specified facial expression or the like may be sent from the viewer terminal of the first information processing apparatus to the viewer terminal of the second information processing apparatus. When the first information processing apparatus is a viewer terminal and the second information processing apparatus is a streamer terminal, information indicating the specified facial expression or the like may be sent from the viewer terminal of the first information processing apparatus to the streamer terminal of the second information processing apparatus.

Similarly, when the first information processing apparatus is a streamer terminal and the second information processing apparatus is a server, information indicating the specified facial expression or the like may be sent from the streamer terminal of the first information processing apparatus to the server of the second information processing apparatus. When the first information processing apparatus is a streamer terminal and the second information processing apparatus is a streamer terminal, information indicating the specified facial expression or the like may be sent from the streamer terminal of the first information processing apparatus to the streamer terminal of the second information processing apparatus. When the first information processing apparatus is a streamer terminal and the second information processing apparatus is a viewer terminal, information indicating the specified facial expression or the like may be sent from the streamer terminal of the first information processing apparatus to the viewer terminal of the second information processing apparatus.

In the above description, the mode in which the condition application section 42 is executed in the single information processing apparatus has been described. Alternatively, the condition application section 42 may be processed in a plurality of information processing apparatuses in a distributed manner.

The condition application section 42 may set a predetermined facial expression or the like by using the timing when a predetermined facial expression or the like is set. As described above, the timing may be, for example, the timing when the line of sight of an avatar matches the line of sight of an article or a character, the timing when the avatar contacts with an article, or the like. In this case, information including information indicating the predetermined facial expression or the like may be sent to an information processing apparatus to display the information. A deviation of the timing in this case may include a time lag of communication or processing.

On the other hand, on condition that a predetermined condition is satisfied, the timing when a predetermined facial expression or the like is set may be the one set separately. For example, it is applicable that a predetermined facial expression or the like is displayed after two seconds from when a predetermined condition is set. As an example, it is also applicable that a predetermined surprised facial expression is set at the timing intentionally delayed by two seconds after an avatar is surprised.

FIG. 11 illustrates relationships between predetermined conditions and predetermined facial expression. By using acquired information as a predetermined condition, an associated predetermined facial expression or the like is specified.

As described above, with the function of the condition application section, when a predetermined condition is satisfied, an associated predetermined facial expression or the like can be achieved, so it is advantageous that various facial expressions and poses of an avatar in a virtual space can be provided. Even when a performer is able to designate the facial expression of an avatar using a tablet terminal or the like, but when an accessory gift is put on by an operator in studio streaming, the performer cannot find putting on the accessory gift. In such a case, it is advantageous that, even when the performer does not make any operation, a facial expression or pose associated with the gift is able to be applied to the avatar. In other words, information for setting the facial expression or pose of the avatar to a predetermined facial expression or pose may be generated without any operation other than providing a gift from the streamer.

As described above, with the function of the condition application section, when a predetermined condition is satisfied, an associated predetermined facial expression or the like is able to be automatically achieved, so it is advantageous that it is possible to enjoy a reaction that the facial expression of an avatar changes without any other operation from the viewer terminal.

4. EMBODIMENTS

4-1. First Embodiment

Figure 12:
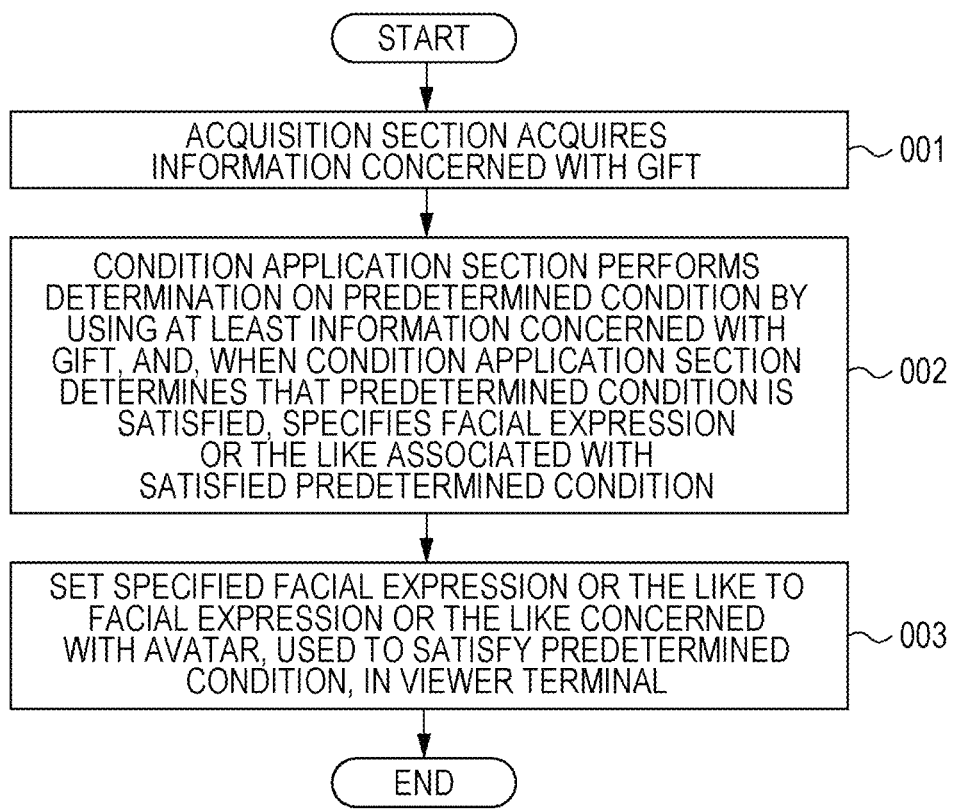
FIG. 12 illustrates an exemplary process performed by the system.

A first embodiment is an example in which the condition application section 42 operates in a viewer terminal. In this case, the acquisition section 41 may operate in the viewer terminal. The present embodiment will be described with reference to FIG. 12. Since the condition application section 42 operates in the viewer terminal, a facial expression or the like of an avatar may be able to be changed by incorporating information based on the viewer terminal into a predetermined condition.

The acquisition section 41 acquires information concerned with a gift (step 001). The information concerned with the gift may be input on the viewer terminal in which the condition application section 42 operates, or the viewer terminal in which the condition application section 42 operates may acquire the information concerned with the gift, input on another viewer terminal, via a server or the like. The acquisition section 41 may acquire information concerned with another avatar.

Subsequently, the condition application section 42 performs determination on a predetermined condition by using at least the information concerned with the gift, and, when the condition application section 42 determines that the predetermined condition is satisfied, specifies a facial expression or the like associated with the satisfied predetermined condition (step 002). Therefore, the condition application section 42 may have at least some of predetermined conditions and information indicating predetermined facial expressions or the like in the case where the associated conditions are satisfied.

The specified facial expression or the like is set for the facial expression or the like concerned with the avatar used to satisfy the predetermined condition in the viewer terminal (step 003). A viewer has an advantage that the viewer is able to watch a reaction that the facial expression or the like of the avatar is changed in response to the provision of the gift.

4-2. Second Embodiment

Figure 13:
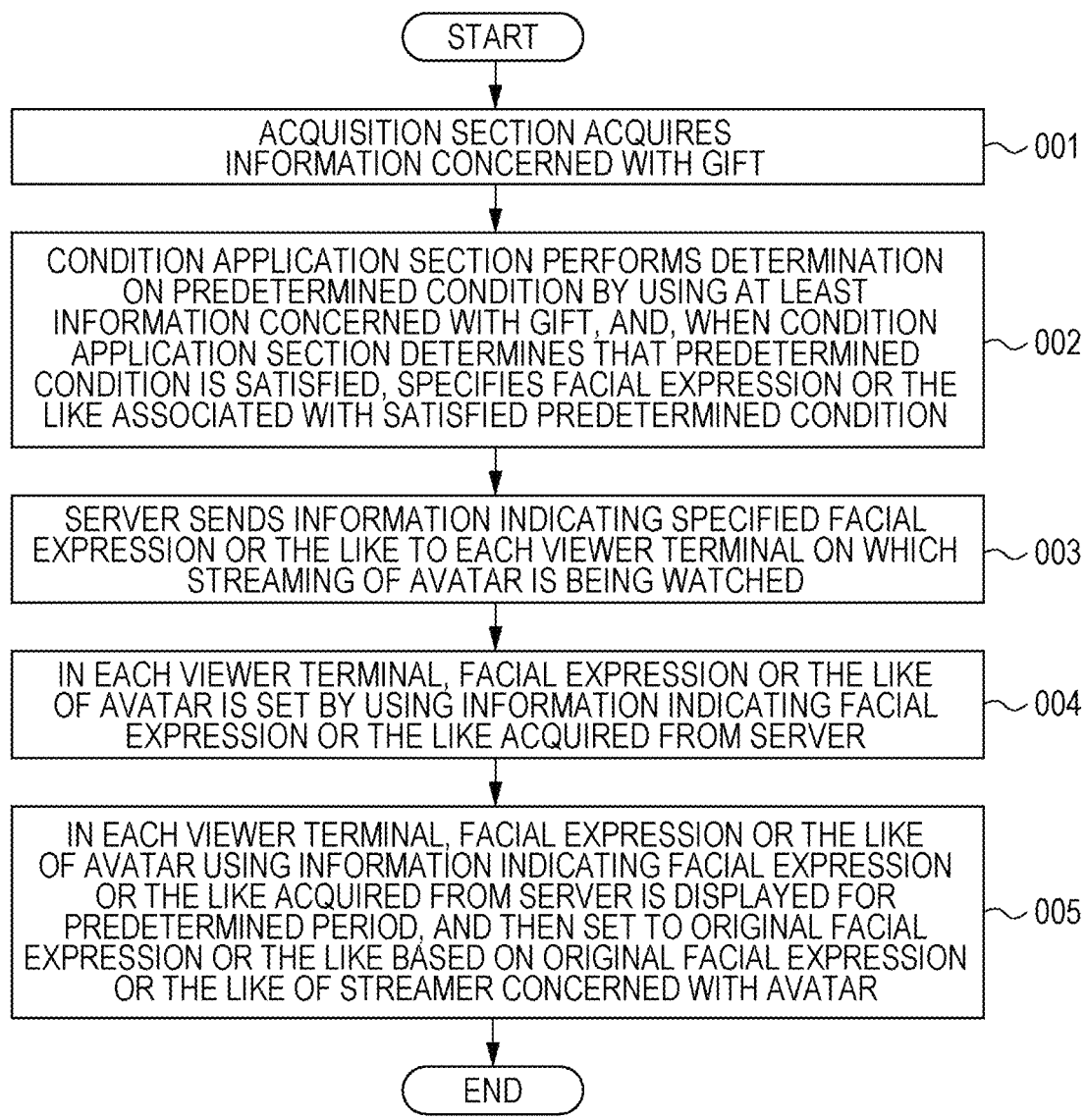
FIG. 13 illustrates another exemplary process performed by the system.

A second embodiment is an example in which the condition application section 42 operates in a server. In this case, the acquisition section 41 may operate in the server. The present embodiment will be described with reference to FIG. 13 on the assumption that an animation is generated on a viewer terminal.

The acquisition section 41 acquires information concerned with a gift (step 001). The acquisition section 41 may acquire information concerned with another avatar.

Subsequently, the condition application section 42 performs determination on a predetermined condition by using at least the information concerned with the gift, and, when the condition application section 42 determines that the predetermined condition is satisfied, specifies a facial expression or the like associated with the satisfied predetermined condition (step 002).

The server sends information indicating the specified facial expression to each viewer terminal on which streaming of the avatar is being watched (step 003).

In each viewer terminal, the facial expression or the like of the avatar is set by using the information indicating the facial expression or the like acquired from the server (step 004). Here, in each viewer terminal, an animation may be generated by using the set facial expression or the like of the avatar.

In each viewer terminal, the facial expression or the like of the avatar using the information indicating the facial expression or the like acquired from the server is displayed for a predetermined period and is then set to the original facial expression based on the facial expression or the like of a streamer concerned with the avatar (step 005). When the animation is generated, the generated facial expression or the like may be used and displayed for a predetermined period in the animation, and then a facial expression or the like obtained by tracking based on the facial expression or the like of the streamer concerned with the avatar may be used as the facial expression or the like of the avatar.

4-3. Third Embodiment

Figure 14:
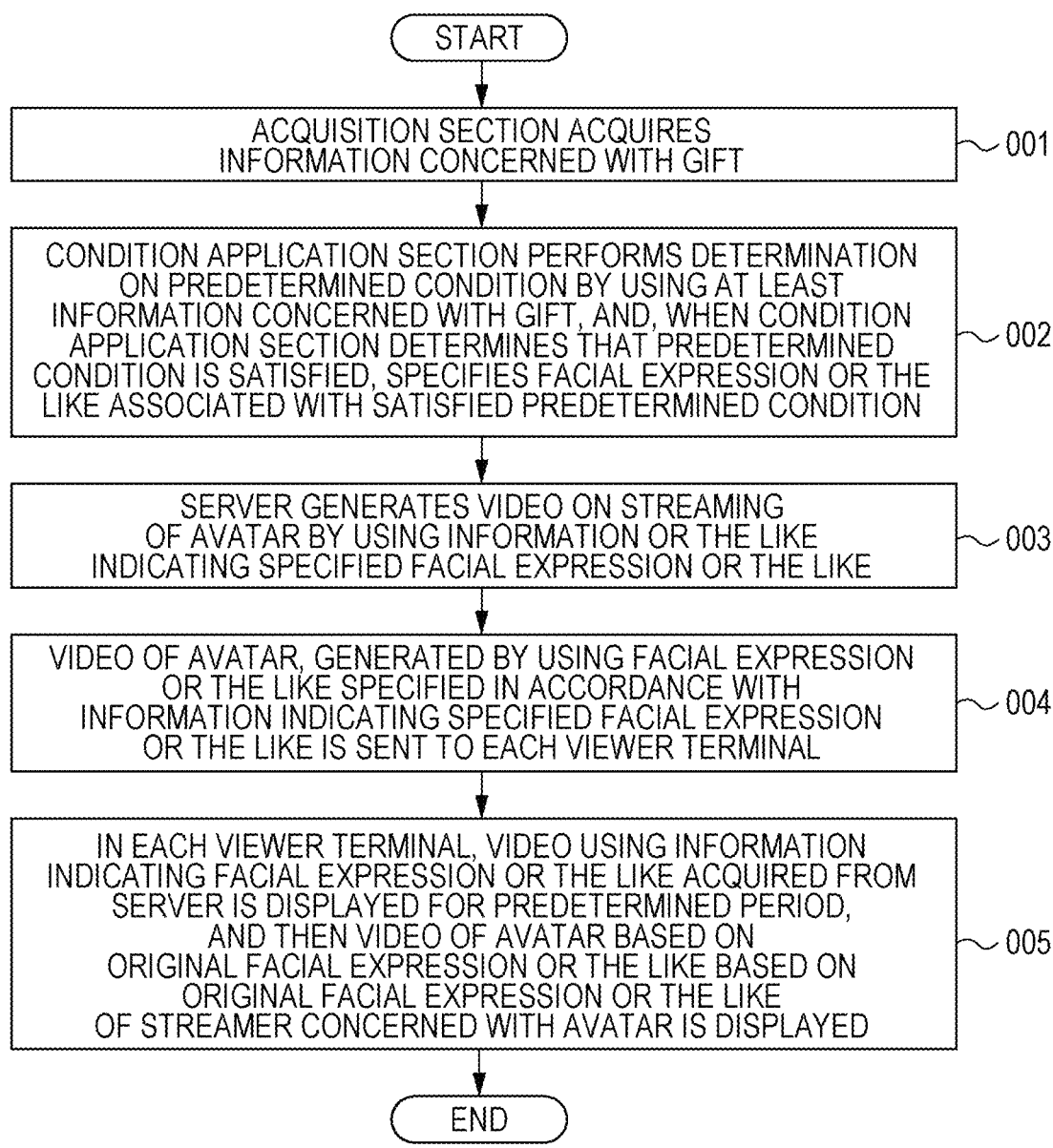
FIG. 14 illustrates another exemplary process performed by the system.

A third embodiment is an example in which the condition application section 42 operates in a server. In this case, the acquisition section 41 may operate in the server. The present embodiment will be described with reference to FIG. 14 on the assumption that a video containing the facial expression of an avatar is generated on the server.

The acquisition section 41 acquires information concerned with a gift (step 001). The acquisition section 41 may acquire information concerned with another avatar.

Subsequently, the condition application section 42 performs determination on a predetermined condition by using at least the information concerned with the gift, and, when the condition application section 42 determines that the predetermined condition is satisfied, specifies a facial expression or the like associated with the satisfied predetermined condition (step 002).

The server generates a video for streaming of the avatar by using information or the like indicating the specified facial expression (step 003). Here, when the server that generates a video for streaming of the avatar and the server that executes the condition application section 42 are the same server, a video for streaming of the avatar may be generated in the server that executes the condition application section. On the other hand, when the server that generates a video for streaming of the avatar and the server that executes the condition application section 42 are different servers, information indicating the specified facial expression may be sent from the server that executes the condition application section 42 to the server that generates the video, and the information indicating the specified facial expression may be used in the server that generates the video. When an animation is generated in the server as well, similarly, an animation for streaming of the avatar may be generated together with a video or instead of a video, and, in this case, the animation may be used together with the video or instead of the video thereafter.

The video of the avatar, generated by using the facial expression or the like specified in accordance with the information indicating the specified facial expression or the like, is sent to each viewer terminal (step 004).

In each viewer terminal, the video using the information indicating the facial expression or the like acquired from the server is displayed for a predetermined period, and then the video of the avatar based on the original facial expression based on the facial expression or the like of a streamer concerned with the avatar is displayed (step 005).

4-4. Fourth Embodiment

Figure 15:
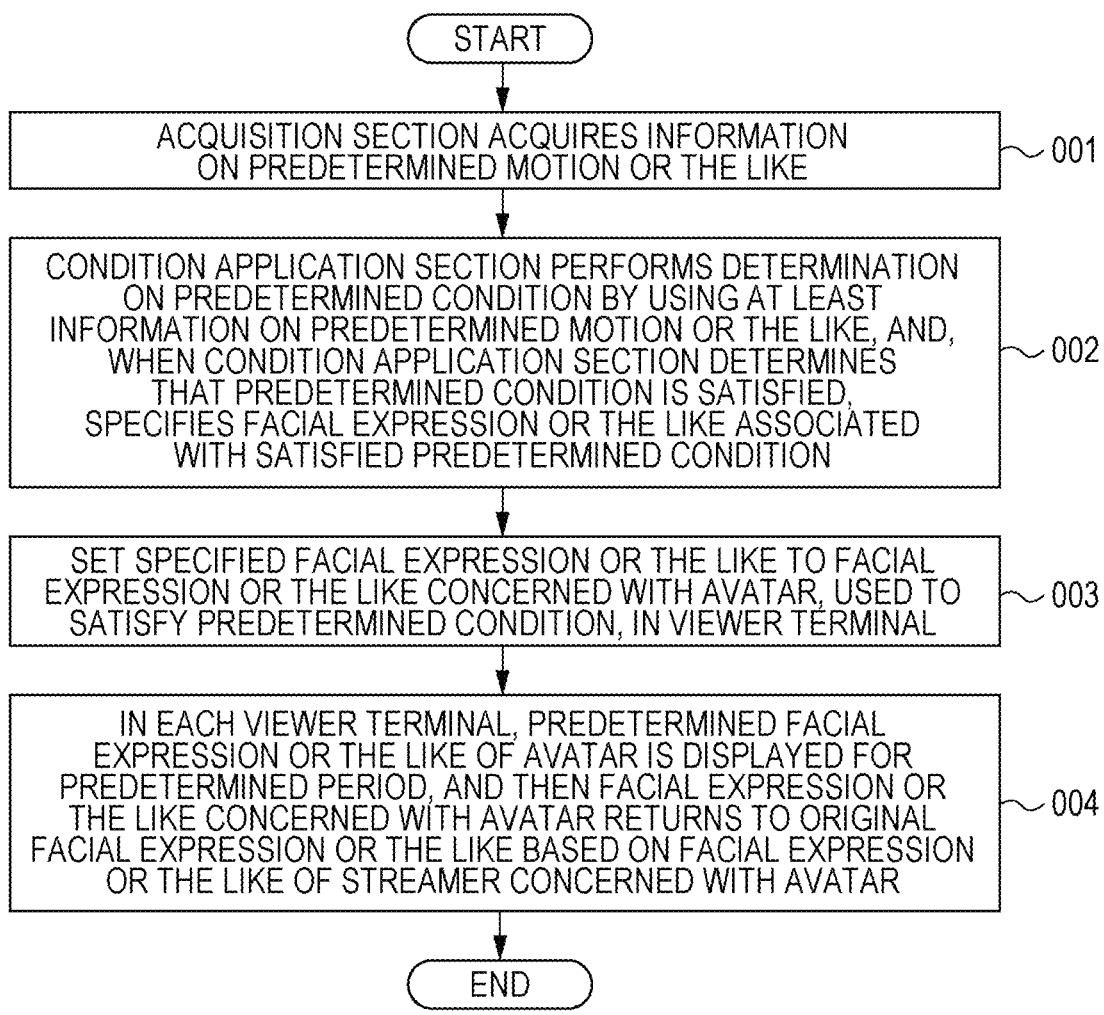
FIG. 15 illustrates another exemplary process performed by the system.

A fourth embodiment is an example in which the condition application section 42 operates in a viewer terminal. In this case, the acquisition section 41 may operate in the viewer terminal. The present embodiment will be described with reference to FIG. 15. Since the condition application section 42 operates in the viewer terminal, a facial expression or the like of an avatar may be able to be changed by incorporating information based on the viewer terminal into a predetermined condition.

The acquisition section 41 acquires information of a predetermined motion or the like (step 001). The information of the predetermined motion or the like may be acquired in a streamer terminal or may be acquired in a server or may be acquired via the server or the like by the viewer terminal on which the condition application section 42 operates. The information of the predetermined motion or the like may be input on the viewer terminal in which the condition application section 42 operates, or information generated in the server as information input in another viewer terminal or a performance may be acquired via the server or the like by the viewer terminal on which the condition application section 42 operates.

Subsequently, the condition application section 42 performs determination on a predetermined condition by using at least the information of the predetermined motion or the like, and, when the condition application section 42 determines that the predetermined condition is satisfied, specifies a facial expression or the like associated with the satisfied predetermined condition (step 002). Therefore, the condition application section 42 may have at least some of predetermined conditions and information indicating predetermined facial expressions or the like in the case where the associated conditions are satisfied.

The specified facial expression or the like is set for the facial expression or the like concerned with the avatar used to satisfy the predetermined condition in the viewer terminal (step 003). A viewer has an advantage that the viewer is able to watch a reaction that the facial expression or the like of the avatar is changed in response to the predetermined motion or the like.

In each viewer terminal, after the predetermined facial expression or the like of the avatar is displayed for a predetermined period, the facial expression or the like concerned with the avatar returns to the original facial expression based on the facial expression or the like of a streamer concerned with the avatar (step 004).

4-5. Fifth Embodiment

Figure 16:
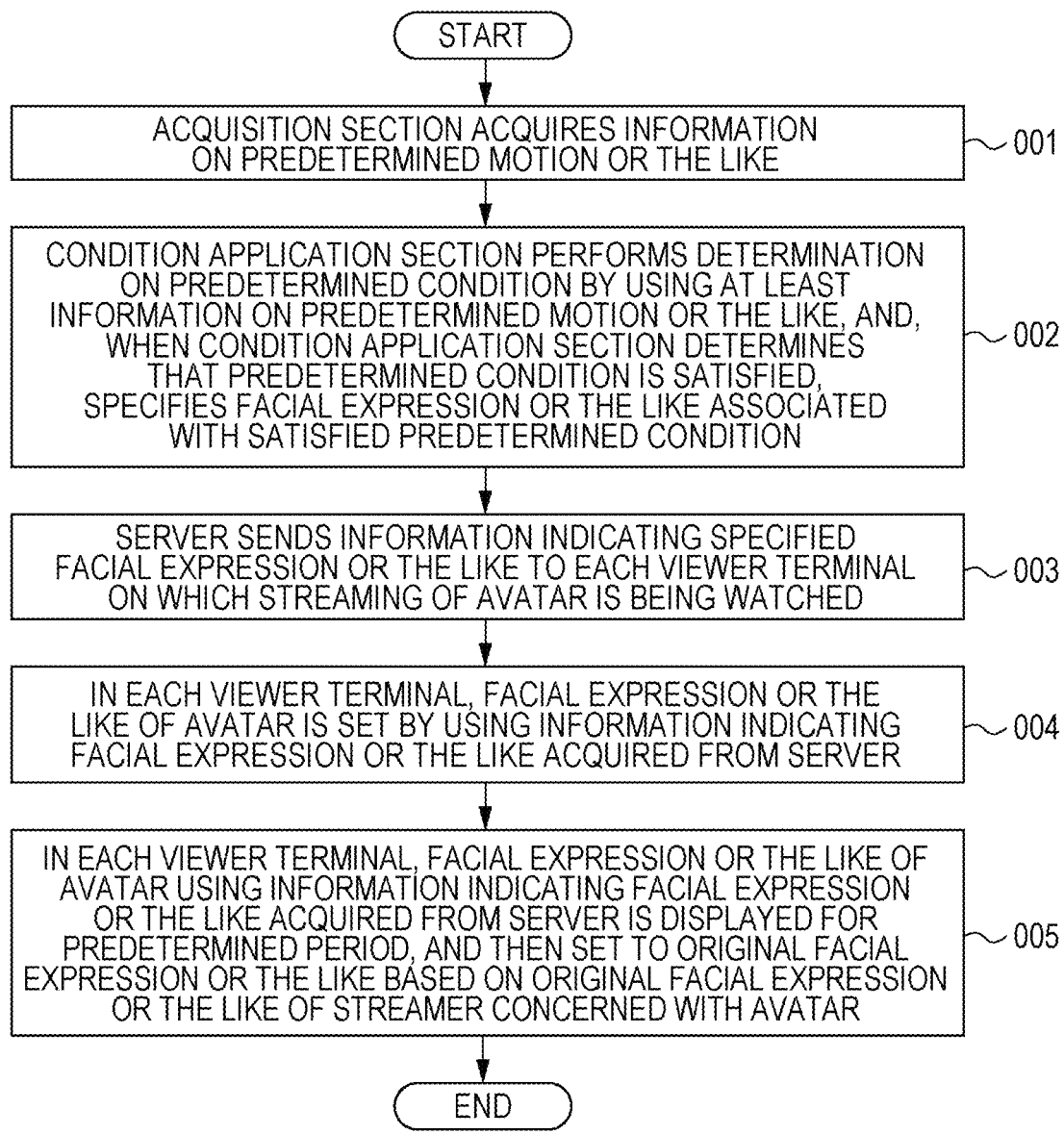
FIG. 16 illustrates another exemplary process performed by the system.

A fifth embodiment is an example in which the condition application section 42 operates in a server. In this case, the acquisition section 41 may operate in the server. The present embodiment will be described with reference to FIG. 16 on the assumption that an animation is generated on a viewer terminal.

The acquisition section 41 acquires information of a predetermined motion or the like (step 001).

Subsequently, the condition application section 42 performs determination on a predetermined condition by using at least the information of the predetermined motion or the like, and, when the condition application section 42 determines that the predetermined condition is satisfied, specifies a facial expression or the like associated with the satisfied predetermined condition (step 002).

The server sends information indicating the specified facial expression or the like to each viewer terminal on which streaming of the avatar is being watched (step 003).

In each viewer terminal, the facial expression or the like of the avatar is set by using the information indicating the facial expression or the like acquired from the server (step 004). Here, in each viewer terminal, an animation may be generated by using the set facial expression or the like of the avatar.

In each viewer terminal, the facial expression or the like of the avatar using the information indicating the facial expression or the like acquired from the server is displayed for a predetermined period and is then set to the original facial expression based on the facial expression or the like of a streamer concerned with the avatar (step 005). When the animation is generated, the generated facial expression or the like may be used and displayed for a predetermined period in the animation, and then a facial expression or the like obtained by tracking based on the facial expression or the like of the streamer concerned with the avatar may be used as the facial expression or the like of the avatar.

4-6. Sixth Embodiment

Figure 17:
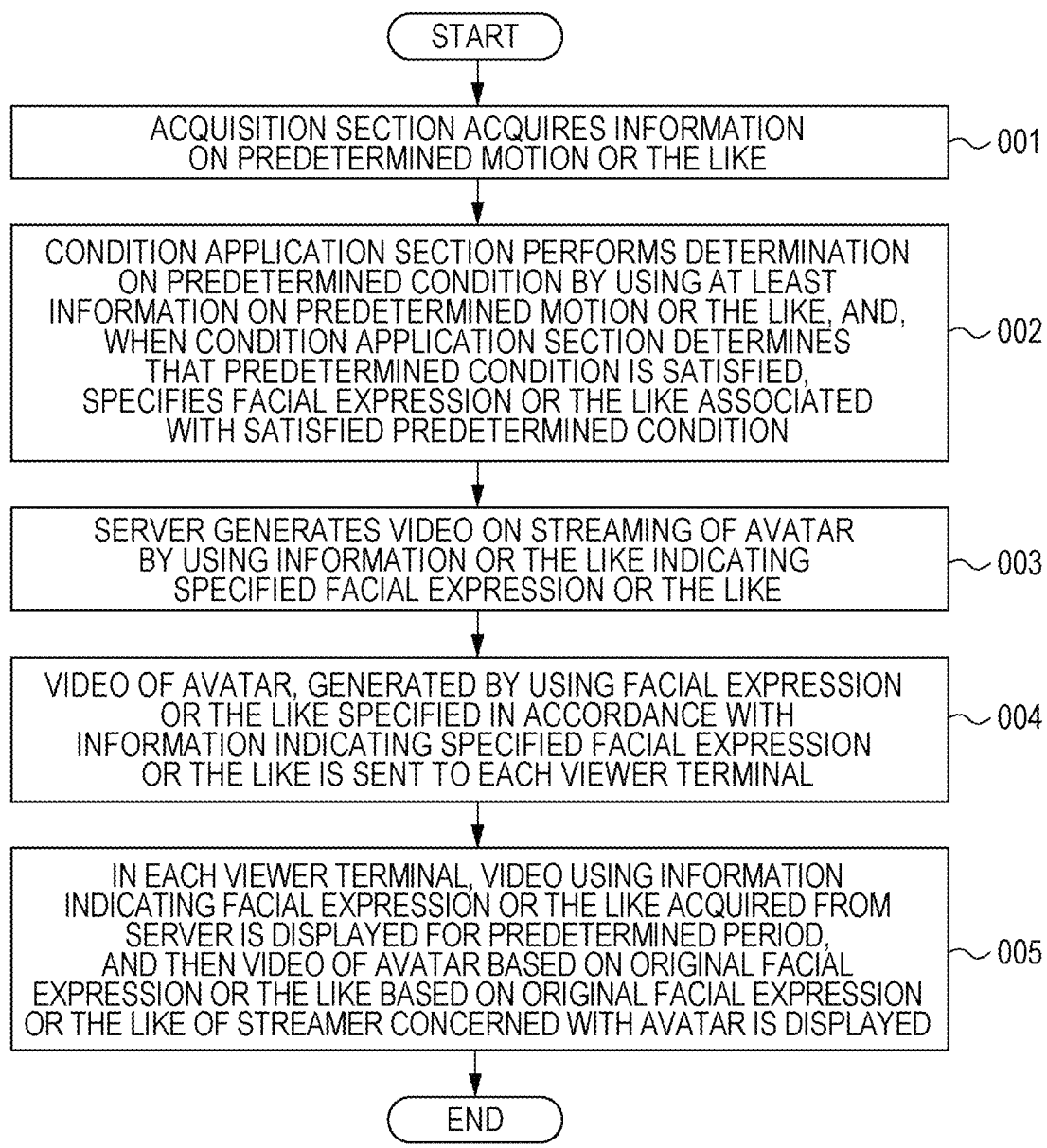
FIG. 17 illustrates another exemplary process performed by the system.

A sixth embodiment is an example in which the condition application section 42 operates in a server. In this case, the acquisition section 41 may operate in the server. The present embodiment will be described with reference to FIG. 17 on the assumption that a video containing the facial expression of an avatar is generated on the server.

The acquisition section 41 acquires information of a predetermined motion or the like (step 001).

Subsequently, the condition application section 42 performs determination on a predetermined condition by using at least the information of the predetermined motion or the like, and, when the condition application section 42 determines that the predetermined condition is satisfied, specifies a facial expression or the like associated with the satisfied predetermined condition (step 002).

The server generates a video for streaming of the avatar by using information or the like indicating the specified facial expression or the like (step 003). Here, when the server that generates a video for streaming of the avatar and the server that executes the condition application section 42 are the same server, a video for streaming of the avatar may be generated in the server that executes the condition application section. On the other hand, when the server that generates a video for streaming of the avatar and the server that executes the condition application section 42 are different servers, information indicating the specified facial expression or the like may be sent from the server that executes the condition application section 42 to the server that generates the video, and the information indicating the specified facial expression or the like may be used in the server that generates the video. When an animation is generated in the server as well, similarly, an animation for streaming of the avatar may be generated together with a video or instead of a video, and, in this case, the animation may be used together with the video or instead of the video thereafter.

The video of the avatar, generated by using the facial expression or the like specified in accordance with the information indicating the specified facial expression or the like, is sent to each viewer terminal (step 004).

In each viewer terminal, the video using the information indicating the facial expression or the like acquired from the server is displayed for a predetermined period, and then the video of the avatar based on the original facial expression based on the facial expression or the like of a streamer concerned with the avatar is displayed (step 005).

4-7. Various Embodiments

A computer program according to a 1A aspect, when executed by one or more processors, causes the one or more processors to implement functions. The functions include detecting information concerned with one or more of a predetermined motion of a streamer, a facial expression of the streamer, a complexion of the streamer, a voice of the streamer, and a predetermined situation that occurs on the streamer, determining whether the detected information satisfies a predetermined condition, when it is determined that the predetermined condition is satisfied, generating information for setting a facial expression or pose of an avatar concerned with the streamer, generated in advance in accordance with a facial expression or pose concerned with the streamer, to a predetermined facial expression or pose associated with the predetermined condition, and displaying the avatar to which the predetermined facial expression or pose is applied.

In a computer program according to a 2A aspect, in the above 1A aspect, the predetermined motion of the streamer is a predetermined motion perceived by the streamer with the five senses.

In a computer program according to a 3A aspect, in the above 1A aspect or the above 2A aspect, the predetermined motion of the streamer includes a motion to watch a predetermined object.

In a computer program according to a 4A aspect, in any one of the above 1A to 3A aspects, the predetermined motion of the streamer includes a motion to contact with a predetermined object.

In a computer program according to a 5A aspect, in any one of the above 1A to 4A aspects, the predetermined motion of the streamer includes an eating and drinking motion to eat or drink a predetermined object.

In a computer program according to a 6A aspect, in any one of the above 1A to 5A aspects, an item to be performed on a virtual space is generated in association with the predetermined object.

In a computer program according to a 7A aspect, in any one of the above 1A to 6A aspects, the predetermined motion of the streamer includes a predetermined good or bad smell gesture.

In a computer program according to an 8A aspect, in any one of the above 1A to 7A aspects, the predetermined motion of the streamer includes a predetermined gesture for hearing or listening to sound.

In a computer program according to a 9A aspect, in any one of the above 1A to 8A aspects, the detected information includes information detected due to input by a third person.

In a computer program according to a 10A aspect, in any one of the above 1A to 9A aspects, the detected information includes information detected by image processing using an image captured by one or more image capture apparatuses that capture the image of the streamer.

In a computer program according to an 11A aspect, in any one of the above 1A to 10A aspects, the predetermined situation that occurs on the streamer includes a situation in which a predetermined sound is generated.

In a computer program according to a 12A aspect, in any one of the above 1A to 11A aspects, the predetermined situation that occurs on the streamer includes a situation in which a predetermined article contacts with the streamer.

In a computer program according to a 13A aspect, in any one of the above 1A to 12A aspects, the complexion of the streamer includes a change in complexion.

In a computer program according to a 14A aspect, in any one of the above 1A to 13A aspects, the voice of the streamer includes a change of the sound quality of the voice of the streamer greater than or equal to a predetermined range or a change of the volume of the voice of the streamer by a predetermined amount or more.

In a computer program according to a 15A aspect, in any one of the above 1A to 14A aspects, when a first predetermined condition is satisfied and a second predetermined condition is satisfied within a predetermined time, a predetermined facial expression or pose associated with the case where, of the first predetermined condition and the second predetermined condition, the predetermined condition to which a higher priority is set is satisfied is applied.

In a computer program according to a 16A aspect, in any one of the above 1A to 15A aspects, the information for setting the facial expression or the like of the avatar to the predetermined facial expression or pose is generated without acquiring information to operate the avatar from the streamer terminal.

A computer program according to a 17A aspect is a computer program and, when executed by one or more processors, causes the one or more processors to implement functions. The functions include detecting information concerned with one or more of a predetermined motion of a streamer, a facial expression of the streamer, a complexion of the streamer, a voice of the streamer, and a predetermined situation that occurs on the streamer, determining whether the detected information satisfies a predetermined condition, when it is determined that the predetermined condition is satisfied, generating information for setting a facial expression or pose of an avatar concerned with the streamer, generated in advance in accordance with a facial expression or pose concerned with the streamer, to a predetermined facial expression or pose associated with the predetermined condition, and sending the information for setting the facial expression or pose of the avatar to the predetermined facial expression or pose.

In a computer program according to a 18A aspect, in the above 17A aspect, the predetermined motion of the streamer is a predetermined motion perceived by the streamer with the five senses.

A server according to a 19A aspect includes one or more processors. The one or more processors execute computer-readable instructions to implement detecting information concerned with one or more of a predetermined motion of a streamer, a facial expression of the streamer, a complexion of the streamer, a voice of the streamer, and a predetermined situation that occurs on the streamer, determining whether the detected information satisfies a predetermined condition, when it is determined that the predetermined condition is satisfied, generating information for setting a facial expression or pose of an avatar concerned with the streamer, generated in advance in accordance with a facial expression or pose concerned with the streamer, to a predetermined facial expression or pose associated with the predetermined condition, and sending the information for setting the facial expression or pose of the avatar to the predetermined facial expression or pose.

In a server according to a 20A aspect, in the above 19A aspect, the predetermined motion of the streamer is a predetermined motion perceived by the streamer with the five senses.

A method according to a 21A aspect is executed by one or more processors that execute computer-readable instructions. The method includes detecting information concerned with one or more of a predetermined motion of a streamer, a predetermined condition of the streamer, a complexion of the streamer, a voice of the streamer, and a predetermined situation that occurs on the streamer, determining whether the detected information satisfies a predetermined condition, when it is determined that the predetermined condition is satisfied, generating information for setting a facial expression or pose of an avatar concerned with the streamer, generated in advance in accordance with a facial expression or pose concerned with the streamer, to a predetermined facial expression or pose associated with the predetermined condition, and displaying the avatar to which the predetermined facial expression or pose is applied.

In a method according to a 22A aspect, in the above 21A aspect, the predetermined motion of the streamer is a predetermined motion perceived by the streamer with the five senses.

A method according to a 23A aspect is executed by one or more processors that execute computer-readable instructions. The method includes detecting information concerned with one or more of a predetermined motion of a streamer, a predetermined condition of the streamer, a complexion of the streamer, a voice of the streamer, and a predetermined situation that occurs on the streamer, determining whether the detected information satisfies a predetermined condition, when it is determined that the predetermined condition is satisfied, generating information for setting a facial expression or pose of an avatar concerned with the streamer, generated in advance in accordance with a facial expression or pose concerned with the streamer, to a predetermined facial expression or pose associated with the predetermined condition, and sending the information for setting the facial expression or pose of the avatar to the predetermined facial expression or pose.

In a method according to a 24A aspect, in the above 23A aspect, the predetermined motion of the streamer is a predetermined motion perceived by the streamer with the five senses.

A viewer terminal according to a 25A aspect includes one or more processors. The one or more processors execute computer-readable instructions to implement detecting information concerned with one or more of a predetermined motion of a streamer, a predetermined condition of the streamer, a complexion of the streamer, a voice of the streamer, and a predetermined situation that occurs on the streamer, determining whether the detected information satisfies a predetermined condition, when it is determined that the predetermined condition is satisfied, generating information for setting a facial expression or pose of an avatar concerned with the streamer, generated in advance in accordance with a facial expression or pose concerned with the streamer, to a predetermined facial expression or pose associated with the predetermined condition, and displaying the avatar to which the predetermined facial expression or pose is applied.

A streamer terminal according to a 26A aspect includes one or more processors. The one or more processors execute computer-readable instructions to implement detecting information concerned with one or more of a predetermined motion of a streamer, a facial expression of the streamer, a complexion of the streamer, a voice of the streamer, and a predetermined situation that occurs on the streamer, determining whether the detected information satisfies a predetermined condition, when it is determined that the predetermined condition is satisfied, generating information for setting a facial expression or pose of an avatar concerned with the streamer, generated in advance in accordance with a facial expression or pose concerned with the streamer, to a predetermined facial expression or pose associated with the predetermined condition, and sending the information for setting the facial expression or pose of the avatar to the predetermined facial expression or pose.

A computer program according to a 1B aspect is a computer program that, when executed by one or more processors, implements acquiring information concerned with one or more of a predetermined motion of an avatar performed by a streamer, a facial expression of the avatar, a complexion of the avatar, a voice of the avatar, and a predetermined situation that occurs in relation to the avatar in a virtual space, determining whether the acquired information satisfies a predetermined condition, when it is determined that the predetermined condition concerned with the acquired information is satisfied, generating information for setting a facial expression or pose of the avatar concerned with the streamer, generated in advance in accordance with a facial expression or pose concerned with the streamer, to a predetermined facial expression or pose associated with the predetermined condition, and displaying the avatar to which the predetermined facial expression or pose is applied.

In a computer program according to a 2B aspect, in the above 1B aspect, the predetermined motion of an avatar performed by a streamer is a predetermined motion perceived by the avatar with the five senses when the avatar is living matter.

In a computer program according to a 3B aspect, in the above 1B aspect or the above 2B aspect, the predetermined motion of the avatar includes a motion to watch a predetermined object.

In a computer program according to a 4B aspect, in any one of the above 1B to 3B aspects, when the predetermined object is another avatar or another character, the predetermined motion of the avatar includes that the line of sight of the avatar matches the line of sight concerned with the predetermined object.

In a computer program according to a 5B aspect, in any one of the above 1B to 4B aspects, when the predetermined motion includes a motion to look at the predetermined object, the predetermined condition includes that the line of sight of the avatar is moved such that the predetermined object is present in the line of sight direction of the avatar or that the predetermined object is present in the line of sight of the avatar.

In a computer program according to a 6B aspect, in any one of the above 1B to 5B aspects, the predetermined motion of the avatar includes a motion to contact with a predetermined object.

In a computer program according to a 7B aspect, in any one of the above 1B to 6B aspects, when the predetermined motion includes a motion to contact with the predetermined object, the predetermined condition includes a condition that the distance between the position concerned with the avatar and the position concerned with the predetermined object falls within a predetermined distance.

In a computer program according to an 8B aspect, in any one of the above 1B to 7B aspects, the position concerned with the avatar is any one of a position of the avatar in a virtual space, an area in which the predetermined facial expression or the like activates, a predetermined area of the avatar, and a position of a collider of the avatar.

In a computer program according to a 9B aspect, in any one of the above 1B to 8B aspects, the predetermined motion of the avatar includes an eating and drinking motion to eat or drink a predetermined object.

In a computer program according to a 10B aspect, in any one of the above 1B to 9B aspects, the predetermined motion of the avatar includes a predetermined gesture for good smell or bad smell.

In a computer program according to an 11B aspect, in any one of the above 1B to 10B aspects, the predetermined motion of the avatar includes a predetermined gesture for hearing or listening to sound.

In a computer program according to a 12B aspect, in any one of the above 1B to 11B aspects, the predetermined condition uses detection of the predetermined gesture of the avatar.

In a computer program according to a 13B aspect, in any one of the above 1B to 12B aspects, a predetermined situation that occurs in relation to the avatar includes generation of a predetermined sound in a virtual space.

In a computer program according to a 14B aspect, in any one of the above 1B to 13B aspects, the predetermined situation that occurs in relation to the avatar includes a situation in which the distance between the position concerned with a predetermined article and the position concerned with the avatar falls within a predetermined range.

In a computer program according to a 15B aspect, in any one of the above 1B to 14B aspects, the predetermined situation that occurs in relation to the avatar includes a predetermined combination of a predetermined object with a predetermined pose of the avatar.

In a computer program according to a 16B aspect, in any one of the above 1B to 15B aspects, the complexion of the avatar includes a change in complexion.

In a computer program according to a 17B aspect, in any one of the above 1B to 16B aspects, the voice of the avatar includes a change of the sound quality of the voice of the avatar greater than or equal to a predetermined range or a change of the volume of the voice of the avatar by a predetermined amount or more.

In a computer program according to an 18B aspect, in any one of the above 1B to 17B aspects, when a first predetermined condition is satisfied and a second predetermined condition is satisfied within a predetermined time, a predetermined facial expression or pose associated with the case where, of the first predetermined condition and the second predetermined condition, the predetermined condition to which a higher priority is set is satisfied is applied.

In a computer program according to a 19B aspect, in any one of the above 1B to 18B aspects, the information for setting the facial expression or the like of the avatar to the predetermined facial expression or pose is generated without acquiring information to operate the avatar from the streamer terminal.

A computer program according to a 20B aspect is a computer program that, when executed by one or more processors, implements acquiring information concerned with one or more of a predetermined motion of an avatar performed by a streamer, a facial expression of the avatar, a complexion of the avatar, a voice of the avatar, and a predetermined situation that occurs in relation to the avatar in a virtual space, determining whether the acquired information satisfies a predetermined condition, when it is determined that the predetermined condition is satisfied, generating information for setting a facial expression or pose of the avatar concerned with the streamer, generated in advance in accordance with a facial expression or pose concerned with the streamer, to a predetermined facial expression or pose associated with the predetermined condition, and sending the information for setting the facial expression or pose of the avatar to the predetermined facial expression or pose.

In a computer program according to a 21B aspect, in the above 20B aspect, the predetermined motion of an avatar performed by a streamer is a predetermined motion perceived by the avatar with the five senses when the avatar is living matter.

A server according to a 22B aspect includes one or more processors. The one or more processors execute computer-readable instructions to implement acquiring information concerned with one or more of a predetermined motion of an avatar performed by a streamer, a facial expression of the avatar, a complexion of the avatar, a voice of the avatar, and a predetermined situation that occurs in relation to the avatar in a virtual space, determining whether the acquired information satisfies a predetermined condition, when it is determined that the predetermined condition is satisfied, generating information for setting a facial expression or pose of the avatar concerned with the streamer, generated in advance in accordance with a facial expression or pose concerned with the streamer, to a predetermined facial expression or pose associated with the predetermined condition, and sending the information for setting the facial expression or pose of the avatar to the predetermined facial expression or pose.

In a server according to a 23B aspect, in the above 22B aspect, the predetermined motion of an avatar performed by a streamer is a predetermined motion perceived by the avatar with the five senses when the avatar is living matter.

A method according to a 24B aspect is executed by one or more processors that execute computer-readable instructions. The method includes acquiring information concerned with one or more of a predetermined motion of an avatar performed by a streamer, a facial expression of the avatar, a complexion of the avatar, a voice of the avatar, and a predetermined situation that occurs in relation to the avatar in a virtual space, determining whether the acquired information satisfies a predetermined condition, when it is determined that the predetermined condition concerned with the acquired information is satisfied, generating information for setting a facial expression or pose of the avatar concerned with the streamer, generated in advance in accordance with a facial expression or pose concerned with the streamer, to a predetermined facial expression or pose associated with the predetermined condition, and displaying the avatar to which the predetermined facial expression or pose is applied.

In a method according to a 25B aspect, in the above 24B aspect, the predetermined motion of an avatar performed by a streamer is a predetermined motion perceived by the avatar with the five senses when the avatar is living matter.

A method according to a 26B aspect is executed by one or more processors that execute computer-readable instructions. The method includes acquiring information concerned with one or more of a predetermined motion of an avatar performed by a streamer, a facial expression of the avatar, a complexion of the avatar, a voice of the avatar, and a predetermined situation that occurs in relation to the avatar in a virtual space, determining whether the acquired information satisfies a predetermined condition, when it is determined that the predetermined condition is satisfied, generating information for setting a facial expression or pose of the avatar concerned with the streamer, generated in advance in accordance with a facial expression or pose concerned with the streamer, to a predetermined facial expression or pose associated with the predetermined condition, and sending the information for setting the facial expression or pose of the avatar to the predetermined facial expression or pose.

In a method according to a 27B aspect, in the above 26B aspect, the predetermined motion of an avatar performed by a streamer is a predetermined motion perceived by the avatar with the five senses when the avatar is living matter.

A viewer terminal according to a 28B aspect includes one or more processors. The one or more processors execute computer-readable instructions to implement acquiring information concerned with one or more of a predetermined motion of an avatar performed by a streamer, a facial expression of the avatar, a complexion of the avatar, a voice of the avatar, and a predetermined situation that occurs in relation to the avatar in a virtual space, determining whether the acquired information satisfies a predetermined condition, when it is determined that the predetermined condition concerned with the acquired information is satisfied, generating information for setting a facial expression or pose of the avatar concerned with the streamer, generated in advance in accordance with a facial expression or pose concerned with the streamer, to a predetermined facial expression or pose associated with the predetermined condition, and displaying the avatar to which the predetermined facial expression or pose is applied.

In a viewer terminal according to a 29B aspect, in the above 28B aspect, the predetermined motion of an avatar performed by a streamer is a predetermined motion perceived by the avatar with the five senses when the avatar is living matter.

A streamer terminal according to a 30B aspect includes one or more processors. The one or more processors execute computer-readable instructions to implement acquiring information concerned with one or more of a predetermined motion of an avatar performed by a streamer, a facial expression of the avatar, a complexion of the avatar, a voice of the avatar, and a predetermined situation that occurs in relation to the avatar in a virtual space, determining whether the acquired information satisfies a predetermined condition, when it is determined that the predetermined condition is satisfied, generating information for setting a facial expression or pose of the avatar concerned with the streamer, generated in advance in accordance with a facial expression or pose concerned with the streamer, to a predetermined facial expression or pose associated with the predetermined condition, and sending the information for setting the facial expression or pose of the avatar to the predetermined facial expression or pose.

In a streamer terminal according to a 31B aspect, in the above 30B aspect, the predetermined motion of an avatar performed by a streamer is a predetermined motion perceived by the avatar with the five senses when the avatar is living matter.

In the application, for example, motion data can be acquired by using a motion capture system. For the sake of easy understanding by persons skilled in the art that has an advantage from the present disclosure, appropriate motion capture systems of some examples that can be used together with the devices and methods described in the application include an optical motion capture system that uses passive markers or active markers or that does not use markers, and an inertial and magnetic non-optical system. Motion data can be acquired by using an image capture apparatus coupled to a computer that converts motion data to a moving image or other image data (like a charge coupled device (CCD) or complementary metal oxide semiconductor (CMOS) image sensor).

Figure 18:
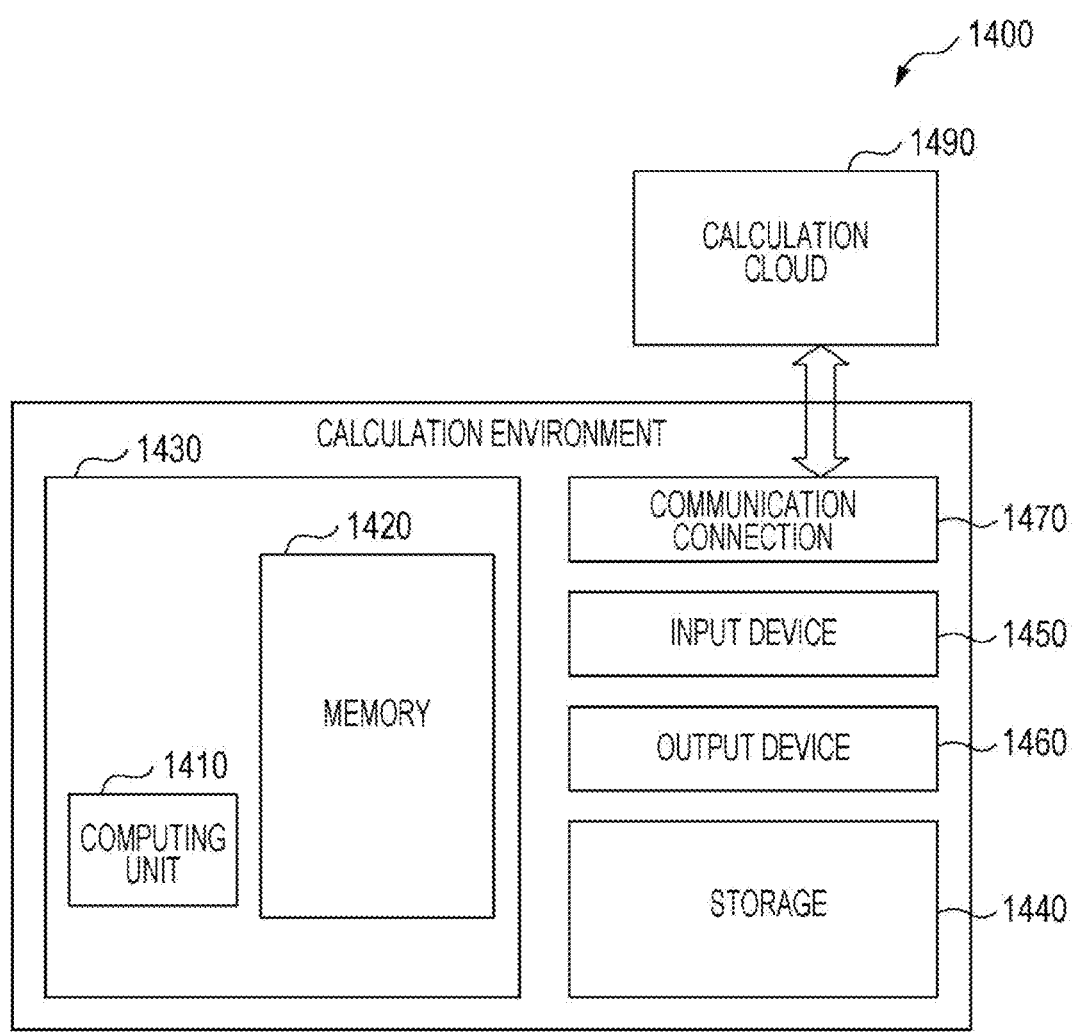
FIG. 18 illustrates an exemplary configuration of a calculation environment in accordance with the present disclosure.

For example, operation data may include one or more of the following pieces of data.
Data indicating how a streamer swiped on a touch pad display
Data indicating which object a streamer tapped or clicked
Data indicating how a streamer dragged on the touch pad display
Other such operation data FIG. 18 illustrates an exemplary calculation environment 1400 on which the embodiments, technique, and technology described in the specification can be implemented, including rendering a video in the calculation environment by sending or using token. For example, the calculation environment 1400 is able to implement any one of a terminal (a streamer terminal or a viewer terminal), a streaming server system, and the like as described in the specification. Further, each component in calculation environment 1400 may include processing circuitry.

Because the technology can be implemented in various general-purpose or special-purpose calculation environments, the calculation environment 1400 does not intend to suggest any limitations on the use of the technology or the range of functions. For example, the technology described in the specification may be implemented by other various computer system configurations, including various portable devices, various multiprocessor systems, various microprocessor bases or programmable domestic electrical appliances, various network PCs, various mini computers, various main-frame computers, and the like. The technology described in the specification may be implemented in a distributed calculation environment in which a task is executed by remote processing devices linked through a communication network. In the distributed calculation environment, a program module may be disposed in both local and remote memory storages.

As shown in FIG. 18, the calculation environment 1400 includes at least one central processing unit 1410 and a memory 1420.

The central processing unit 1410 may execute computer-executable instructions. The central processing unit 1410 may be a real processor or a virtual processor. In a multi-processing system, a plurality of processing units executes computer-executable instructions to improve processing power, so a plurality of processors is able to operate at the same time. The memory 1420 may be a volatile memory (for example, a register, a cache, or a RAM), a nonvolatile memory (for example, a ROM, an EEPROM, a flash memory, or the like), or some combinations of these two-type memories. The memory 1420 stores, for example, software, various images, and videos, which are able to implement the technology described in the specification. The calculation environment may have additional various functions. For example, the calculation environment 1400 includes a storage 1440, one or more input devices 1450, one or more output devices 1460, and one or more communication connections 1470. An interconnection mechanism, such as a bus, a controller, and a network, interconnects various components of the calculation environment 1400. Ordinarily, operating system software provides an operating environment for other software to be executed in the calculation environment 1400 and coordinates various activities of various components of the calculation environment 1400.

The storage 1440 may be detachable or may be undetachable. The storage 1440 includes a magnetic disk, a magnetic tape or cassette, a CD-ROM, a CD-RW, a DVD, or any medium that is used to store information and that can access the calculation environment 1400. The storage 1440 stores instructions for the software, plug-in data, and messages, which can be used to implement the technology described in the specification.

The one or more input devices 1450 may be a touch input device, such as a keyboard, a keypad, a mouse, a touch screen display, a pen, and a trackball, a speech input device, a scanning device, or another device that provides input to the calculation environment 1400. In the case of audio, the at least one input device 1450 may be a sound card or similar device that receives analog or digital audio input, or a CD-ROM reader that provides the calculation environment 1400 with various audio samples. The one or more output devices 1460 may be a display, a printer, a speaker, a CD writer, or another device that provides output from the calculation environment 1400.

The one or more communication connections 1470 enable communication with another calculation entity via a communication medium (for example, a connection network). The communication medium transmits information, such as computer-readable instructions, compressed graphics information, videos, and other data included in modulated data signals. The one or more communication connections 1470 are not limited to wired connection (for example, megabit or gigabit Ethernet, InfiniBand, or a fiber channel via electric or optical fiber connection) and includes a wireless technology (for example, Bluetooth, WiFi (RF connection via IEEE 802.11a/b/n), WiMax, cellular, satellite, laser, or infrared), and other appropriate various communication connections for providing network connection to various agents, various bridges, and various data consumers of destination agents described in the specification. In a virtual host environment, the one or more communication connections may be a virtual network connection provided by a virtual host.

Various embodiments of various methods described in the specification can be executed by using computer-executable multiple instructions that implement all or part of the technology described in the specification in a calculation cloud 1490. For example, various agents are able to execute various vulnerability scanning functions in the calculation environment, while an agent platform (for example, a bridge) and a consumer service for destination agent data are able to be executed in various servers in the calculation cloud 1490.

A computer-readable medium is a selected usable medium that can be accessed in the calculation environment 1400. Although not limited, for example, the computer-readable medium of the calculation environment 1400 includes the memory 1420 and/or the storage 1440. As is easily understood, the term "computer-readable medium" includes a data storage medium, such as the memory 1420 and the storage 1440, and does not include a transmission medium, such as modulated various data signals.

The word "gift" used in the application means a similar concept to the word "token". Therefore, the technology described in the application may be understood while the word "gift" is replaced with the word "token".

In the application, the terms or phrases may be read as follows. Data concerned with a gift may be information concerned with a gift. Data to start display of the gift may be information to start display of the gift. Data to change display of the gift may be information to change display of the gift. Attribute data of the gift may be attribute information of the gift. Data to end display of the gift may be information to end display of the gift. Data concerned with a first gift may be information concerned with a first gift. Data concerned with a second gift may be information concerned with a second gift. Data concerned with time between the first gift and the second gift may be information concerned with time between the first gift and the second gift. Data concerned with a provider of a gift may be information concerned with a provider of a gift. Data for setting a predetermined facial expression or pose associated with a predetermined condition may be information for setting a predetermined facial expression or pose associated with a predetermined condition. Data for setting a predetermined facial expression or pose may be information for setting a predetermined facial expression or pose. Data to operate an avatar may be information to operate an avatar. Generated data may be generated information.

In consideration of many possible embodiments to which the principle of the invention described in the specification can be applied, example various embodiments are only various possible examples, and it is to be understood that the technical scope of the invention according to the claims is not limited to these various possible examples. Actually, the technical scope of the invention according to the claims is defined by the appended claims. Therefore, we make a request for grant of patent as the invention of the inventors concerning all belonging to the technical scope of the invention described in the claims.

The system and information processing described in the application document may be implemented by software, hardware, or a combination of both. Part or all of the system and information processing may implement processes and procedures as computer programs and may be executed by various computers. These computer programs may be stored in a storage medium. These programs may be stored in a non-transitory or transitory storage medium.

The one described in the application document is not limited to the one described in the application document and, of course, may be applied to various examples within the scope of various technical ideas having various technical advantages and configurations described in the application document.

The contents of Custom Cast, produced by Custom Cast Inc., [retrieved on Dec. 10, 2019 from https://customcast.jp] is incorporated herein by reference in its entirety.

What is claimed is:

1. A non-transitory computer readable medium storing computer executable instructions which, when executed by one or more processors, cause the one or more processors to perform a process comprising:
   generating avatar information relating to an avatar expression or pose based on streamer data indicating a facial expression or pose of a streamer;
   acquiring gift information concerned with a gift of an object that is provided from a viewer to the streamer, wherein the gift is to be used by the avatar;
   determining whether the gift information satisfies a predetermined condition, wherein the predetermined condition includes a condition that is satisfied when the avatar puts on the gift;
   in a case that the gift information is determined to satisfy the predetermined condition, rendering an avatar facial expression or pose using a predetermined facial expression or pose corresponding to the predetermined condition; and
   in a case that the gift information is determined to not satisfy the predetermined condition, rendering the avatar facial expression or pose using the avatar information generated based on the streamer data.

2. The non-transitory computer readable medium according to claim 1, wherein the predetermined condition includes a condition that a position concerned with the avatar and a position concerned with the gift fall within a predetermined distance range.

3. The non-transitory computer readable medium according to claim 2, wherein the position concerned with the avatar is any one of a position of the avatar in a virtual space, an area in which the predetermined facial expression or pose activates, a predetermined area of the avatar, and a collider of the avatar.

4. The non-transitory computer readable medium according to claim 1, wherein the predetermined condition uses a priority concerned with the gift.

5. The non-transitory computer readable medium according to claim 4, wherein the priority concerned with the gift is generated by using a price of the gift, a display size of the gift, a level of the gift, and/or information concerned with a provider of the gift.

6. The non-transitory computer readable medium according to claim 1, wherein the gift information includes information on a start of display of the gift, information on a change of display of the gift, attribute information of the gift, and/or information on an end of display of the gift.

7. The non-transitory computer readable medium according to claim 1, wherein
   the gift information includes information concerned with a first gift and information concerned with a second gift, and
   the predetermined condition uses a combination of the information concerned with the first gift and the information concerned with the second gift, an order in which the information concerned with the first gift and the information concerned with the second gift, is acquired, and/or a first time at which the information concerned with the first gift is acquired and a second time at which the information concerned with the second gift is acquired.

8. The non-transitory computer readable medium according to claim 1, wherein the one or more processors are provided in one or some or all of a server, a viewer terminal, and a streamer terminal.

9. The non-transitory computer readable medium according to claim 1, wherein in the case that the gift information is determined to satisfy the predetermined condition, the rendering the avatar facial expression or pose includes changing the avatar information with predetermined avatar information corresponding with the predetermined facial expression or pose.

10. The non-transitory computer readable medium according to claim 1, wherein in the case that the gift information is determined to satisfy the predetermined condition, the rendering the avatar facial expression or pose includes changing a parameter of at least part of the streamer data.

11. The non-transitory computer readable medium according to claim 10, wherein the changing the parameter includes changing a position data of the at least part of the streamer data from indicating a first position to a second position.

12. The non-transitory computer readable medium according to claim 1, wherein the rendering the avatar facial expression or pose includes replacing at least part of an avatar corresponding to the streamer with a predetermined image.

13. The non-transitory computer readable medium according to claim 1, wherein the rendering the avatar facial expression or pose includes changing a color or size of at least part of an avatar corresponding to the streamer.

14. A server, comprising:
processing circuitry configured to
generate avatar information relating to an avatar expression or pose based on streamer data indicating a facial expression or pose of a streamer;
acquire gift information concerned with a gift of an object that is provided from a viewer to the streamer, wherein the gift is to be used by the avatar;
determine whether the gift information satisfies a predetermined condition, wherein the predetermined condition includes a condition that is satisfied when the avatar puts on the gift;
in a case that the gift information is determined to satisfy the predetermined condition, render an avatar facial expression or pose using a predetermined facial expression or pose corresponding to the predetermined condition; and
in a case that the gift information is determined to not satisfy the predetermined condition, render the avatar facial expression or pose using the avatar information generated based on the streamer data.

15. The server according to claim 14, wherein in the case that the gift information is determined to satisfy the predetermined condition, the processing circuitry is configured to render the avatar facial expression or pose by changing the avatar information with predetermined avatar information corresponding with the predetermined facial expression or pose.

16. The server according to claim 14, wherein in the case that the gift information is determined to satisfy the predetermined condition, the processing circuitry is configured to render the avatar facial expression or pose by changing a parameter of a part of the streamer.

17. A method, comprising:
generating avatar information relating to an avatar expression or pose based on streamer data indicating a facial expression or pose of a streamer;
acquiring gift information concerned with a gift of an object that is provided from a viewer to the streamer, wherein the gift is to be used by the avatar;
determining whether the gift information satisfies a predetermined condition, wherein the predetermined condition includes a condition that is satisfied when the avatar puts on the gift;
in a case that the gift information is determined to satisfy the predetermined condition, rendering an avatar facial expression or pose using a predetermined facial expression or pose corresponding to the predetermined condition; and
in a case that the gift information is determined to not satisfy the predetermined condition, rendering the avatar facial expression or pose using the avatar information generated based on the streamer data.

* * * * *